United States Patent
Kimura

(10) Patent No.: US 11,068,699 B2
(45) Date of Patent: Jul. 20, 2021

(54) IMAGE PROCESSING DEVICE, IMAGE PROCESSING METHOD, AND TELECOMMUNICATION SYSTEM TO GENERATE AN OUTPUT IMAGE FOR TELECOMMUNICATION

(71) Applicant: SONY CORPORATION, Tokyo (JP)

(72) Inventor: Seiji Kimura, Chiba (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/609,043

(22) PCT Filed: May 24, 2018

(86) PCT No.: PCT/JP2018/019953
§ 371 (c)(1),
(2) Date: Oct. 28, 2019

(87) PCT Pub. No.: WO2018/225518
PCT Pub. Date: Dec. 13, 2018

(65) Prior Publication Data
US 2020/0151427 A1 May 14, 2020

(30) Foreign Application Priority Data
Jun. 7, 2017 (JP) .............................. JP2017-112488
Jan. 12, 2018 (JP) .............................. JP2018-003139

(51) Int. Cl.
*G06K 9/00* (2006.01)
*G06T 7/246* (2017.01)
*H04N 7/14* (2006.01)

(52) U.S. Cl.
CPC ..... *G06K 9/00281* (2013.01); *G06K 9/00597* (2013.01); *G06T 7/251* (2017.01);
(Continued)

(58) Field of Classification Search
CPC ........... G06K 9/00281; G06K 9/00597; G06K 9/00607; G06K 9/00601; G06K 9/00614;
(Continued)

(56) References Cited

U.S. PATENT DOCUMENTS 7,532,224 B2 * 5/2009 Bannai .................... A63F 13/00
345/633
8,280,115 B2 * 10/2012 Matsumura ............. G06T 7/593
382/107
(Continued)

FOREIGN PATENT DOCUMENTS

EP 1977374 A1 10/2008
JP 09-154114 A 6/1997
(Continued)

OTHER PUBLICATIONS

Baek, et al., "Intermediate view synthesis for eye-gazing", Proceedings of SPIE—The International Society for Optical Engineering, vol. 9406, 2015, 9 pages.
(Continued)

*Primary Examiner* — Amir Alavi
(74) *Attorney, Agent, or Firm* — Chip Law Group

(57) ABSTRACT

The present disclosure relates to an image processing device, an image processing method, and a telecommunication system including a high fidelity display region setting unit for setting a predetermined region as a high fidelity display region, a high fidelity image generation unit for generating a high fidelity image in which the first user looks are captured from a virtual capture position that is obtained by setting a viewpoint position of a second user as the virtual capture image, a low fidelity image generation unit for generating a low fidelity image in which the first user looks are captured from the virtual capture position and having lower fidelity than the high fidelity image, and an image superimposing unit for superimposing the high fidelity image on the high fidelity display region of the low fidelity image to generate an output image to be output as an image processing result.

24 Claims, 66 Drawing Sheets

(52) U.S. Cl.
CPC ..... *H04N 7/14* (2013.01); *G06T 2207/10016* (2013.01); *G06T 2207/30201* (2013.01)

(58) Field of Classification Search
CPC ........... G06K 9/00228; G06K 9/00222; G06K 9/00287; G06K 9/00248; H04N 7/14; G06T 7/251; G06T 7/408; G06T 2207/30201; G06T 2207/10016; G06T 2207/30216

See application file for complete search history.

(56) References Cited

U.S. PATENT DOCUMENTS

| | | | |
|---|---|---|---|
| 8,798,330 B2* | 8/2014 | Hanna | G06K 9/00892 |
| | | | 382/115 |
| 8,860,714 B2* | 10/2014 | Sakuragi | H04N 13/156 |
| | | | 345/419 |
| 9,057,826 B2* | 6/2015 | Gupta | G02B 27/0101 |
| 9,357,231 B2* | 5/2016 | Nakane | H04N 13/183 |
| 9,552,467 B2* | 1/2017 | Ikenoue | G06F 21/32 |
| 9,916,690 B2* | 3/2018 | Nobori | G06T 5/006 |
| 10,136,101 B2* | 11/2018 | Akao | G06T 11/60 |
| 2008/0285801 A1 | 11/2008 | Heinzmann et al. | |
| 2012/0256950 A1* | 10/2012 | Masuda | G06Q 50/22 |
| | | | 345/629 |
| 2020/0151427 A1* | 5/2020 | Kimura | H04N 7/18 |

FOREIGN PATENT DOCUMENTS

| | | |
|---|---|---|
| JP | 2009-517745 A | 4/2009 |
| JP | 2011-165081 A | 8/2011 |
| JP | 2015-513833 A | 5/2015 |
| JP | 2016-192687 A | 11/2016 |
| WO | 2007/062478 A1 | 6/2007 |
| WO | 2016/159165 A1 | 10/2016 |

OTHER PUBLICATIONS

Noda, et al., "A Study of High Presence Video Communication System in Tiled Display Environment", Information Processing Society of Japan, 2015, 10 pages.

Ishii, et al., "MoPaCo: Window Interface to Enhance Telepresence in Video Communication", The IEICE Transactions on information and systems (japanese edition), vol. J96-D, No. 1, Jan. 2013, 13 pages.

International Search Report and Written Opinion of PCT Application No. PCT/JP2018/019953, dated Jun. 26, 2018, 19 pages of ISRWO.

Ishii, et al., "MoPaCo: Window Interface to Enhance Telepresence in Video Communication", IEICE Transaction on Information and Systems, vol. J96-D, No. 1, Jan. 2013, 13 pages.

Noda, et al., "A Study of High Presence Video Communication System in Tiled Display Environment", Information Processing Society of Japan, Technical Report, vol. 2015, No. 22, Mar. 5, 2015, 10 pages.

Baek, et al., "Intermediate view synthesis for eye-gazing", Proceedings of SPIE—The International Society for Optical Engineering, Feb. 2015, 08 pages.

\* cited by examiner

FIG. 4

FIG. 54
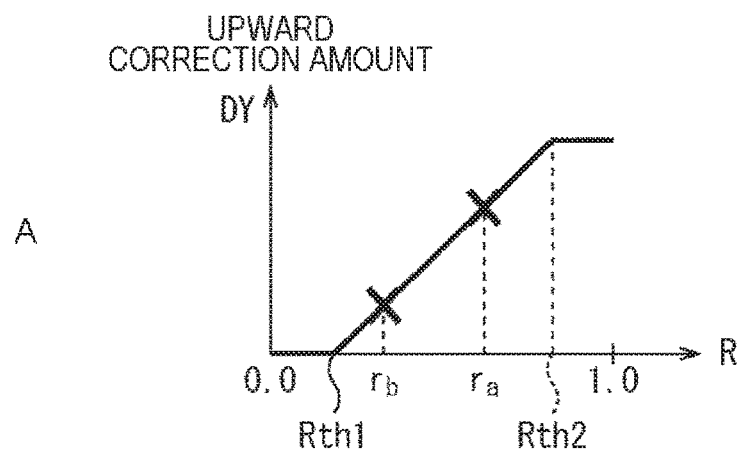
A
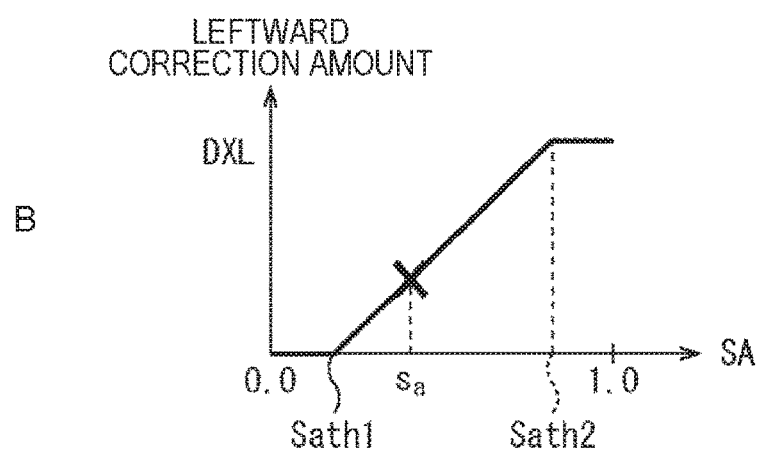
B
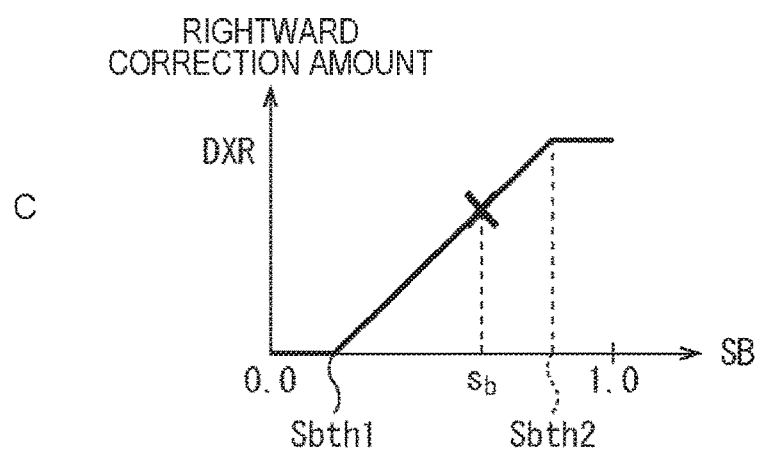
C

FIG. 61
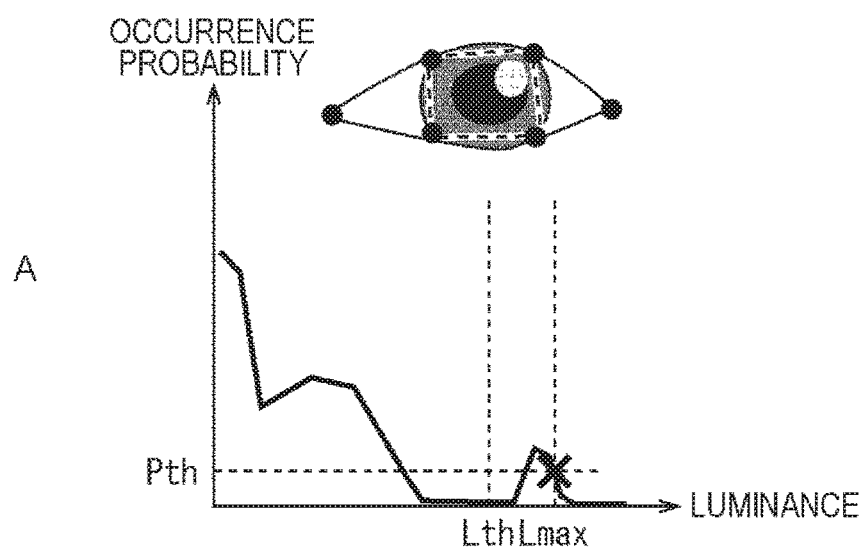
A
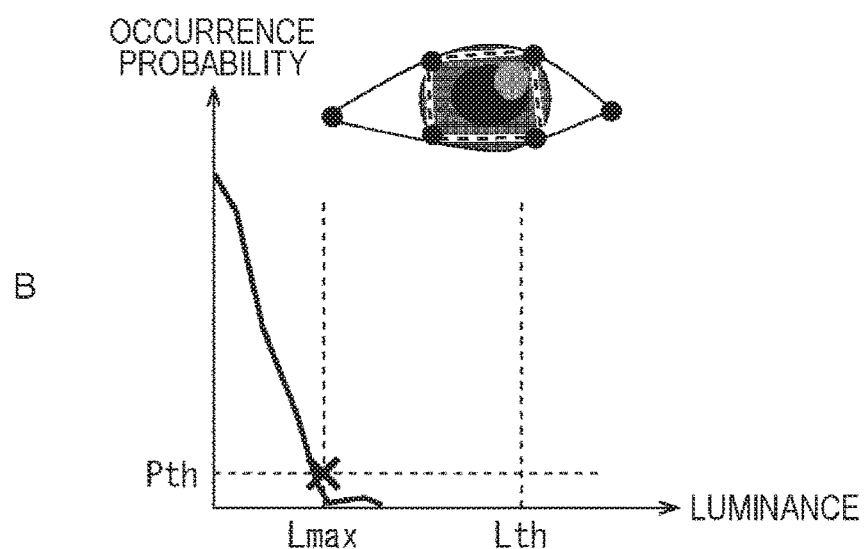
B

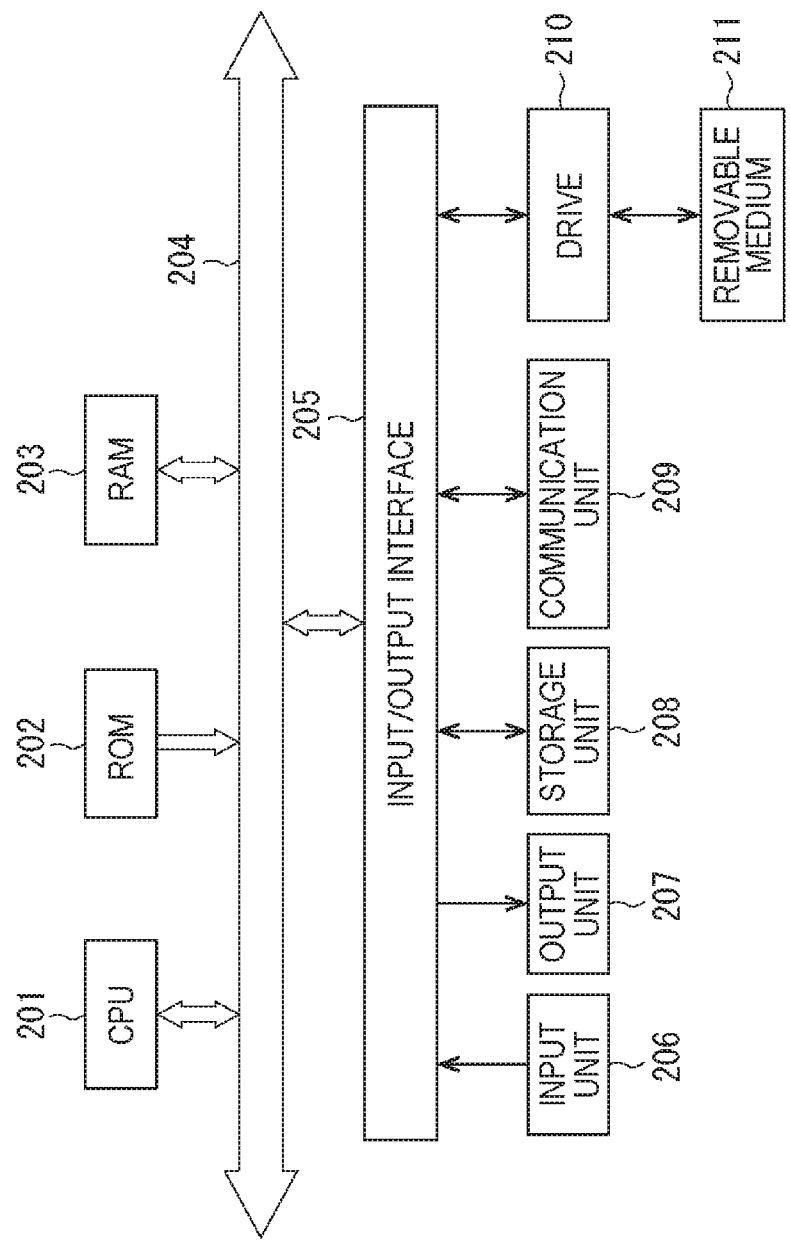

IMAGE PROCESSING DEVICE, IMAGE PROCESSING METHOD, AND TELECOMMUNICATION SYSTEM TO GENERATE AN OUTPUT IMAGE FOR TELECOMMUNICATION

CROSS REFERENCE TO RELATED APPLICATIONS

This application is a U.S. National Phase of International Patent Application No. PCT/JP2018/019953 filed on May 24, 2018, which claims priority benefit of Japanese Patent Application No. JP 2018-003139 filed in the Japan Patent Office on Jan. 12, 2018 and also claims priority benefit of Japanese Patent Application No. JP 2017-112488 filed in the Japan Patent Office on Jun. 7, 2017. Each of the above-referenced applications is hereby incorporated herein by reference in its entirety.

TECHNICAL FIELD

The present disclosure relates to an image processing device, an image processing method, a program, and a telecommunication system, and particularly relates to an image processing device, an image processing method, a program, and a telecommunication system for achieving more realistic telecommunication.

BACKGROUND ART

Telecommunication systems have been conventionally used, in which users located at remote places have conversation as if the users are facing each other. Generally, in a telecommunication system, since arrangement positions of a capture device and a display device are limited, gazes of users cannot be matched, and eye contact may not be established, for example.

Therefore, Patent Document 1 discloses an image generation method of generating a video of an object subjectively viewed from the front using a plurality cameras arranged outside and inside a display (behind a semi-transparent display in the case of the semi-transparent display).

Furthermore, Patent Document 2 discloses image processing for video conference of performing 3D modeling of a face and mapping texture of the face in a state where orientation of a model is rotated to match a gaze, thereby generating a video with a coincident gaze.

CITATION LIST

Patent Document

Patent Document 1: Japanese Patent Application Laid-Open No. 2011-165081
Patent Document 2: Japanese PCT National Publication No. 2015-513833

SUMMARY OF THE INVENTION

Problems to be Solved by the Invention

However, by the technologies disclosed in Patent Documents 1 and 2, in a case of using a large display device, for example, even if image processing is performed using an image obtained by capturing an object by a capture device arranged around the large display device, an unnatural image is assumed. Therefore, achieving more realistic telecommunication such that gazes of users coincide with each other has been difficult.

The present disclosure has been made in view of such a situation, and enables achievement of more realistic telecommunication.

Solutions to Problems

An image processing device according to the first aspect of the present disclosure includes: a high fidelity display region setting unit configured to set a predetermined region including at least an eye region in which an eye of a first user is captured in an image in which the first user is captured, as a high fidelity display region; a high fidelity image generation unit configured to perform first image generation processing using at least a part of a plurality of captured images having the first user respectively captured by a plurality of capture devices arranged outside a display device, and generate a high fidelity image in which the first user looks captured from a virtual capture position that is obtained by setting a viewpoint position of a second user displayed on the display device as the virtual capture position, and the high fidelity image having an appearance with higher fidelity; a low fidelity image generation unit configured to perform second image generation processing using at least a part of the plurality of captured images in each of which the first user is captured, and generate a low fidelity image in which the first user looks captured from the virtual capture position and having lower fidelity than the high fidelity image; and an image superimposing unit configured to superimpose the high fidelity image on the high fidelity display region in the low fidelity image to generate an output image to be output as an image processing result.

An image processing method or a program according to the first aspect of the present disclosure includes the steps of: setting a predetermined region including at least an eye region in which an eye of a first user is captured in an image in which the first user is captured, as a high fidelity display region; performing first image generation processing using at least a part of a plurality of captured images having the first user respectively captured by a plurality of capture devices arranged outside a display device, and generating a high fidelity image in which the first user looks captured from a virtual capture position that is obtained by setting a viewpoint position of a second user displayed on the display device as the virtual capture position, and the high fidelity image having an appearance with higher fidelity; performing second image generation processing using at least a part of the plurality of captured images in each of which the first user is captured, and generating a low fidelity image in which the first user looks captured from the virtual capture position and having lower fidelity than the high fidelity image; and superimposing the high fidelity image on the high fidelity display region in the low fidelity image to generate an output image to be output as an image processing result.

According to the first aspect of the present disclosure, the predetermined region including at least an eye region in which an eye of a first user is captured in an image in which the first user is captured is generated as a high fidelity display region, the first image generation processing is performed using at least a part of a plurality of captured images having the first user respectively captured by a plurality of capture devices arranged outside a display device, and the high fidelity image in which the first user looks captured from a virtual capture position that is obtained by setting a viewpoint position of a second user displayed on the display device as the virtual capture position, and the high fidelity image having an appearance with higher fidelity, is generated, the second image generation processing is performed using at least a part of the plurality of captured images in each of which the first user is captured, and the low fidelity image in which the first user looks captured from the virtual capture position and having lower fidelity than the high fidelity image is generated, and the high fidelity image is superimposed on the high fidelity display region in the low fidelity image to generate an output image to be output as an image processing result.

A telecommunication system according to the second aspect of the present disclosure is configured to have a first user-side telecommunication apparatus and a second user-side telecommunication apparatus connected via a network, the first user-side telecommunication apparatus including a first image processing device including at least a high fidelity display region setting unit configured to set a predetermined region including at least an eye region in which an eye of a first user is captured in an image in which the first user is captured, as a high fidelity display region, a high fidelity image generation unit configured to perform first image generation processing using at least a part of a plurality of captured images having the first user respectively captured by a plurality of capture devices arranged outside a display device, and generate a high fidelity image in which the first user looks captured from a virtual capture position that is obtained by setting a viewpoint position of a second user displayed on the display device as the virtual capture position, and the high fidelity image having an appearance with higher fidelity, a low fidelity image generation unit configured to perform second image generation processing using at least a part of the plurality of captured images in each of which the first user is captured, and generate a low fidelity image in which the first user looks captured from the virtual capture position and having lower fidelity than the high fidelity image, and an image superimposing unit configured to superimpose the high fidelity image on the high fidelity display region in the low fidelity image to generate an output image to be output as an image processing result, and the second user-side telecommunication apparatus including a second image processing device including at least a display image generation unit configured to generate a display image for displaying the first user with a specific size at a specific position from the output image in which the first user is captured on a basis of a viewpoint position of the first user in a three-dimensional space.

In the second aspect of the present disclosure, in the first image processing device included in the first user-side telecommunication apparatus, the predetermined region including at least an eye region in which an eye of a first user is captured in an image in which the first user is captured is generated as a high fidelity display region, the first image generation processing is performed using at least a part of a plurality of captured images having the first user respectively captured by a plurality of capture devices arranged outside a display device, and the high fidelity image in which the first user looks captured from a virtual capture position that is obtained by setting a viewpoint position of a second user displayed on the display device as the virtual capture position, and the high fidelity image having an appearance with higher fidelity, is generated, the second image generation processing is performed using at least a part of the plurality of captured images in each of which the first user is captured, and the low fidelity image in which the first user looks captured from the virtual capture position and having lower fidelity than the high fidelity image is generated, and the high fidelity image is superimposed on the high fidelity display region in the low fidelity image to generate an output image to be output as an image processing result. Meanwhile, in the second image processing device included in the second user-side telecommunication apparatus, the display image for displaying the first user with a specific size at a specific position is generated from the output image in which the first user is captured on the basis of the viewpoint position of the first user in a three-dimensional space.

Effects of the Invention

According to the first and second aspects of the present disclosure, more realistic telecommunication can be achieved.

Note that the effects described here are not necessarily limited, and any of effects described in the present disclosure may be exhibited.

BRIEF DESCRIPTION OF DRAWINGS

FIG. 4 is a diagram illustrating an example of characteristic points of each part of a face on an image.

FIGS. 54A, 54B, and 54C are diagrams illustrating examples of an upward correction amount, a leftward correction amount, and a rightward correction amount.

FIGS. 61A and 61B are diagrams illustrating an example of luminance occurrence probability distribution in the pupil region.

FIG. 67 is a block diagram illustrating a configuration example of an embodiment of a computer to which the present technology is applied.

MODE FOR CARRYING OUT THE INVENTION

Hereinafter, specific embodiments to which the present technology is applied will be described in detail with reference to the drawings.

<Configuration Example of Telecommunication System>

Figure 1:
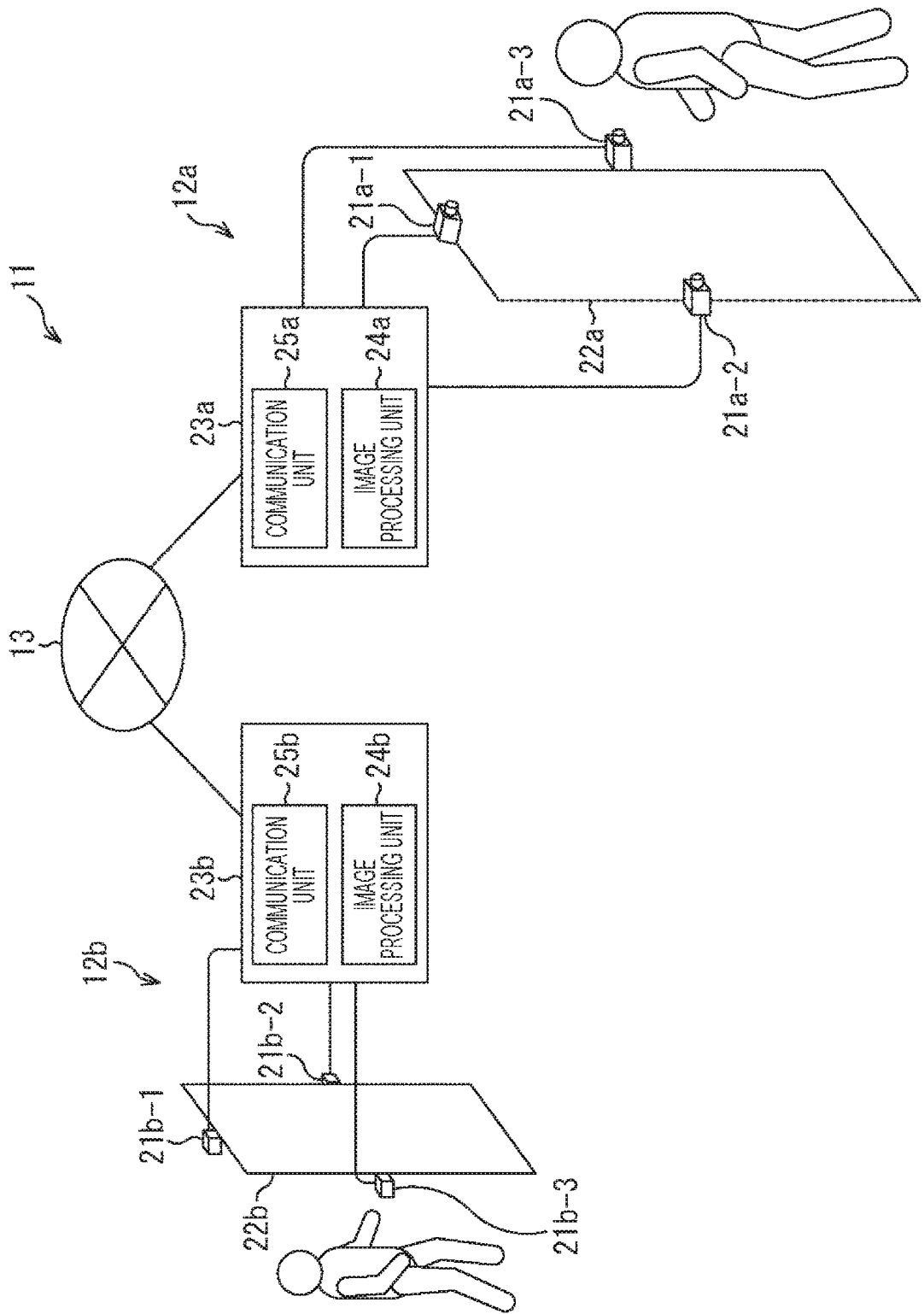
FIG. 1 is a diagram illustrating a configuration example of an embodiment of a telecommunication system to which the present technology is applied.

FIG. 1 is a diagram illustrating a configuration example of an embodiment of a telecommunication system to which the present technology is applied.

As illustrated in FIG. 1, a telecommunication system 11 is configured such that two telecommunication apparatuses 12a and 12b are connected via a network 13 such as the Internet.

For example, the telecommunication system 11 can provide a telecommunication service in which a user of the telecommunication apparatus 12a and a user of the telecommunication apparatus 12b can perform interactive communication. Note that, hereinafter, the user who performs telecommunication using the telecommunication apparatus 12a is also referred to as a principal user, and the user of the telecommunication apparatus 12b, who is the other party to perform telecommunication with the principal user, is also referred to as the other party's user, as appropriate.

The telecommunication apparatus 12a includes a plurality of capture devices 21a, a display device 22a, and an information processing device 23a. The information processing device 23a includes an image processing unit 24a and a communication unit 25a.

In FIG. 1, the telecommunication apparatus 12a includes three capture devices 21a-1 to 21a-3. The capture device 21a-1 is arranged above the display device 22a, and the capture device 21a-2 is arranged on a left side of the display device 22a, and the capture device 21a-3 is arranged on a right side of the display device 22a. Note that the number of the capture devices 21a is not limited to three, and may be two or four or more, and the arrangement of the capture devices 21a is not limited to the example illustrated in FIG. 1. Furthermore, hereinafter, a state in which the three capture devices 21a-1 to 21a-3 capture a user standing alone in front of the display device 22a as an object will be described.

Each of the capture devices 21a-1 to 21a-3 includes an imaging element such as a complementary metal oxide semiconductor (CMOS) image sensor, for example, and the capture devices 21a-1 to 21a-3 capture the user as the object and supply obtained three captured images to the information processing device 23a. Note that, hereinafter, the capture devices 21a-1 to 21a-3 will be simply referred to as "capture devices 21a" as appropriate unless distinguishing the capture devices 21a-1 to 21a-3 is required.

The display device 22a includes, for example, a display device such as a liquid crystal panel or an organic electro luminescence (EL) panel, and displays an image transmitted from the telecommunication apparatus 12b as a life size of the user of the telecommunication apparatus 12b captured in the image.

The information processing device 23a can be configured by, for example, a computer including a central processing unit (CPU), a read only memory (ROM), a random access memory (RAM), and the like. Then, when the information processing device 23a executes an application for realizing telecommunication, the image processing unit 24a performs image processing and the communication unit 25a performs communication processing.

The image processing unit 24a performs image processing of causing the principal user to recognize that a gaze of the principal user coincides with a gaze of the other party's user displayed on the display device 22a in a pseudo manner. For example, the image processing unit 24a performs the image processing of generating an image as if the principal user is captured from a virtual viewpoint set at a position of an eye of the other party's user displayed on the display device 22a (hereinafter, the image will be referred to as a pseudo gaze coincidence image), using the three captured images supplied from the capture devices 21a-1 to 21a-3. Furthermore, when displaying a pseudo gaze coincidence image in which the other party's user is captured, the image processing unit 24a performs the image processing of displaying the other party's user with a size at a position (at a height of an eye) where the other party's user is displayed in a life-size manner and displays the other party's user on the display device 22a.

The communication unit 25a can perform communication via the network 13. For example, the communication unit 25a transmits a coded stream output from the image processing unit 24a to the telecommunication apparatus 12b, receives a coded stream transmitted from the telecommunication apparatus 12b, and supplies the coded stream to the image processing unit 24a.

The telecommunication apparatus 12a configured as described above can generate the pseudo gaze coincidence image as if the principal user is captured from the viewpoint of the other party's user set on the display device 22a, using the captured images of the principal user captured by the capture devices 21a-1 to 21a-3. Furthermore, the telecommunication apparatus 12a can display the other party's user with the size at the position for life size, using the pseudo gaze coincidence image transmitted from the telecommunication apparatus 12b. Similarly, the telecommunication apparatus 12b can generate a pseudo gaze coincidence image in which the principal user is captured, and display a pseudo gaze coincidence image in which the other party's user is captured.

Therefore, the users using the telecommunication system 11 can perform telecommunication in a state where the user turns the gaze toward the eyes of the other party displayed in a life size manner and the mutual gazes coincide with each other. Thereby, the users can perform more realistic communication by the telecommunication system 11.

Note that the telecommunication apparatus 12b is similarly configured to the telecommunication apparatus 12a. Hereinafter, the configuration of the telecommunication apparatus 12a will be described and description of the configuration of the telecommunication apparatus 12b is omitted. Furthermore, the telecommunication apparatuses 12a and 12b will be referred to as telecommunication apparatuses 12 unless distinguishing the telecommunication apparatuses 12 is required, and the respective constituent elements will also be referred to in a similar manner.

<First Configuration Example of Image Processing Unit>

A first configuration example of the image processing unit 24 will be described with reference to FIGS. 2, 3, 4, 5, 6, 7A, 7B, 8, 9, 10, 11, 12A, 12B, 13A, 13B, 14A, 14B, 15A, 15B, 16, 17, 18, and 19.

Figure 2:
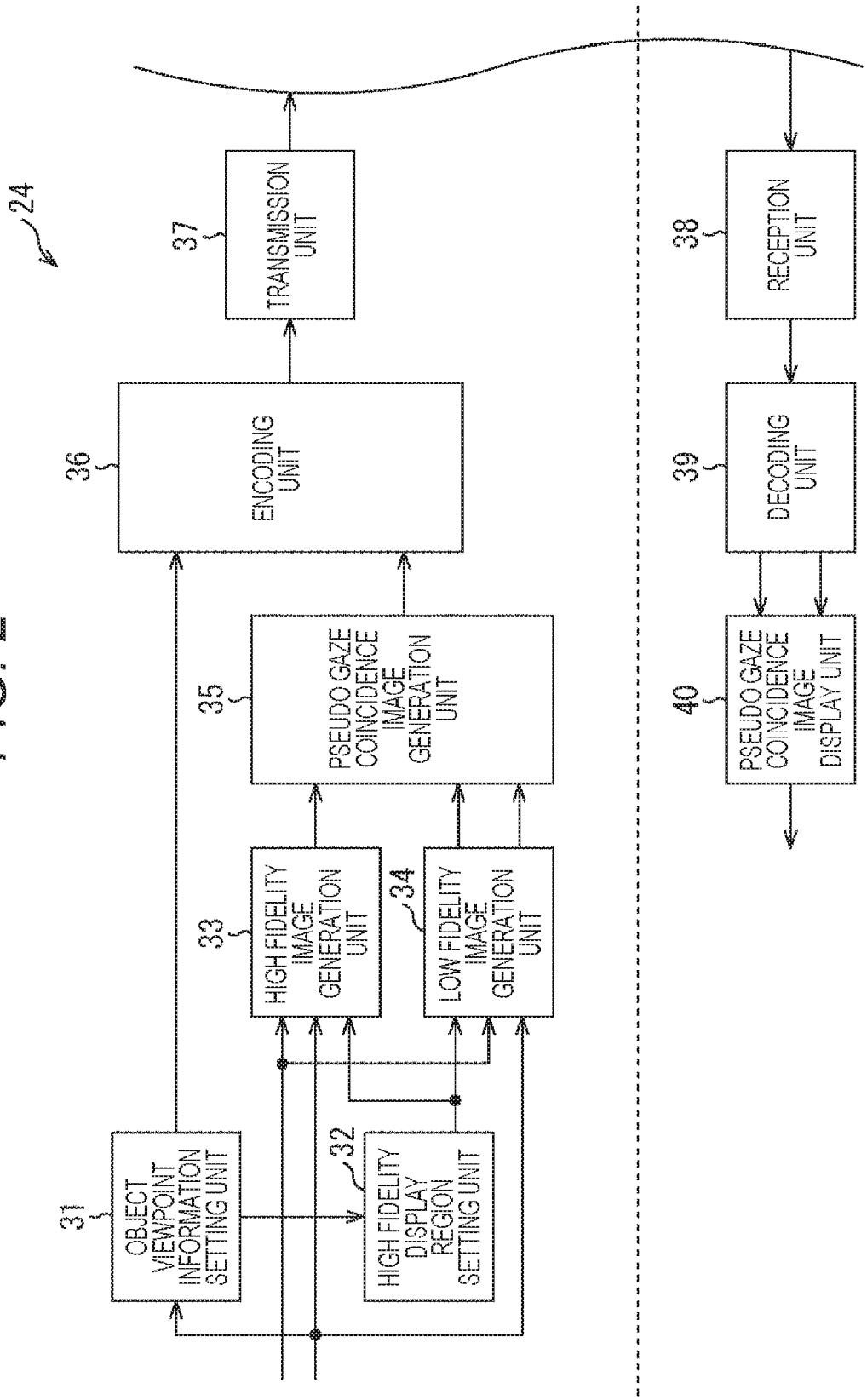
FIG. 2 is a block diagram illustrating a first configuration example of an image processing unit.

FIG. 2 is a block diagram illustrating a first configuration example of the image processing unit 24.

As illustrated in FIG. 2, the image processing unit 24 includes an object viewpoint information setting unit 31, a high fidelity display region setting unit 32, a high fidelity image generation unit 33, a low fidelity image generation unit 34, a pseudo gaze coincidence image generation unit 35, an encoding unit 36, a transmission unit 37, a reception unit 38, a decoding unit 39, and a pseudo gaze coincidence image display unit 40.

Furthermore, in the image processing unit 24 illustrated in FIG. 2, the blocks arranged above the broken line apply image processing of generating the pseudo gaze coincidence image as if the gaze of the principal user looks at the eyes of the other party's user as viewed from the other party's user, using a plurality images in which the principal user is captured. On the other hand, in the image processing unit 24 illustrated in FIG. 2, the blocks arranged below the broken line apply image processing of displaying the pseudo gaze coincidence image in which the other party's user is captured in such a manner that the gaze of the other party's user looks at the principal user as viewed from the viewpoint of the principal user.

Furthermore, an input capture signal in which the captured images obtained by capturing the principal user from three directions by the capture devices 21-1 to 21-3 in FIG. 1, and a signal indicating, for example, depth information indicating a distance in a depth direction detected by a depth sensor (not illustrated) are multiplexed is input to the image processing unit 24. The input capture signal is supplied to the object viewpoint information setting unit 31, the high fidelity image generation unit 33, and the low fidelity image generation unit 34.

Moreover, object viewpoint information that is information indicating the viewpoint position of the user in a three-dimensional space and is decoded object viewpoint information that is decoded after object viewpoint information of the other party's user is encoded and transmitted is input to the image processing unit 24. The decoded object viewpoint information is supplied to the high fidelity image generation unit 33 and the low fidelity image generation unit 34.

The object viewpoint information setting unit 31 analyzes the face of the principal user to be captured by the capture devices 21 on the basis of the three captured images and the depth information obtained from the input capture signal. Thereby, the object viewpoint information setting unit 31 acquires analysis information including coordinates indicating characteristic points of parts of the face on the images, and supplies the analysis information to the high fidelity display region setting unit 32. Moreover, the object viewpoint information setting unit 31 obtains the viewpoint position of the principal user in the three-dimensional space on the basis of the three captured images and the depth information obtained from the input capture signal, acquires the object viewpoint information indicating the viewpoint position, and supplies the object viewpoint information to the encoding unit 36. For example, the object viewpoint information is used when the other party's image processing unit 24 generates a pseudo gaze coincidence display image from the pseudo gaze coincidence image in which the principal user is captured. Note that detailed processing in the object viewpoint information setting unit 31 will be described with reference to FIGS. 3 to 5.

The high fidelity display region setting unit 32 sets a high fidelity display region to serve as a region where a high fidelity image to be described below is displayed, of a region where the face of the principal user is captured in the pseudo gaze coincidence image, on the basis of the analysis information supplied from the object viewpoint information setting unit 31. Then, the high fidelity display region setting unit 32 supplies high fidelity display region information indicating the high fidelity display region to the high fidelity image generation unit 33 and the low fidelity image generation unit 34. Note that detailed processing in the high fidelity display region setting unit 32 will be described below with reference to FIGS. 6, 7A and 7B.

The high fidelity image generation unit 33 generates a high fidelity image in which the principal user looks captured from a virtual capture position that is obtained by setting the viewpoint position of the other party's user indicated by the decoded object viewpoint information as the virtual capture position, and the high fidelity image having an appearance with higher fidelity. For example, the high fidelity image generation unit 33 can generate a high fidelity image that reproduces how the user looks from the virtual capture position at a high level by using a viewpoint interpolation technology or the like for at least a part of the three captured images captured by the capture devices 21-1 to 21-3. At this time, the high fidelity image generation unit 33 generates the high fidelity image, limiting the display region to the high fidelity display region indicated by the high fidelity display region information supplied from the high fidelity display region setting unit 32. Then, the high fidelity image generation unit 33 supplies the generated high fidelity image to the pseudo gaze coincidence image generation unit 35. Note that detailed processing in the high fidelity image generation unit 33 will be described below with reference to FIGS. 8 to 10.

The low fidelity image generation unit 34 generates a low fidelity image in which the principal user looks captured from a virtual capture position that is obtained by setting the viewpoint position of the other party's user indicated by the decoded object viewpoint information, and the low fidelity image with lower fidelity than the high fidelity image. For example, the low fidelity image generation unit 34 can generate a low fidelity image that reproduces how the user looks from the virtual capture position at a certain level by performing projective transformation for at least a part of the three captured images captured by the capture devices 21-1 to 21-3.

Moreover, the low fidelity image generation unit 34 applies correction for reflecting an influence of the projective transformation of when generating the low fidelity image to the high fidelity display region indicated by the high fidelity display region information supplied from the high fidelity display region setting unit 32. Then, the low fidelity image generation unit 34 supplies corrected high fidelity display region information indicating the high fidelity display region to which the correction has been applied to the pseudo gaze coincidence image generation unit 35 together with the generated low fidelity image. Note that detailed processing in the low fidelity image generation unit 34 will be described below with reference to FIGS. 11, 12A, 12B, 13A, 13B, 14A, 14B, 15A, and 15B.

The pseudo gaze coincidence image generation unit 35 superimposes the high fidelity image supplied from the high fidelity image generation unit 33 on the low fidelity image supplied from the low fidelity image generation unit 34 in the corrected high fidelity display region indicated by the corrected high fidelity display region information. Thereby, the pseudo gaze coincidence image generation unit 35 can generate the pseudo gaze coincidence image in which the mutual gazes coincide with each other in a pseudo manner as if the gaze of the principal user looks at the eyes of the other party's user as viewed from the virtual capture position, and supply the pseudo gaze coincidence image to the encoding unit 36.

The encoding unit 36 encodes the object viewpoint information of the principal user supplied from the object viewpoint information setting unit 31 and the pseudo gaze coincidence image supplied from the pseudo gaze coincidence image generation unit 35. Thereby, the encoding unit 36 generates a coded stream in which the object viewpoint information and the pseudo gaze coincidence image are encoded and supplies the coded stream to the transmission unit 37.

The transmission unit 37 outputs the coded stream supplied from the encoding unit 36 to the communication unit 25 as a transmission stream to be transmitted via the network 13 in FIG. 1, and the communication unit 25 transmits the transmission stream to the other party's telecommunication apparatus 12. At this time, the transmission unit 37 can multiplex a separately coded audio stream with the coded stream supplied from the encoding unit 36 and output the multiplexed coded stream as a transmission stream.

The reception unit 38 receives the transmission stream transmitted from the other party's telecommunication apparatus 12 via the network 13 in FIG. 1, returns the transmission stream to the coded stream, and supplies the coded stream to the decoding unit 39. At this time, in the case where the audio stream is multiplexed with the received transmission stream, the reception unit 38 inversely multiplexes the transmission stream into the audio stream and the coded stream, and outputs the coded stream to the decoding unit 39.

The decoding unit 39 supplies the decoded object viewpoint information and decoded pseudo gaze coincidence image obtained by decoding the coded stream supplied from the reception unit 38 to the pseudo gaze coincidence image display unit 40. Here, the decoded object viewpoint information is the object viewpoint information indicating the viewpoint position of the other party's user, and the decoded pseudo gaze coincidence image is the pseudo gaze coincidence image in which the other party's user is captured.

The pseudo gaze coincidence image display unit 40 generates the pseudo gaze coincidence display image for displaying the other party's user with the size at the position for life size on the display device 22, for example, on the basis of the decoded object viewpoint information and the decoded pseudo gaze coincidence image supplied from the decoding unit 39. Then, the pseudo gaze coincidence image display unit 40 outputs the generated pseudo gaze coincidence display image to the display device 22.

Figure 3:
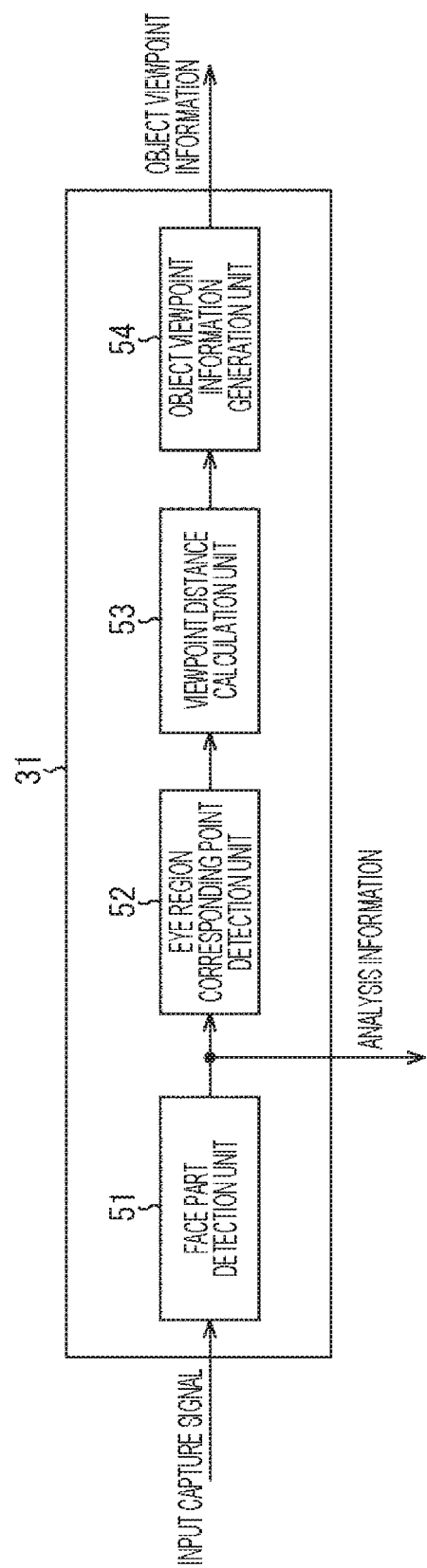
FIG. 3 is a block diagram illustrating a configuration example of an object viewpoint information setting unit in FIG. 2.

FIG. 3 is a block diagram illustrating a configuration example of the object viewpoint information setting unit 31 in FIG. 2.

As illustrated in FIG. 3, the object viewpoint information setting unit 31 includes a face part detection unit 51, an eye region corresponding point detection unit 52, a viewpoint distance calculation unit 53, and an object viewpoint information generation unit 54.

The face part detection unit 51 performs face part detection (facial landmark detection) for the three captured images captured by the capture devices 21-1 to 21-3. For example, the face part detection unit 51 performs the face part detection using a technology disclosed in the non-patent document "One Millisecond Face Alignment with an Ensemble of Regression Trees" by Vahid Kazemi and Josephine Sullivan, CVPR 2014", or the like. Thereby, the face part detection unit 51 can obtain the coordinates indicating the characteristic points of parts of the face included in the captured images, and outputs the coordinates as the analysis information to the high fidelity display region setting unit 32 in FIG. 2 and supplies them to the eye region corresponding point detection unit 52.

Figure 4:
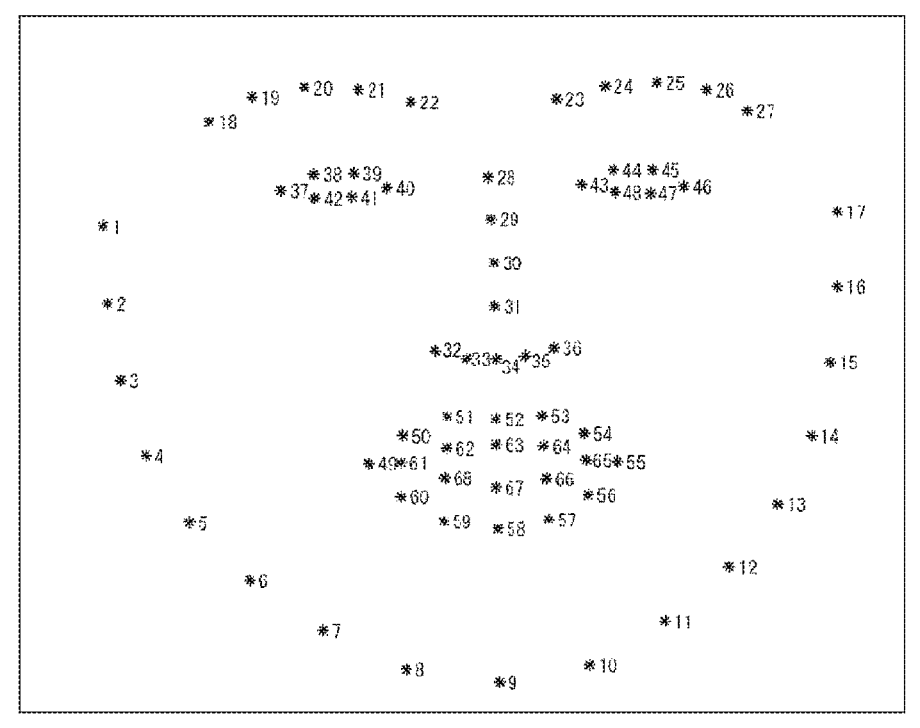

Here, FIG. 4 illustrates an example of the analysis information obtained by the face part detection unit 51. In the analysis information illustrated in FIG. 4, sixty eight characteristic points are arranged for the eyes, nose, mouth, eyebrows, and face contour detected as the face parts.

The eye region corresponding point detection unit 52 extracts the characteristic points arranged for regions of the eyes from the analysis information supplied from the face part detection unit 51, and detects, for the characteristic points, corresponding points corresponding among the three images captured by the capture devices 21-1 to 21-3. Specifically, the eye region corresponding point detection unit 52 detects the characteristic points with the same numbers given among the three images as the corresponding points from among the characteristic points (37th to 48th characteristic points, or 28th characteristic point may be added to the 37th to 48th characteristic points) in the regions of the eyes illustrated in FIG. 4. Furthermore, the eye region corresponding point detection unit 52 may detect the corresponding points for part of the characteristic points, for example, in addition to detecting the corresponding points for all the characteristic points of the regions of the eyes.

Figure 5:
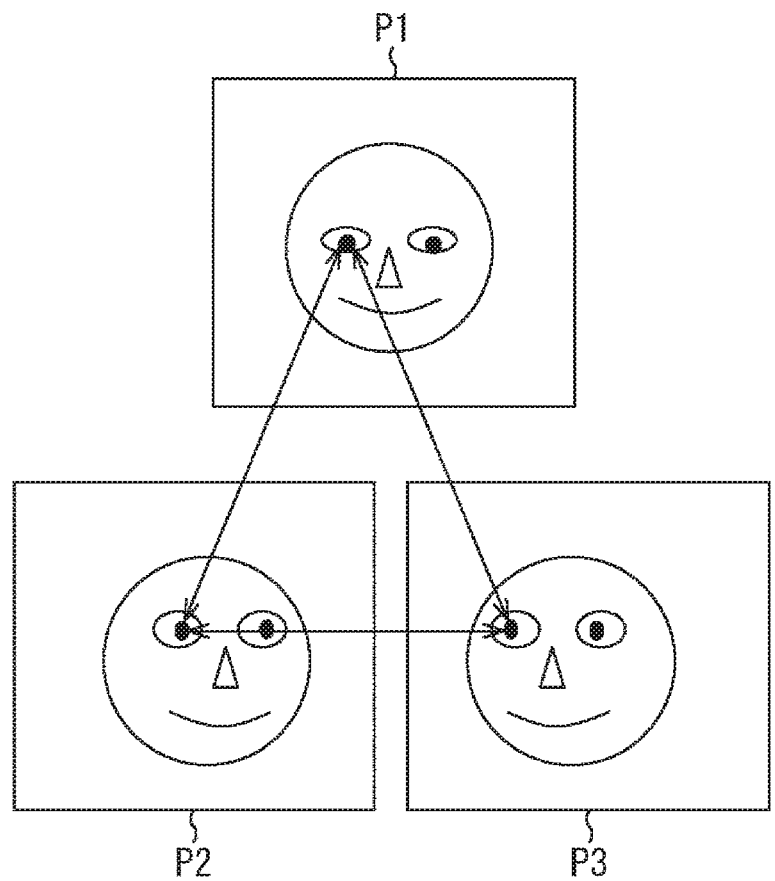
FIG. 5 is a diagram for describing corresponding points of three captured images.

For example, FIG. 5 illustrates an example in which the eye region corresponding point detection unit 52 detects the characteristic points arranged for a right eye as the corresponding points. As illustrated, the characteristic points arranged for the right eye are detected as the corresponding points among a captured image P1 captured by the capture device 21-1, a captured image P2 captured by the captured image 21-2, and a captured image P3 captured by the capture device 21-3.

The viewpoint distance calculation unit 53 calculates a distance to an eye of the object as a viewpoint distance on the basis of the corresponding points detected by the eye region corresponding point detection unit 52. For example, the viewpoint distance calculation unit 53 corrects the capture devices 21 to a parallelized state as needed and uses the principle of triangulation, thereby obtaining the viewpoint distance. Furthermore, the viewpoint distance calculation unit 53 may calculate the viewpoint distance using only the corresponding points detected from two captured images, of the three captured images captured by the capture devices 21-1 to 21-3. Note that the viewpoint distance calculation unit 53 may calculate the viewpoint distance using all the corresponding points detected from the three captured images, using a plane sweep technique or the like.

The object viewpoint information generation unit 54 transforms the viewpoint distance calculated by the viewpoint distance calculation unit 53 into a coordinate value of a world coordinate system, generates the object viewpoint information indicating the viewpoint position of the object, and outputs the object viewpoint information.

Figure 6:
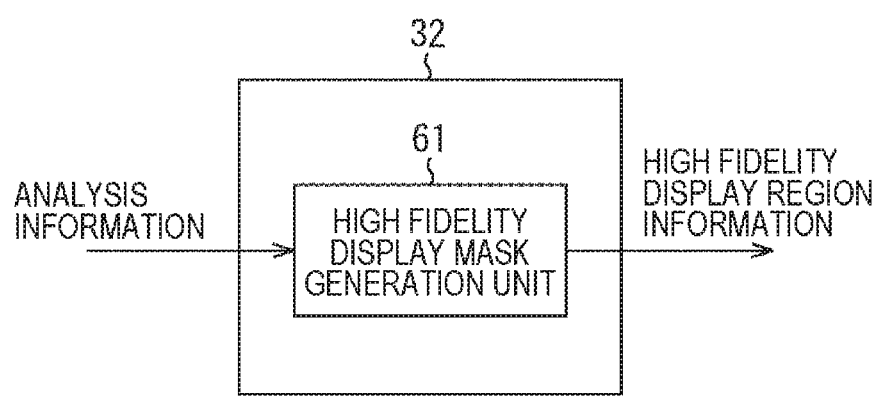
FIG. 6 is a block diagram illustrating a configuration example of a high fidelity display region setting unit in FIG. 2.

FIG. 6 is a block diagram illustrating a configuration example of the high fidelity display region setting unit 32 in FIG. 2.

As illustrated in FIG. 6, the high fidelity display region setting unit 32 includes a high fidelity display mask generation unit 61.

The analysis information output from the object viewpoint information setting unit 31 is supplied to the high fidelity display mask generation unit 61. The high fidelity display mask generation unit 61 generates a mask image for specifying the high fidelity display region that serves as the region for displaying the high fidelity image generated by the high fidelity image generation unit 33, in the pseudo gaze coincidence image generated by the pseudo gaze coincidence image generation unit 35, on the basis of the analysis information. Then, the high fidelity display mask generation unit 61 outputs the mask image for specifying the high fidelity display region as the high fidelity display region information.

Figure 7:
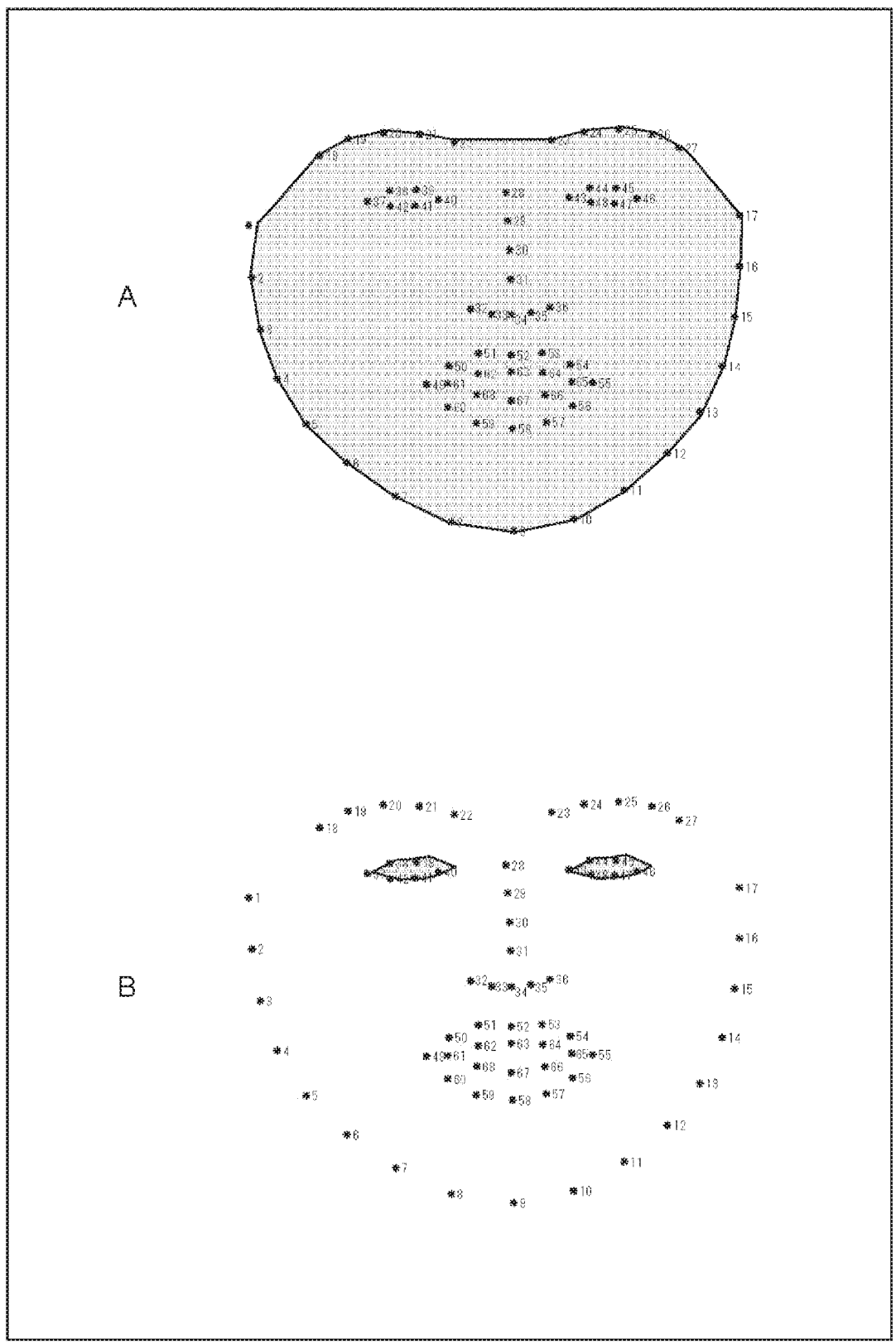
FIGS. 7A and 7B are diagrams for describing a mask image for specifying a high fidelity display region in FIG. 2.

For example, as illustrated in FIG. 7A, the high fidelity display mask generation unit 61 can generate a polygon involving all the characteristic points included in the analysis information, in other words, a polygon covering all the face parts as the mask image indicating the high fidelity display region. Furthermore, as illustrated in FIG. 7B, the high fidelity display mask generation unit 61 may generate a polygon covering the region of the eyes, limiting the characteristic points to only the characteristic points arranged in the eyes, of the characteristic points included in the analysis information, as the mask image indicating the high fidelity display region. In addition, the high fidelity display mask generation unit 61 may generate a predetermined region other than the above-described regions and including at least an eye region in which the eyes of the principal user are captured, as the mask image indicating the high fidelity display region. Note that the mask image may be a binary image or an image with continuous tone.

Figure 8:
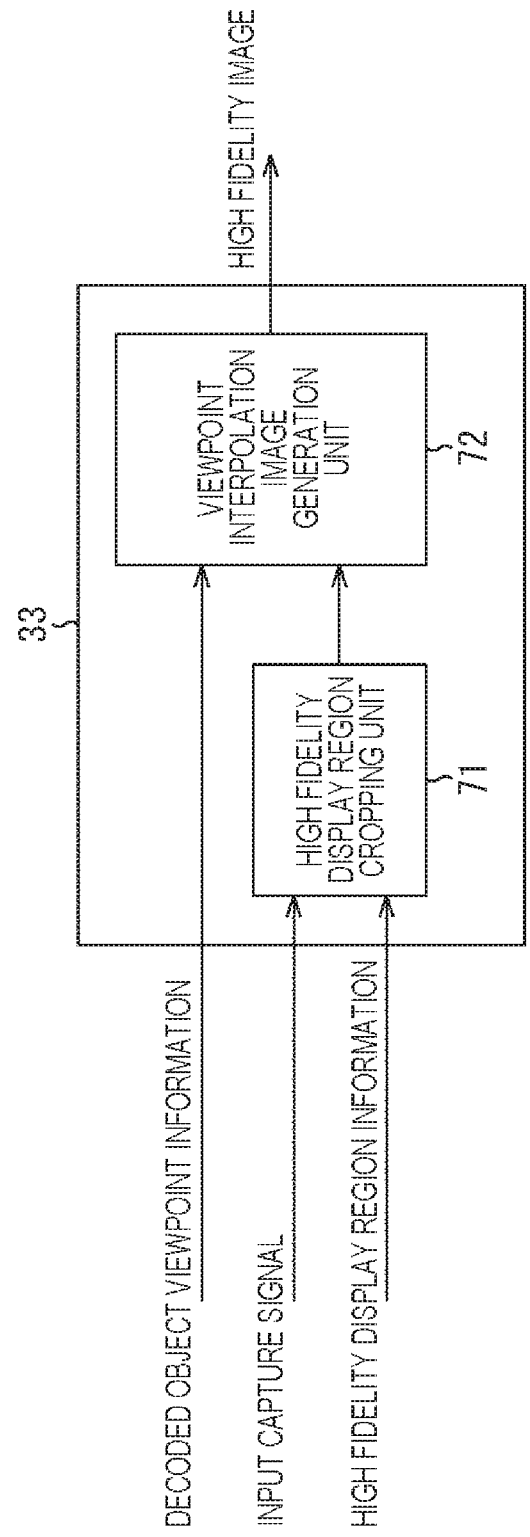
FIG. 8 is a block diagram illustrating a configuration example of a high fidelity image generation unit in FIG. 2.

FIG. 8 is a block diagram illustrating a configuration example of the high fidelity image generation unit 33 in FIG. 2

As illustrated in FIG. 8, the high fidelity image generation unit 33 includes a high fidelity display region cropping unit 71 and a viewpoint interpolation image generation unit 72.

The high fidelity display region cropping unit 71 crops a portion corresponding to the high fidelity display region (mask image) indicated by the high fidelity display region information from the three captured images captured by the capture devices 21-1 to 21-3. Then, the high fidelity display region cropping unit 71 supplies three images respectively cropped from the three captured images to the viewpoint interpolation image generation unit 72.

Figure 9:
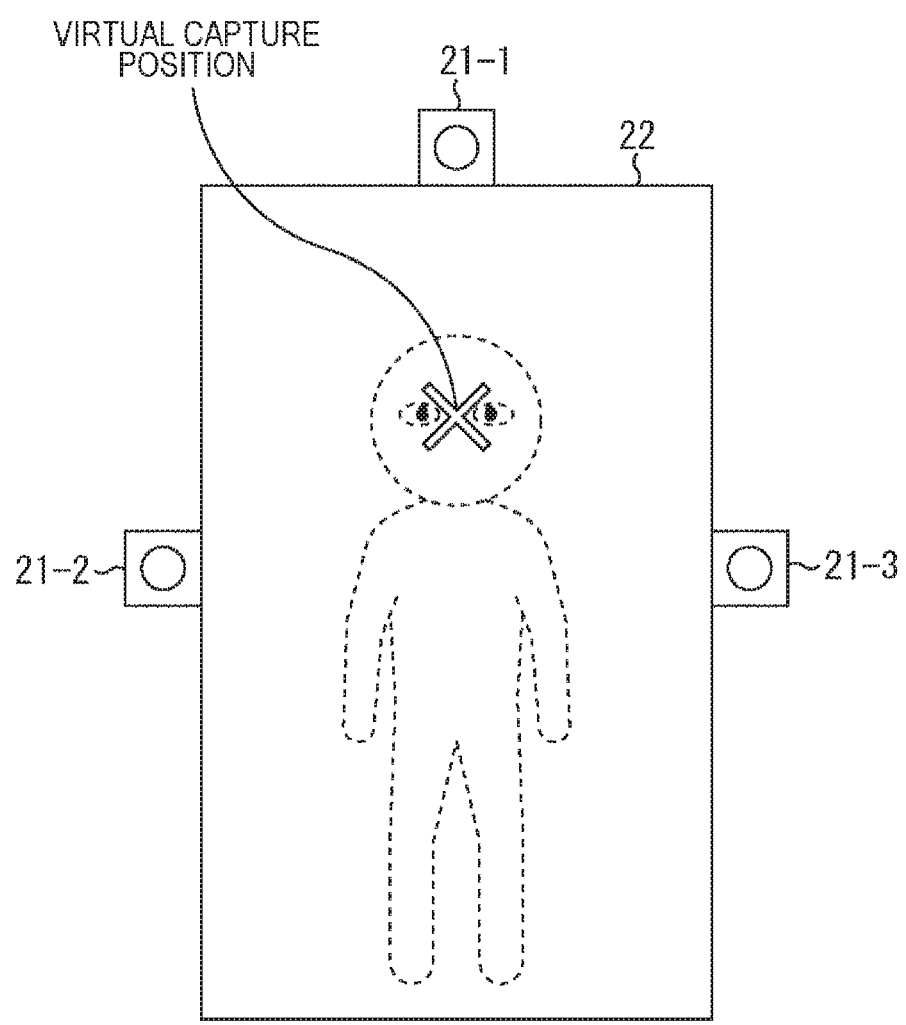
FIG. 9 is a diagram illustrating an example of a virtual capture position.

The viewpoint interpolation image generation unit 72 first sets the positions of the eyes of when displaying the other party's user with a life size as the virtual capture position according to the viewpoint position of the other party's user in the three-dimensional real space indicated by the decoded object viewpoint information. For example, FIG. 9 illustrates the other party's user displayed with the life size on the display device 22 in FIG. 1 with the broken line, and the viewpoint interpolation image generation unit 72 sets the virtual capture position to a midpoint of both eyes of the other party's user.

Next, the viewpoint interpolation image generation unit 72 applies viewpoint interpolation processing of interpolating the three images cropped as the high fidelity display region by the high fidelity display region cropping unit 71 to generate a viewpoint interpolation image as if the principal user is viewed from the virtual capture position, and outputs the viewpoint interpolation image as the high fidelity image.

Figure 10:
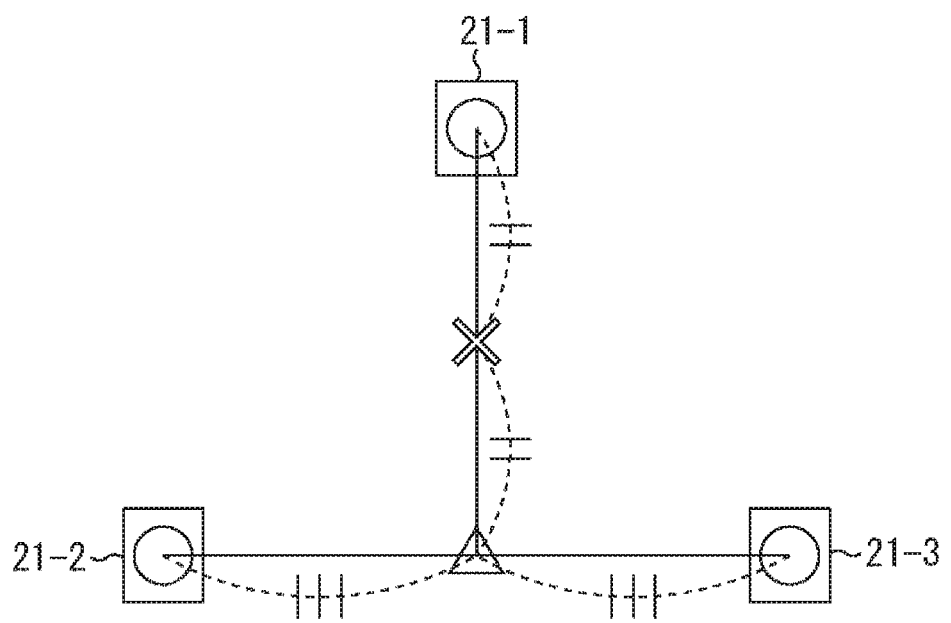
FIG. 10 is a diagram for describing viewpoint interpolation processing.

Here, the viewpoint interpolation processing performed setting the virtual capture position at a midpoint (a point indicated with the cross mark) between a midpoint (a point indicated with the triangle mark) between the capture devices 21-2 and 21-3 arranged right and left, and the capture device 21-1 arranged above the capture devices 21-2 and 21-3, as illustrated in FIG. 10, will be described.

At this time, the viewpoint interpolation image generation unit 72 generates a virtual viewpoint intermediate image that is an interpolation image in a horizontal direction of the position of the triangle mark from the two captured images captured by the capture devices 21-2 and 21-3 such that the degrees of influence from the two captured images equally affect the virtual viewpoint intermediate image. Then, the viewpoint interpolation image generation unit 72 generates an interpolation image in a vertical direction such that the degrees of influence from the virtual viewpoint intermediate image and the captured image captured by the capture device 21-1 equally affect the interpolation image. The interpolation image generated in this manner is a viewpoint interpolation image viewed from the virtual capture position (the point indicated by the cross mark) illustrated in FIG. 10, in other words, the high fidelity image.

Figure 11:
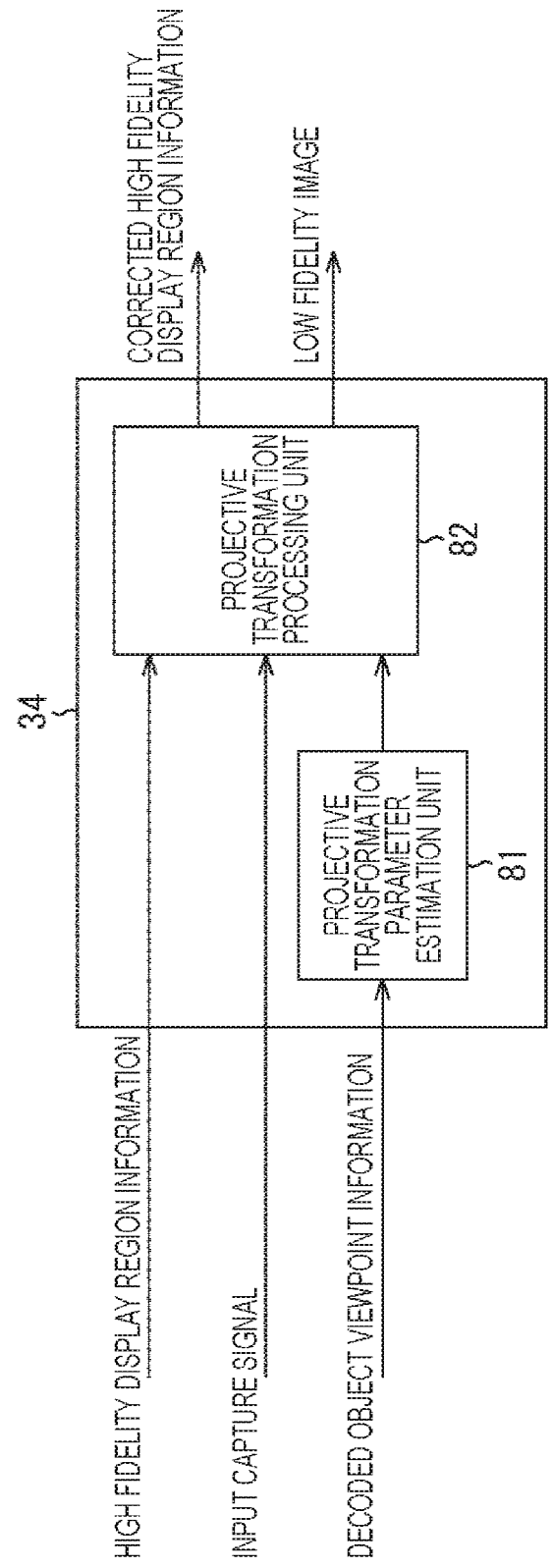
FIG. 11 is a block diagram illustrating a configuration example of a low fidelity image generation unit in FIG. 2.

FIG. 11 is a block diagram illustrating a configuration example of the low fidelity image generation unit 34 in FIG. 2.

As illustrated in FIG. 11, the low fidelity image generation unit 34 includes a projective transformation parameter estimation unit 81 and a projective transformation processing unit 82.

The projective transformation parameter estimation unit 81 estimates a parameter for performing projective transformation to make an image close to an image viewed from the virtual capture position according to the viewpoint position of the other party's user in the three-dimensional real space indicated by the decoded object viewpoint information. Then, the projective transformation parameter estimation unit 81 supplies a projective transformation parameter indicating the estimated parameter to the projective transformation processing unit 82.

The projective transformation processing unit 82 applies projective transformation using the parameter indicated by the projective transformation parameter supplied from the projective transformation parameter estimation unit 81 to the captured image captured by the capture device 21a-1 to generate a low fidelity image. Moreover, the projective transformation processing unit 82 applies projective transformation using the parameter used to generate the low fidelity image to the mask image (see FIGS. 7A and 7B) that is the high fidelity display region indicated by the high fidelity display region information supplied from the high fidelity display region setting unit 32. Thereby, the projective transformation processing unit 82 corrects the mask image to correspond to the low fidelity image, and sets the mask image as corrected high fidelity display region information. Then, the projective transformation processing unit 82 outputs the low fidelity image and the corrected high fidelity display region information.

Here, processing of generating the low fidelity image using the captured image of the capture device 21-1 arranged above the display device 22, of the three captured images obtained from the input capture signal input to the low fidelity image generation unit 34, will be described.

Figure 12:
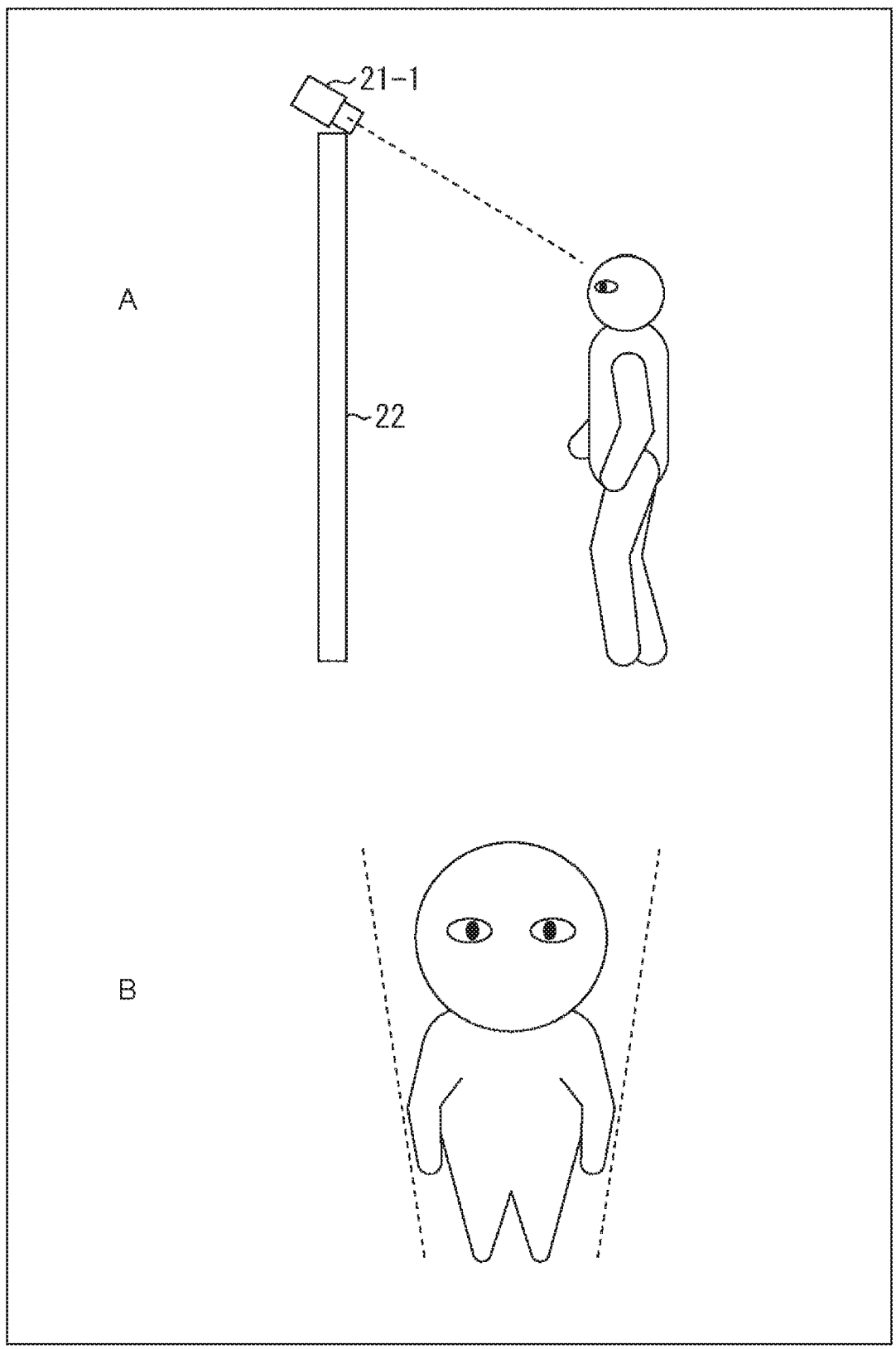
FIGS. 12A and 12B are diagrams for describing a person image having an object captured by a capture device arranged on an upper side.

For example, in a state where the object stands in front of the display device 22, as illustrated in FIG. 12A, and when the object is assumed to be an object approximate plane approximating a planar plate without having a thickness in the depth direction, geometric correction is realized by projective transformation. FIG. 12B illustrates a schematic diagram of a person image obtained by capturing the object by the capture device 21-1.

Figure 13:
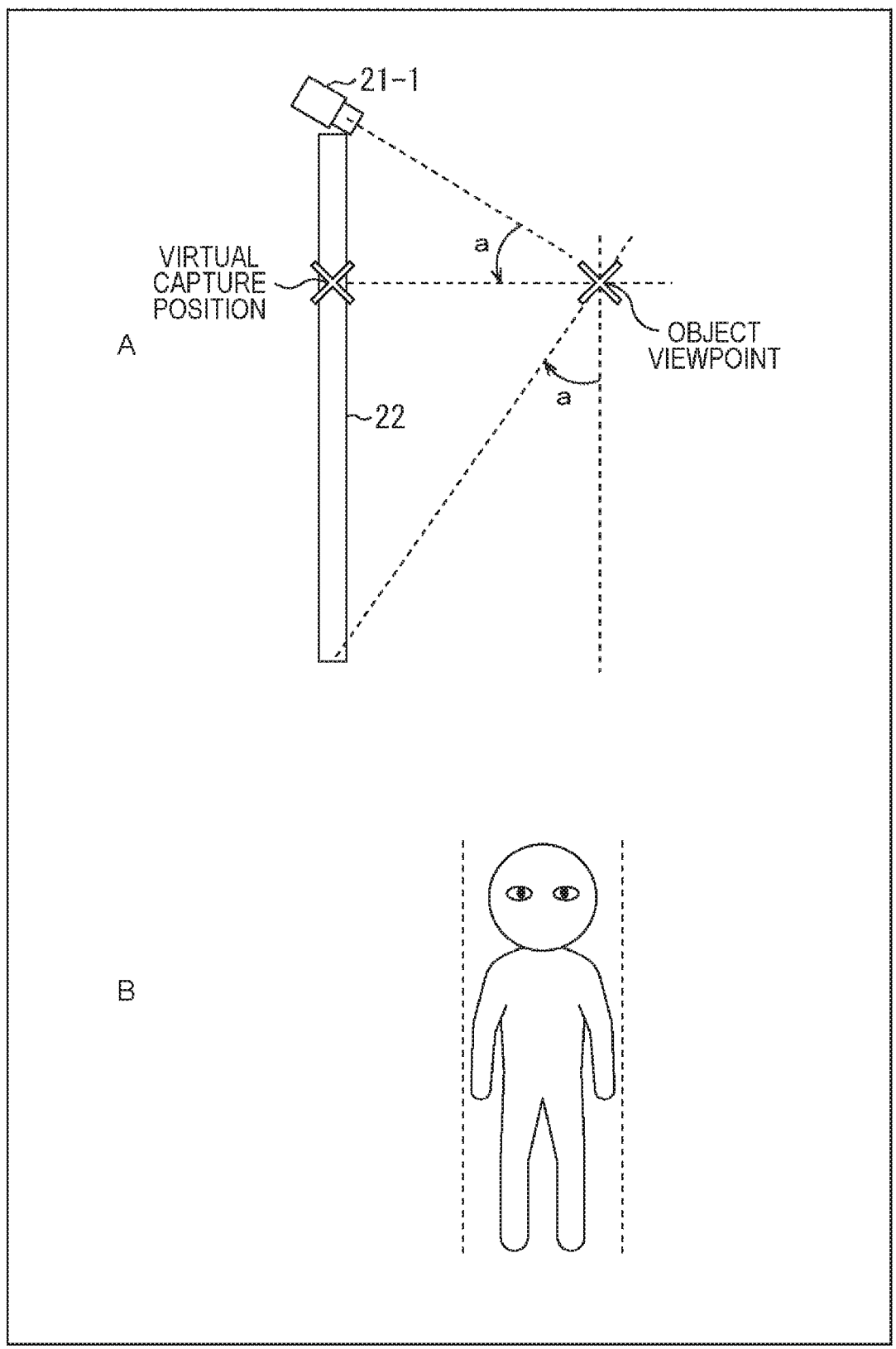
FIGS. 13A and 13B are diagrams for describing projective transformation in a case where a virtual capture position is at the same height as an object viewpoint.

First, projective transformation in a case where the virtual capture position is at the same height as the object viewpoint will be described with reference to FIGS. 13A and 13B. In this case, as illustrated in FIG. 13A, only required is to estimate a parameter of projective transformation for projecting a state in which the object approximate plane is rotated to have a lower side of the object approximation plane moved forward at an angle a that is the same as an angle a made by a straight line connecting the capture device 21-1 and the object viewpoint and a straight line connecting the virtual capture position and the object viewpoint. Then, when the projective transformation is performed for the object approximate plane using such a parameter, a low fidelity image close to an image in which the object is viewed from the front can be generated, as illustrated in FIG. 13B.

Figure 14:
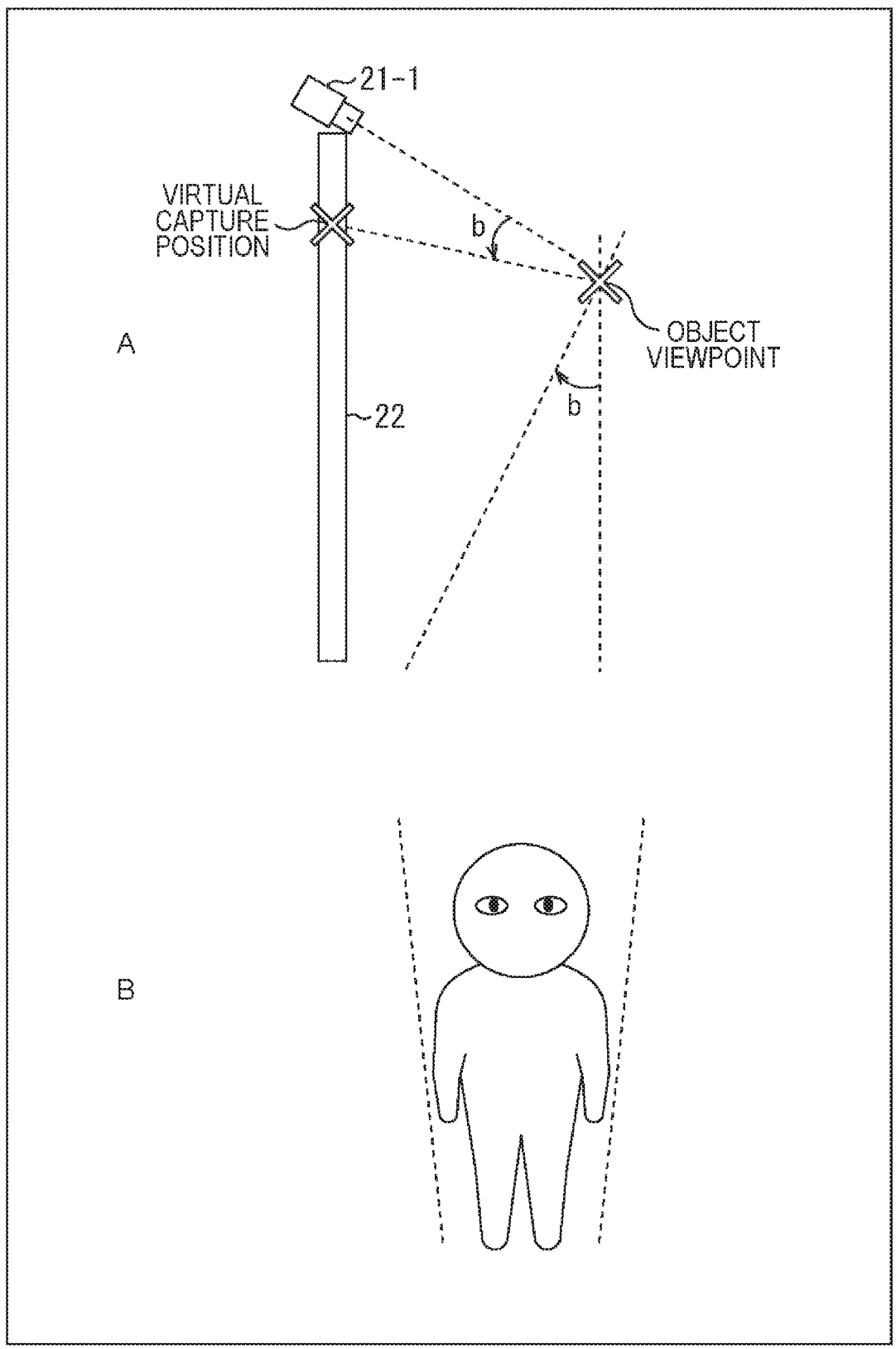
FIGS. 14A and 14B are diagrams for describing projective transformation in a case where the virtual capture position is higher than the object viewpoint.

Furthermore, the projective transformation in a case where the virtual capture position is higher than the object viewpoint will be described with reference to FIGS. 14A and 14B. In this case, as illustrated in FIG. 14A, only required is to estimate a parameter of projective transformation equivalent to rotation at an angle b that is the same as an angle b made by the straight line connecting the capture device 21-1 and the object viewpoint and the straight line connecting the virtual capture position and the object viewpoint. Then, when the projective transformation is performed for the object approximate plane using such a parameter, a low fidelity image spreading upward, as if looking down the object from above, can be generated, as illustrated in FIG. 14B.

Figure 15:
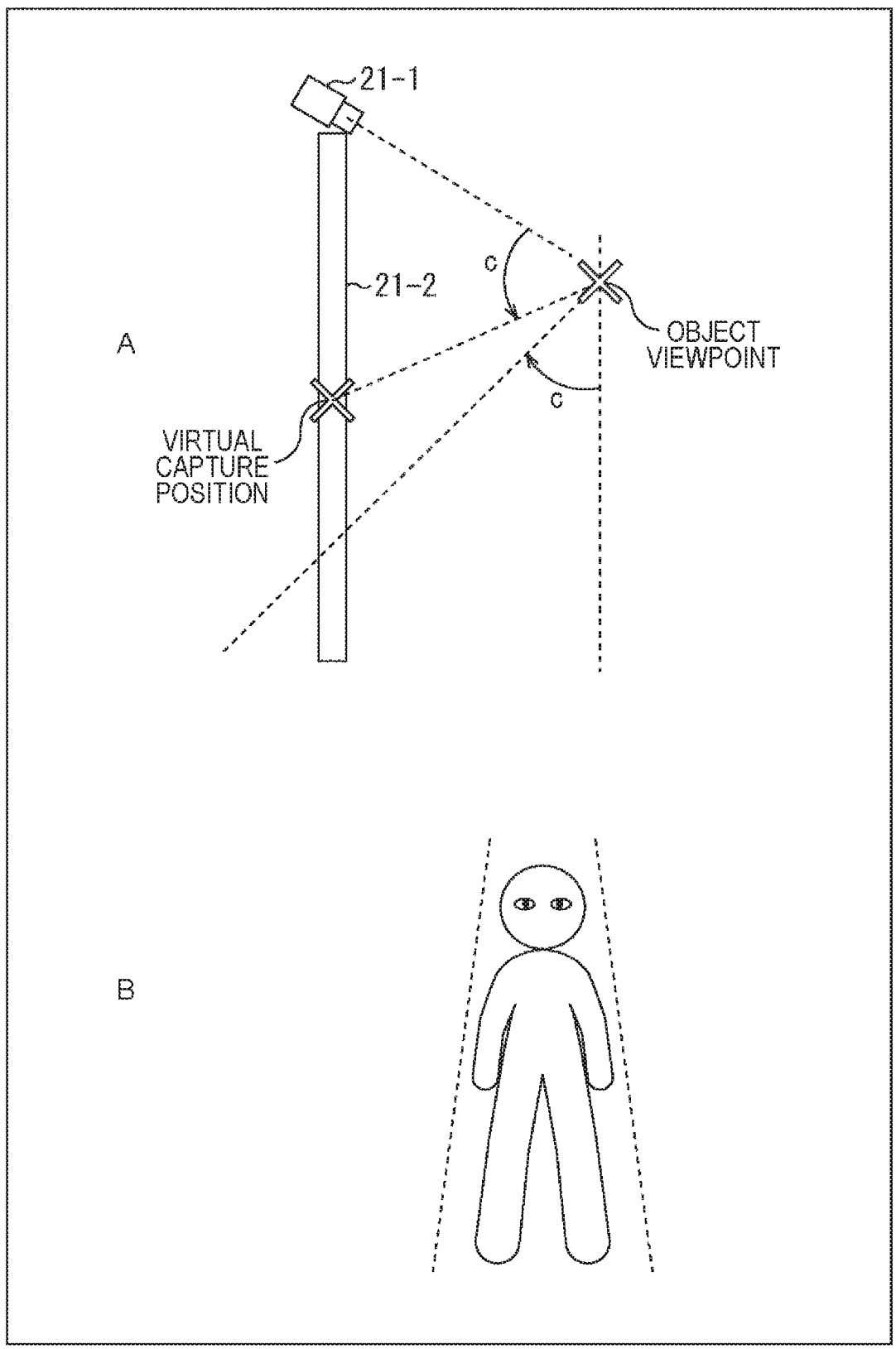
FIGS. 15A and 15B are diagrams for describing projective transformation in a case where the virtual capture position is lower than the object viewpoint.

Similarly, projective transformation in a case where the virtual capture position is lower than the object viewpoint will be described with reference to FIGS. 15A and 15B. In this case, as illustrated in FIG. 15A, only required is to estimate a parameter of projective transformation equivalent to rotation at an angle c that is the same as an angle c made by the straight line connecting the capture device 21-1 and the object viewpoint and the straight line connecting the virtual capture position and the object viewpoint. Then, when the projective transformation is performed for the object approximate plane using such a parameter, a low fidelity image spreading downward, as if looking up the object from below, can be generated, as illustrated in FIG. 15B.

As illustrated in FIGS. 13A, 13B, 14A, 14B, 15A, and 15B, the low fidelity image generation unit 34 can generate the low fidelity image close to how the object looks (facing, looking down, or looking up) corresponding to the viewpoint of the other party's user, using the viewpoint of the other party's user as the virtual capture position.

Figure 16:
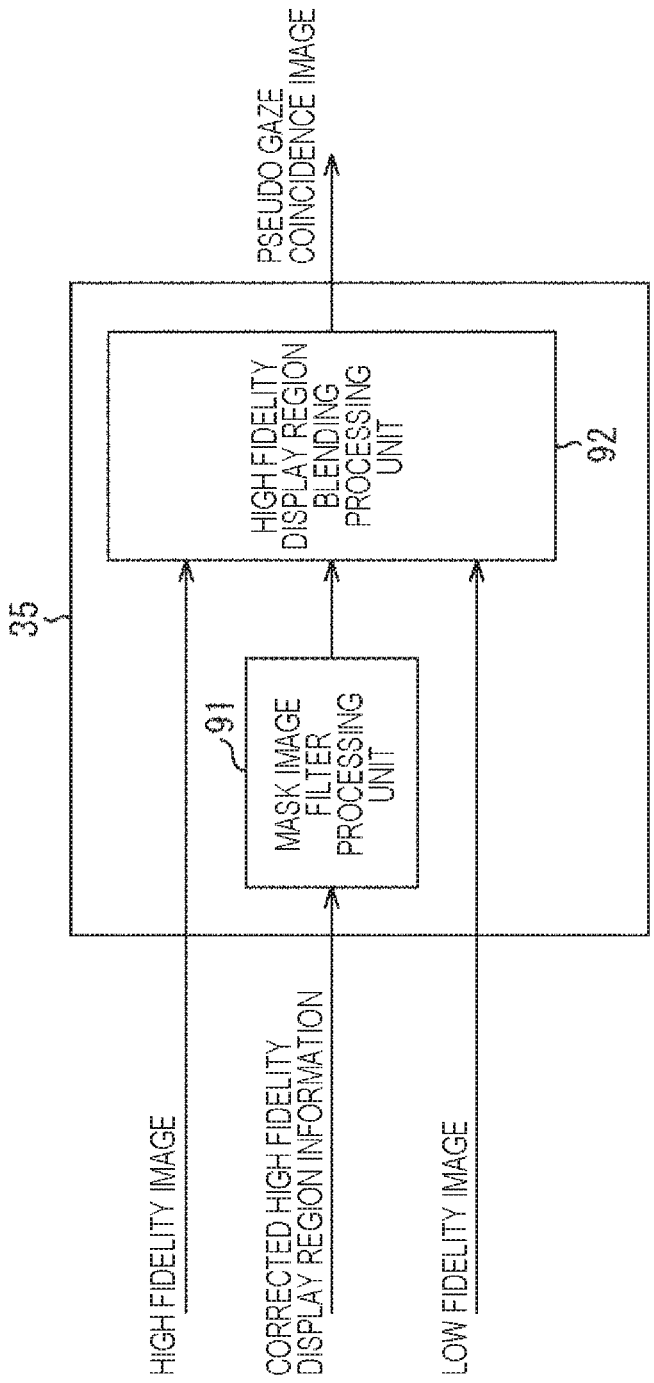
FIG. 16 is a block diagram illustrating a configuration example of a pseudo gaze coincidence image generation unit in FIG. 2.

FIG. 16 is a block diagram illustrating a configuration example of the pseudo gaze coincidence image generation unit 35 in FIG. 2.

As illustrated in FIG. 16, the pseudo gaze coincidence image generation unit 35 includes a mask image filter processing unit 91 and a high fidelity display region blending processing unit 92.

The mask image filter processing unit 91 applies filter processing with a morphology filter, a lowpass filter, or the like to the high fidelity display region (corrected mask image) indicated by the corrected high fidelity display region information output from the low fidelity image generation unit 34. Thereby, the mask image filter processing unit 91 generates a blend map image in which a value (blend ratio) in a boundary of the mask image gradually changes and the boundary is less noticeable in subsequent blending processing, and supplies the blend map image to the high fidelity display region blending processing unit 92.

The high fidelity display region blending processing unit 92 performs alpha blending processing for the high fidelity image and the low fidelity image according to the blend ratio set in the blend map image supplied from the mask image filter processing unit 91. Thereby, the high fidelity display region blending processing unit 92 generates and outputs a pseudo gaze coincidence image in which the above-described portion of the face as illustrated in FIGS. 7A and 7B are replaced with the high fidelity image with respect to the low fidelity image.

Figure 17:
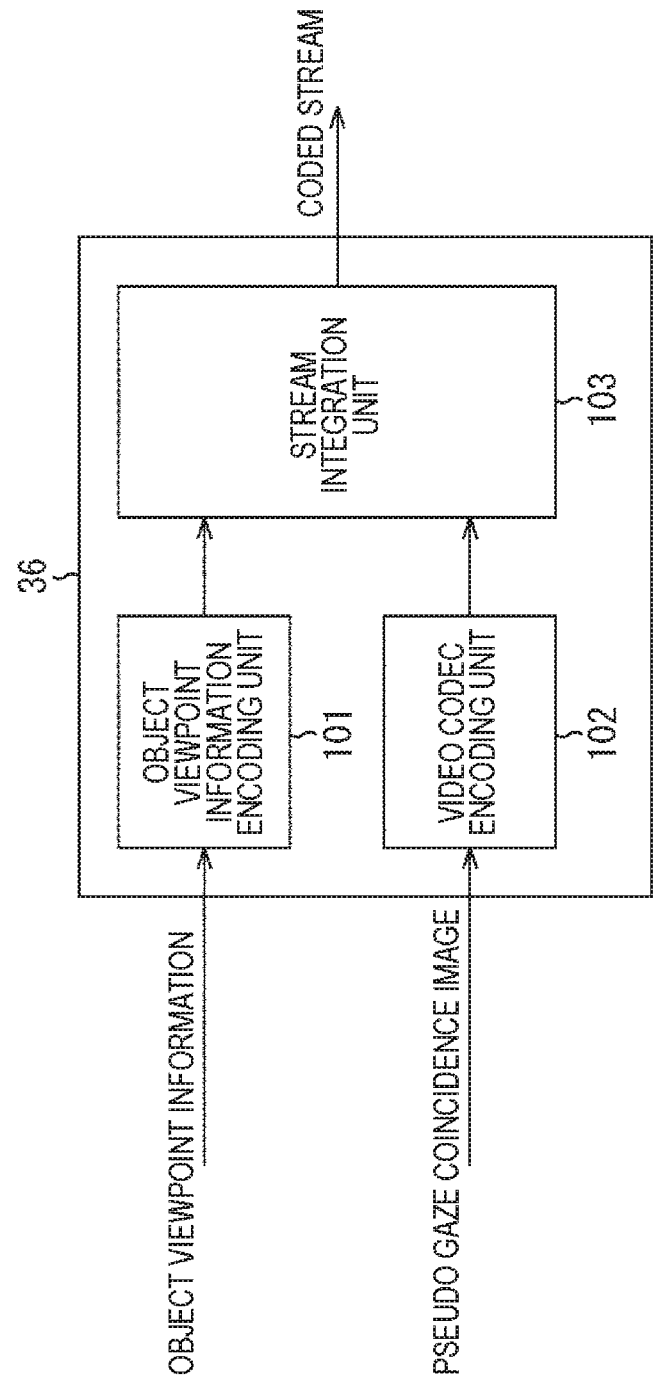
FIG. 17 is a block diagram illustrating a configuration example of an encoding unit in FIG. 2.

FIG. 17 is a block diagram illustrating a configuration example of the encoding unit 36 in FIG. 2.

As illustrated in FIG. 17, the encoding unit 36 includes an object viewpoint information encoding unit 101, a video codec encoding unit 102, and a stream integration unit 103.

The object viewpoint information encoding unit 101 encodes the object viewpoint information by an arbitrary encoding method consistent with the decoding side, and supplies an additional stream, which is generated by encoding the object viewpoint information, to the stream integration unit 103. Specifically, the object viewpoint information encoding unit 101 can adopt an encoding method using general lossless encoding such as Ziv-Lempel (LZ) encoding.

The video codec encoding unit 102 encodes the pseudo gaze coincidence image using generally used arbitrary video codec such as moving picture experts group (MPEG)-2 or high efficiency video coding (H.264,HEVC) to generate a video stream. Then, the video codec encoding unit 102 supplies the generated video stream to the stream integration unit 103.

The stream integration unit 103 integrates the additional stream supplied from the object viewpoint information encoding unit 101 and the video stream supplied from the video codec encoding unit 102, and outputs the integrated streams from the encoding unit 36 as a coded stream. For example, the stream integration unit 103 can adopt an integration method of embedding the additional stream generated in the object viewpoint information encoding unit 101 into a header portion where user information of the video stream is recordable.

Figure 18:
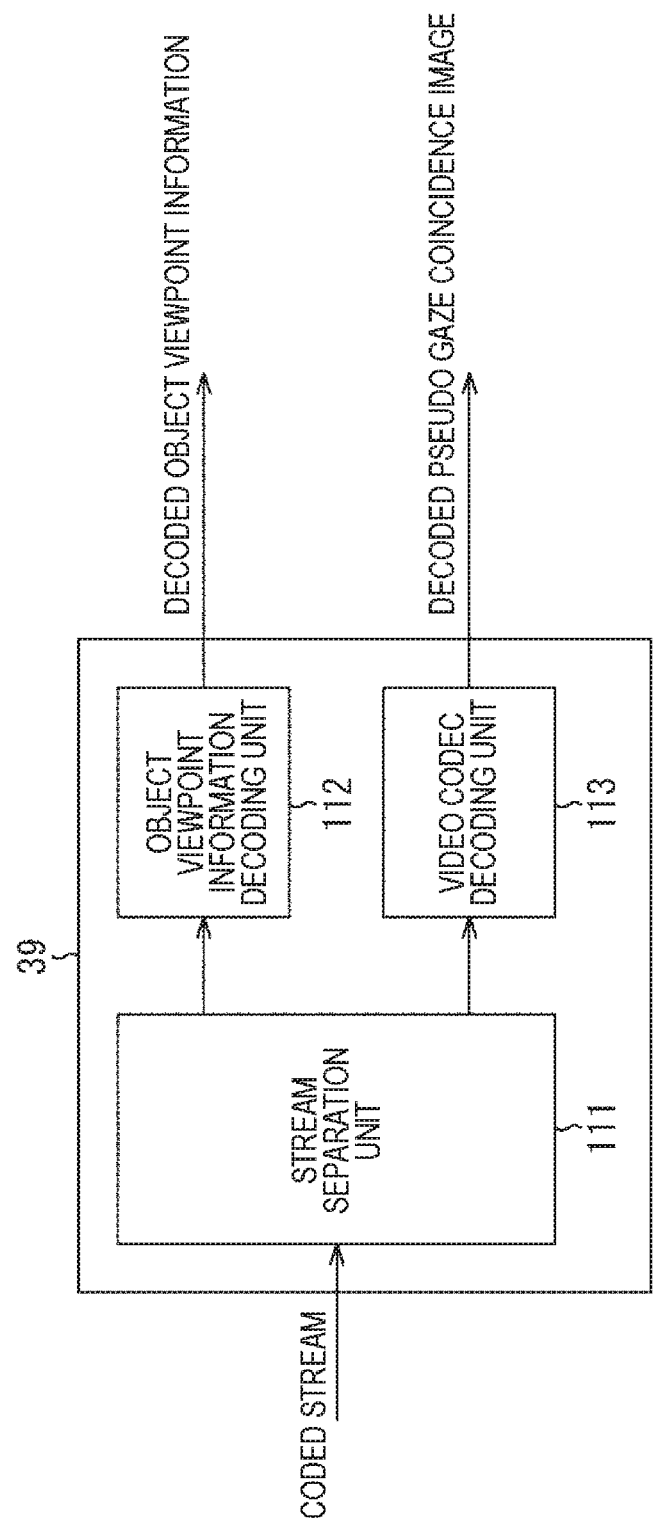
FIG. 18 is a block diagram illustrating a configuration example of a decoding unit in FIG. 2.

FIG. 18 is a block diagram illustrating a configuration example of the decoding unit 39 in FIG. 2.

As illustrated in FIG. 18, the decoding unit 39 includes a stream separation unit 111, an object viewpoint information decoding unit 112, and a video codec decoding unit 113.

The stream separation unit 111 separates the coded stream supplied from the reception unit 38 in FIG. 2 into the additional stream and the video stream. Then, the stream separation unit 111 supplies the additional stream to the object viewpoint information decoding unit 112 and supplies the video stream to the video codec decoding unit 113.

The object viewpoint information decoding unit 112 decodes the additional stream supplied from the stream separation unit 111 to the decoded object viewpoint information and outputs the decoded object viewpoint information. In other words, the decoded object viewpoint information is decoded after the object viewpoint information indicating the viewpoint position of the other party's user is encoded on the other party side and transmitted.

The video codec decoding unit 113 decodes the video stream supplied from the stream separation unit 111 to the decoded pseudo gaze coincidence image and outputs the decoded pseudo gaze coincidence image. In other words, the decoded pseudo gaze coincidence image is decoded after the pseudo gaze coincidence image in which the other party's user is captured is encoded on the other party side and transmitted.

Figure 19:
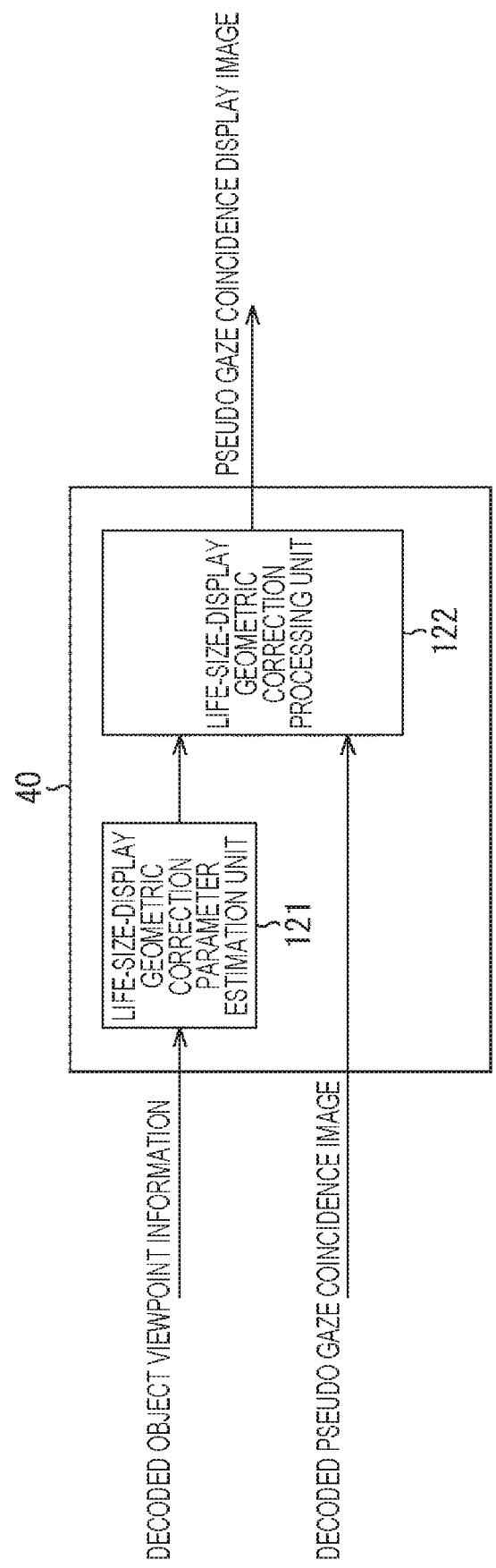
FIG. 19 is a block diagram illustrating a configuration example of a pseudo gaze coincidence image display unit in FIG. 2.

FIG. 19 is a block diagram illustrating a configuration example of the pseudo gaze coincidence image display unit 40 in FIG. 2.

As illustrated in FIG. 19, the pseudo gaze coincidence image display unit 40 includes a life-size-display geometric correction parameter estimation unit 121 and a life-size-display geometric correction processing unit 122.

The life-size-display geometric correction parameter estimation unit 121 estimates a life-size-display geometric correction parameter with which the size of the face and the positions of the eyes of the other party's user displayed on the display device 22 are displayed with actual sizes on the basis of the viewpoint position (defined with world coordinates) of the other party's user in the three-dimensional real space indicated by the decoded object viewpoint information. At this time, the life-size-display geometric correction parameter estimation unit 121 estimates the life-size-display geometric correction parameter in consideration of a resolution and a size of the display device 22, a resolution of the decoded pseudo gaze coincidence image, and the like, and supplies the life-size-display geometric correction parameter to the life-size-display geometric correction processing unit 122.

The life-size-display geometric correction processing unit 122 applies geometric correction using the life-size-display geometric correction parameter supplied from the life-size-display geometric correction parameter estimation unit 121 to the decoded pseudo gaze coincidence image. Thereby, the life-size-display geometric correction processing unit 122 generates the pseudo gaze coincidence display image to be displayed on the display device 22 with the size at the position (at the height of the eyes) where the other party's user is displayed in a life-size manner. Then, the life-size-display geometric correction processing unit 122 outputs the pseudo gaze coincidence display image to the display device 22 in FIG. 1 and causes the display device 22 to display the pseudo gaze coincidence display image.

The blocks included in the image processing unit 24 are configured as described above, and for example, a video communication experience with coincidence of the gaze with the other party's user can be provided in the interactive communication performed with the other party's user displayed in a life-size manner.

<Image Processing by Image Processing Unit>

Image processing performed by the image processing unit 24 will be described with reference to the flowcharts illustrated in FIGS. 20 and 21.

Figure 20:
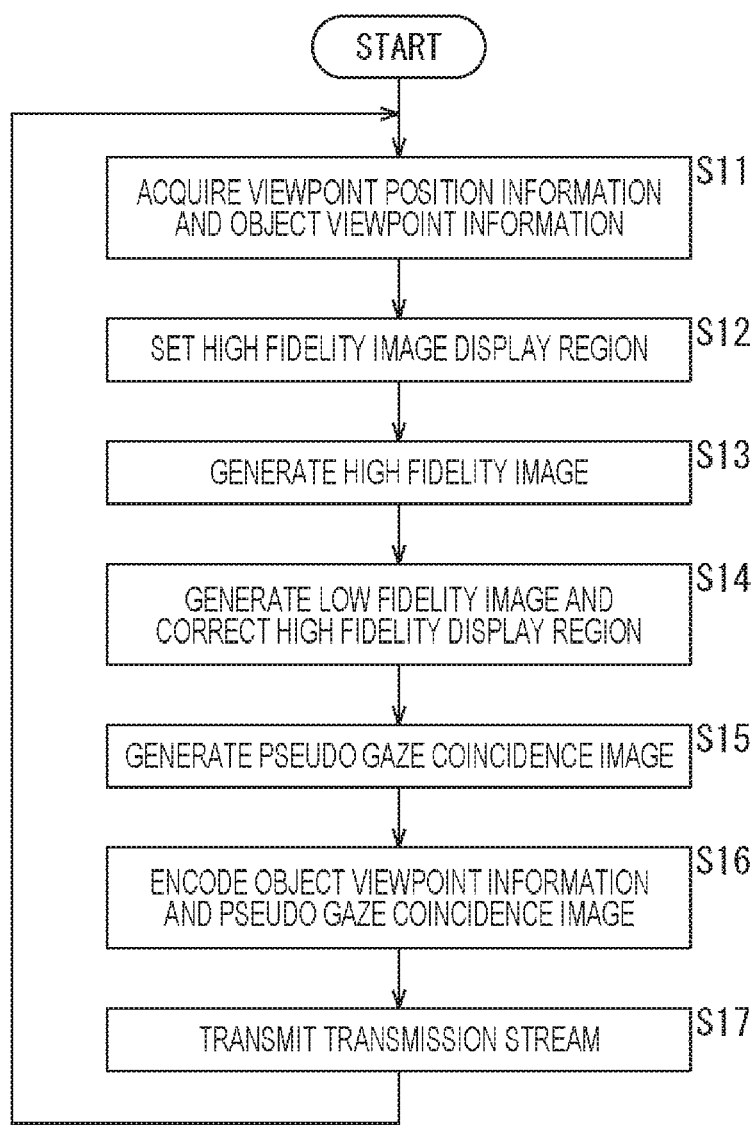
FIG. 20 is a flowchart for describing processing of outputting a pseudo gaze coincidence image in which a principal user is captured.

FIG. 20 illustrates a flowchart for describing image processing of outputting the pseudo gaze coincidence image in which the principal user is captured.

For example, when the telecommunication is started and the input capture signal in which the captured images captured by the capture devices 21 and the signal indicating, for example, the depth information detected by the depth sensor are multiplexed and the decoded object viewpoint information indicating the viewpoint position of the other party's user in the three-dimensional space are input to the image processing unit 24, the processing is started.

In step S11, the object viewpoint information setting unit 31 acquires the analysis information indicating the coordinates of the parts of the face on the images on the basis of the captured images and the depth information obtained from the input capture signal, and supplies the analysis information to the high fidelity display region setting unit 32. Furthermore, the object viewpoint information setting unit 31 acquires the object viewpoint information indicating the viewpoint position of the principal user in the three-dimensional space on the basis of the captured images and the depth information obtained from the input capture signal, and supplies the object viewpoint information to the encoding unit 36.

In step S12, the high fidelity display region setting unit 32 sets the high fidelity display region for displaying the high fidelity image on the basis of the analysis information supplied from the object viewpoint information setting unit 31 in step S11. Then, the high fidelity display region setting unit 32 supplies the high fidelity display region information indicating the high fidelity display region to the high fidelity image generation unit 33 and the low fidelity image generation unit 34.

In step S13, the high fidelity image generation unit 33 generates the high fidelity image using the viewpoint interpolation technology or the like for the captured images, using the viewpoint position of the other party's user as the virtual capture position, limiting the display region to the high fidelity display region set by the high fidelity display region setting unit 32 in step S12. Then, the high fidelity image generation unit 33 supplies the high fidelity image to the pseudo gaze coincidence image generation unit 35.

In step S14, the low fidelity image generation unit 34 performs the geometric correction for the captured images, using the viewpoint position of the other party's user as the virtual capture position to generate the low fidelity image. Moreover, the low fidelity image generation unit 34 applies the correction for reflecting the influence by the geometric correction of when generating the low fidelity image to the high fidelity display region set by the high fidelity display region setting unit 32 in step S12. Then, the low fidelity image generation unit 34 supplies the low fidelity image and the corrected high fidelity display region information to the pseudo gaze coincidence image generation unit 35.

In step S15, the pseudo gaze coincidence image generation unit 35 superimposes the high fidelity image supplied from the high fidelity image generation unit 33 in step S13 on the low fidelity image supplied from the low fidelity image generation unit 34 in step S14 in the corrected high fidelity display region. Thereby, the pseudo gaze coincidence image generation unit 35 generates the pseudo gaze coincidence image that is coincident in a pseudo manner as viewed from the other party's user when the principal user holds the gaze with the other party's user displayed on the display device 22, and supplies the pseudo gaze coincidence image to the encoding unit 36.

In step S16, the encoding unit 36 encodes the object viewpoint information of the principal user supplied from the object viewpoint information setting unit 31 in step S11 and the pseudo gaze coincidence image supplied from the pseudo gaze coincidence image generation unit 35 in step S15, and supplies the coded stream to the transmission unit 37.

In step S17, the transmission unit 37 outputs the coded stream supplied from the encoding unit 36 in step S16 to the communication unit 25 as the transmission stream to be transmitted via the network 13 in FIG. 1. Then, after the communication unit 25 transmits the transmission stream to the other party's telecommunication apparatus 12, the processing returns to step S11. Hereinafter, similar processing is repeatedly performed until the telecommunication is terminated.

As described above, the image processing unit 24 can transmit the object viewpoint information of the principal user and can transmit the pseudo gaze coincidence image having the gaze coincident in a pseudo manner with the principal user as viewed from the other party's user to the other party.

Figure 21:
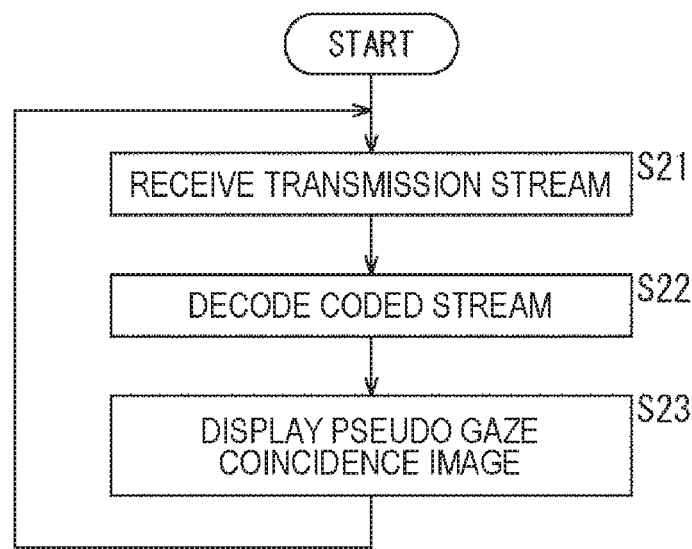
FIG. 21 is a flowchart for describing processing of displaying a pseudo gaze coincidence image in which the other party's user is captured.

FIG. 21 illustrates a flowchart for describing image processing of displaying the pseudo gaze coincidence image in which the other party's user is captured.

For example, when the telecommunication is started and the communication unit 25 supplies the transmission stream transmitted from the other party's telecommunication apparatus 12 to the reception unit 38, the processing is started.

In step S21, the reception unit 38 receives the transmission stream, returns the transmission stream to the coded stream, and supplies the coded stream to the decoding unit 39.

In step S22, the decoding unit 39 decodes the coded stream supplied from the reception unit 38 in step S21, acquires the decoded object viewpoint information and the decoded pseudo gaze coincidence image, and supplies the decoded object viewpoint information and the decoded pseudo gaze coincidence image to the pseudo gaze coincidence image display unit 40.

In step S23, the pseudo gaze coincidence image display unit 40 generates the pseudo gaze coincidence display image on the basis of the decoded object viewpoint information and the decoded pseudo gaze coincidence image supplied from the decoding unit 39 in step S22, and outputs the pseudo gaze coincidence display image to the display device 22. At this time, the pseudo gaze coincidence image display unit 40 generates the pseudo gaze coincidence display image displayed such that the gaze coincides in a pseudo manner as viewed from the principal user when the other party's user holds the gaze with the principal user displayed on the other party's display device 22. Then, after the display device 22 displays the pseudo gaze coincidence display image, the processing returns to step S21. Hereinafter, similar processing is repeatedly performed until the telecommunication is terminated.

As described above, the image processing unit 24 can display the pseudo gaze coincidence display image having the gaze coincident in a pseudo manner with the other party's user as viewed from the principal user.

<Second Configuration Example of Image Processing Unit>

A second configuration example of the image processing unit 24 will be described with reference to FIG. 22.

Figure 22:
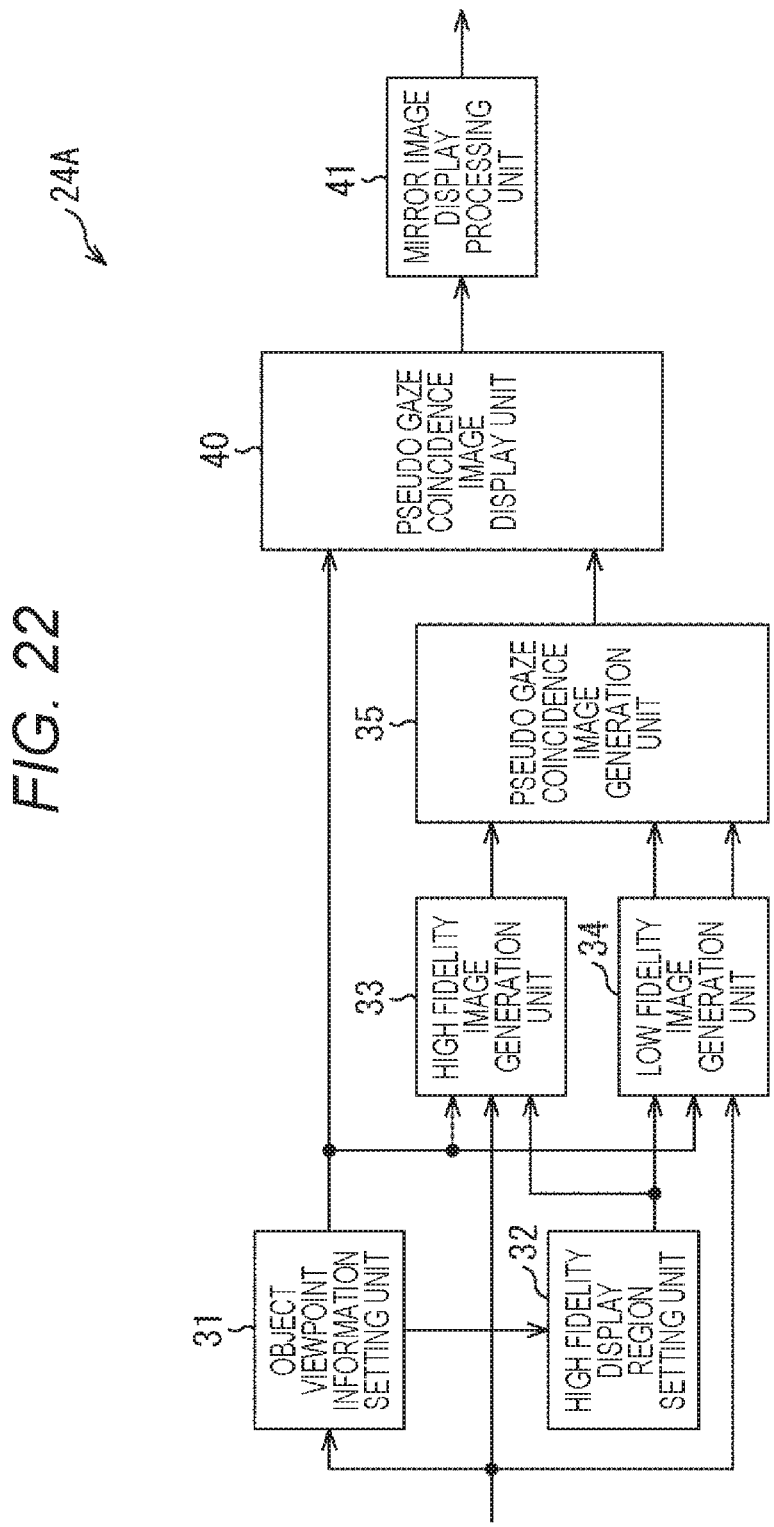
FIG. 22 is a block diagram illustrating a second configuration example of the image processing unit.

FIG. 22 is a block diagram illustrating the second configuration example of the image processing unit 24. Note that, in an image processing unit 24A illustrated in FIG. 22, configurations common to the image processing unit 24 in FIG. 2 are denoted with the same reference numerals and detailed description of the configurations is omitted.

As illustrated in FIG. 22, the image processing unit 24A has a configuration common to the image processing unit 24 in FIG. 2 in including the object viewpoint information setting unit 31, the high fidelity display region setting unit 32, the high fidelity image generation unit 33, the low fidelity image generation unit 34, the pseudo gaze coincidence image generation unit 35, and the pseudo gaze coincidence image display unit 40. Moreover, the image processing unit 24A includes a mirror image display processing unit 41.

For example, unlike the image processing unit 24 in FIG. 2, the image processing unit 24A has the configuration assuming the use as an electronic mirror for displaying the principal user, not assuming the use as the interactive telecommunication.

Therefore, the image processing unit 24A is configured to supply the object viewpoint information of the principal user from the object viewpoint information setting unit 31 to the high fidelity image generation unit 33 and the low fidelity image generation unit 34, instead of the decoded object viewpoint information described with reference to FIG. 2. Therefore, the high fidelity image generation unit 33 and the low fidelity image generation unit 34 respectively generate the high fidelity image and the low fidelity image, using the viewpoint position of the principal user as the virtual capture position.

Furthermore, the image processing unit 24A is configured such that the object viewpoint information of the principal user is directly supplied from the object viewpoint information setting unit 31 to the pseudo gaze coincidence image display unit 40 and the pseudo gaze coincidence image is directly supplied from the pseudo gaze coincidence image generation unit 35 to the pseudo gaze coincidence image display unit 40. Therefore, the pseudo gaze coincidence image display unit 40 generates the pseudo gaze coincidence display image for displaying the principal user with a size at a position for life size on the display device 22 in consideration of the viewpoint position of the principal user. Then, the pseudo gaze coincidence image display unit 40 supplies the generated pseudo gaze coincidence display image to the mirror image display processing unit 41.

The mirror image display processing unit 41 performs mirror image display processing of horizontally reversing the pseudo gaze coincidence display image supplied from the pseudo gaze coincidence image display unit 40, assuming the use as an electronic mirror, and outputs the pseudo gaze coincidence display image to the display device 22. Thereby, the pseudo gaze coincidence display image in which the principal user is captured as if the principal user looks at a mirror and the principal user is horizontally reversed is displayed on the display device 22.

The image processing unit 24A configured as described above can perform the viewpoint interpolation processing in the high fidelity image generation unit 33 and the geometric correction in the pseudo gaze coincidence image display unit 40 in consideration of the viewpoint position of the principal user when performing electronic mirror display for the principal user with life size. Thereby, the principal user can confirm, for example, the expression of the face with the gaze coincident with the principal user as when looking at a mirror.

Furthermore, various augmented reality (AR) technologies can be applied to the pseudo gaze coincidence display image generated by the image processing unit 24A, and virtual experiences such as trial fitting of clothes and change of hairstyle can be provided. At this time, by causing the gazes to coincide with each other, as described above, a more realistic service can be provided.

<Third Configuration Example of Image Processing Unit>

A third configuration example of the image processing unit 24 will be described with reference to FIGS. 23 to 29.

Figure 23:
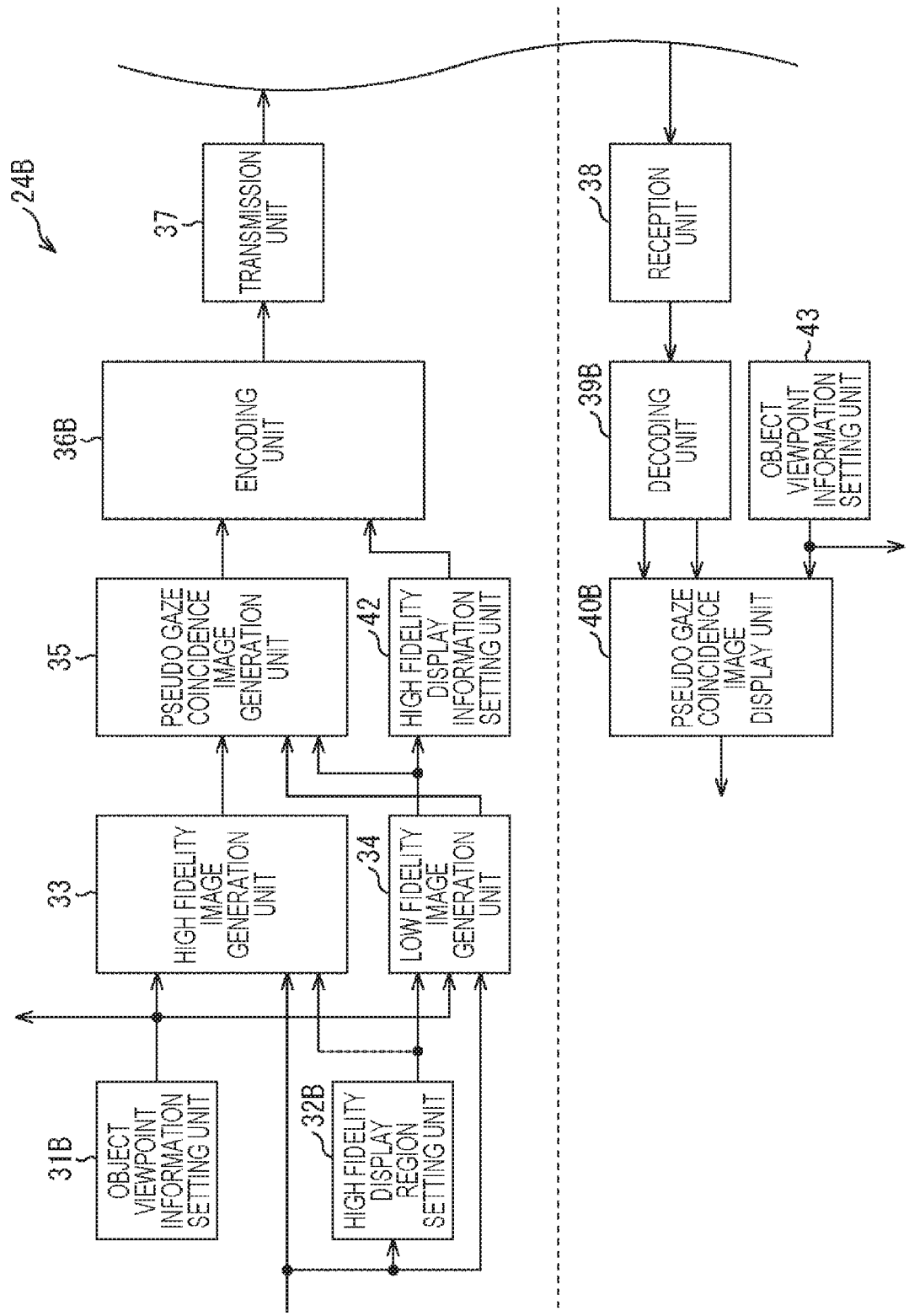
FIG. 23 is a block diagram illustrating a third configuration example of the image processing unit.

FIG. 23 is a block diagram illustrating the third configuration example of the image processing unit 24. Note that, in an image processing unit 24B illustrated in FIG. 23, configurations common to the image processing unit 24 in FIG. 2 are denoted with the same reference numerals and detailed description of the configurations is omitted.

As illustrated in FIG. 23, the image processing unit 24B has a configuration common to the image processing unit 24 in FIG. 2 in including the high fidelity image generation unit 33, the low fidelity image generation unit 34, the pseudo gaze coincidence image generation unit 35, the transmission unit 37, and the reception unit 38. Moreover, the image processing unit 24B includes an object viewpoint information setting unit 31B, a high fidelity display region setting unit 32B, an encoding unit 36B, a decoding unit 39B, a pseudo gaze coincidence image display unit 40B, a high fidelity display information setting unit 42, and an object viewpoint information setting unit 43.

For example, in the image processing unit 24 in FIG. 2, the three-dimensionally measured viewpoint position of the other party's user is used as the virtual capture position, whereas in the image processing unit 24B, a simply fixed virtual capture position is used.

Therefore, an input video signal is not supplied to the object viewpoint information setting unit 31B, unlike the object viewpoint information setting unit 31 in FIG. 2. The object viewpoint information setting unit 31B is configured to set and supply fixed object viewpoint information to the high fidelity image generation unit 33 and the low fidelity image generation unit 34. Then, the high fidelity image generation unit 33 and the low fidelity image generation unit 34 respectively generate the high fidelity image and the low fidelity image on the basis of the fixed object viewpoint information. Furthermore, the fixed object viewpoint information is also output to the pseudo gaze coincidence image display unit 40B included in the other party's image processing unit 24B.

Figure 24:
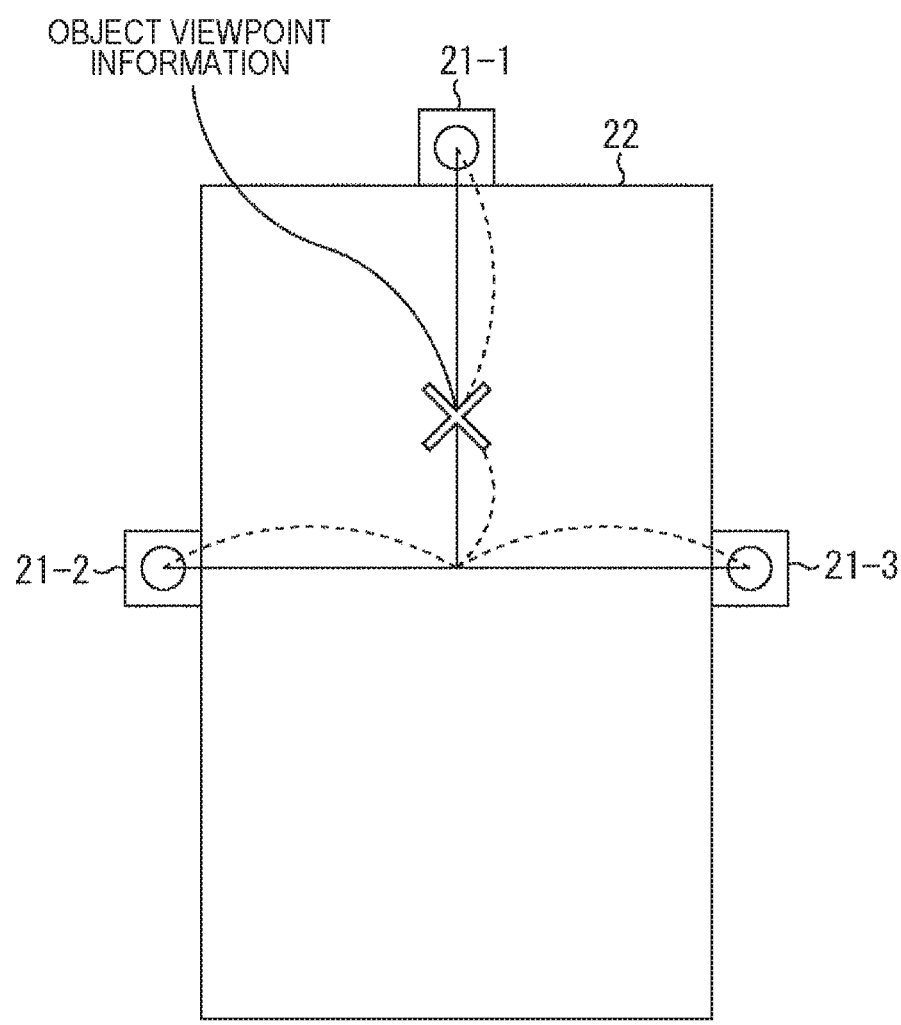
FIG. 24 is a diagram illustrating an example of object viewpoint information set in a fixed manner.

For example, as illustrated in FIG. 24, the fixed object viewpoint information set by the object viewpoint information setting unit 31B is information indicating a relative positional relationship between the three capture devices 21-1 to 21-3 and the display device 22. For example, the fixed object viewpoint information can be determined from an average value of the height of the user who uses the telecommunication apparatus 12 and the distance from the display device 22 to a user's standing position.

Furthermore, in the image processing unit 24B, the high fidelity display information setting unit 42 outputs a representative position of a mask region of the corrected high fidelity display region information (for example, a position of the center of gravity or coordinates of a position corresponding to the eyes) and an area of the mask region to the encoding unit 36B as the high fidelity display information.

Furthermore, in the image processing unit 24B, the object viewpoint information setting unit 43 is configured to set and supply the fixed object viewpoint information to the pseudo gaze coincidence image display unit 40B, similarly to the object viewpoint information setting unit 31B. The object viewpoint information is also supplied to the high fidelity image generation unit 33 and the low fidelity image generation unit 34 included in the other party's image processing unit 24B.

Figure 25:
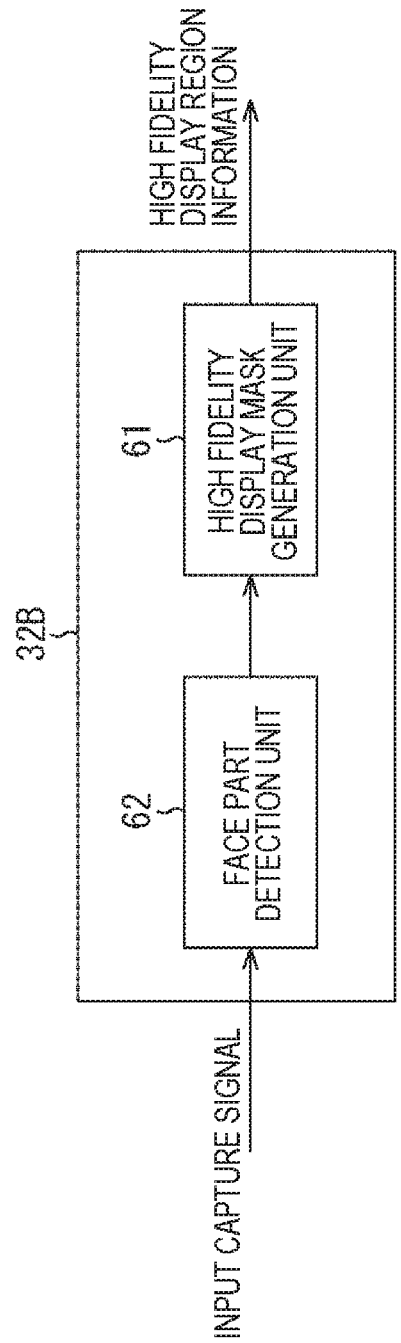
FIG. 25 is a block diagram illustrating a configuration example of a high fidelity display region setting unit in FIG. 23.

FIG. 25 is a block diagram illustrating a configuration example of the high fidelity display region setting unit 32B in FIG. 23. The input video signal is supplied to the high fidelity display region setting unit 32B, unlike the high fidelity display region setting unit 32 in FIG. 2.

As illustrated in FIG. 25, the high fidelity display region setting unit 32B has a common configuration to the high fidelity display region setting unit 32 in FIG. 6 in including the high fidelity display mask generation unit 61, and further includes a face part detection unit 62.

The input video signal is supplied to the face part detection unit 62. Then, the face part detection unit 62 can obtain coordinates indicating the characteristic points of parts of a face included in the captured images, similarly to the face part detection unit 51 included in the object viewpoint information setting unit 31 illustrated in FIG. 3, and supplies the coordinates to the high fidelity display mask generation unit 61 as the analysis information. In other words, the analysis information is used as an internal signal of the high fidelity display region setting unit 32B.

Figure 26:
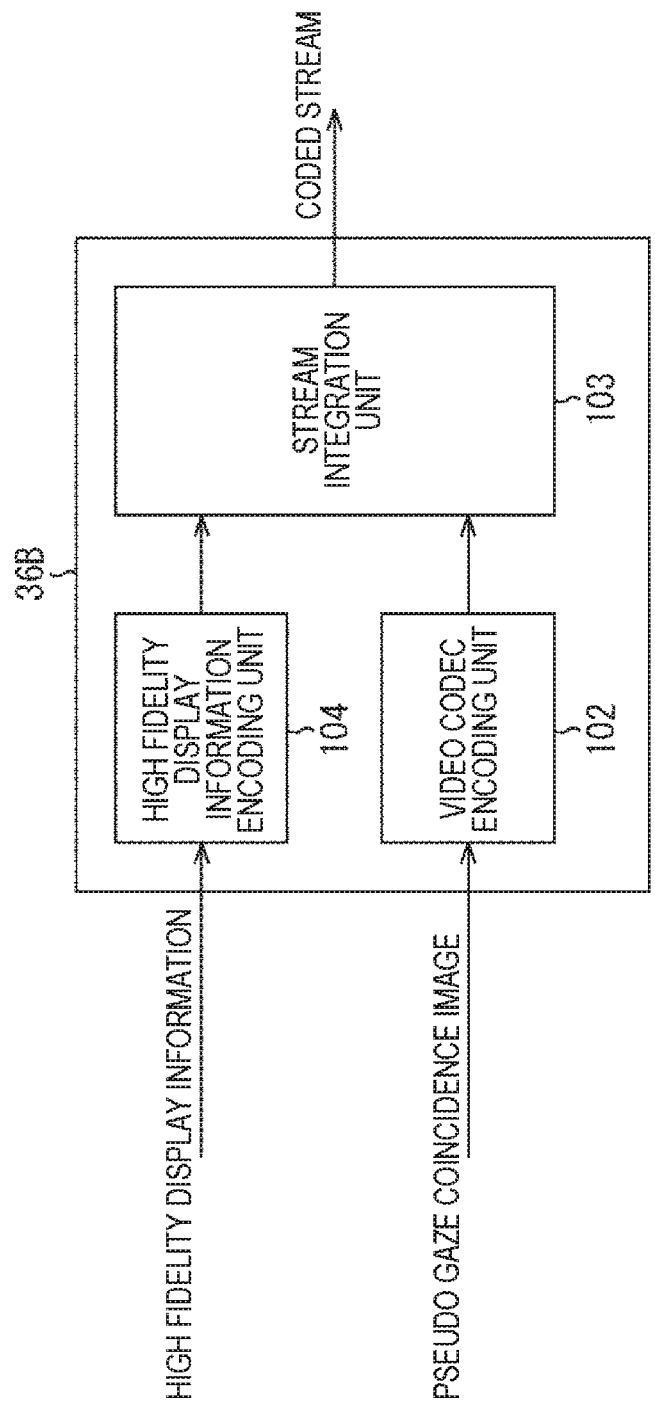
FIG. 26 is a block diagram illustrating a configuration example of an encoding unit in FIG. 23.

FIG. 26 is a block diagram illustrating a configuration example of the encoding unit 36B in FIG. 23. As described above, the high fidelity display information is supplied from the high fidelity display information setting unit 42 to the encoding unit 36B.

As illustrated in FIG. 26, the encoding unit 36B has a common configuration to the encoding unit 36 in FIG. 17 in including the video codec encoding unit 102 and the stream integration unit 103, and further includes a high fidelity display information encoding unit 104.

The high fidelity display information encoding unit 104 encodes the high fidelity display information supplied from the high fidelity display information setting unit 42 in FIG. 23, and supplies the high fidelity display information to the stream integration unit 103 as the additional stream. Therefore, the stream integration unit 103 integrates the additional stream in which the high fidelity display information is encoded, and the video stream supplied from the video codec encoding unit 102, and outputs the integrated streams from the encoding unit 36B as the coded stream.

Figure 27:
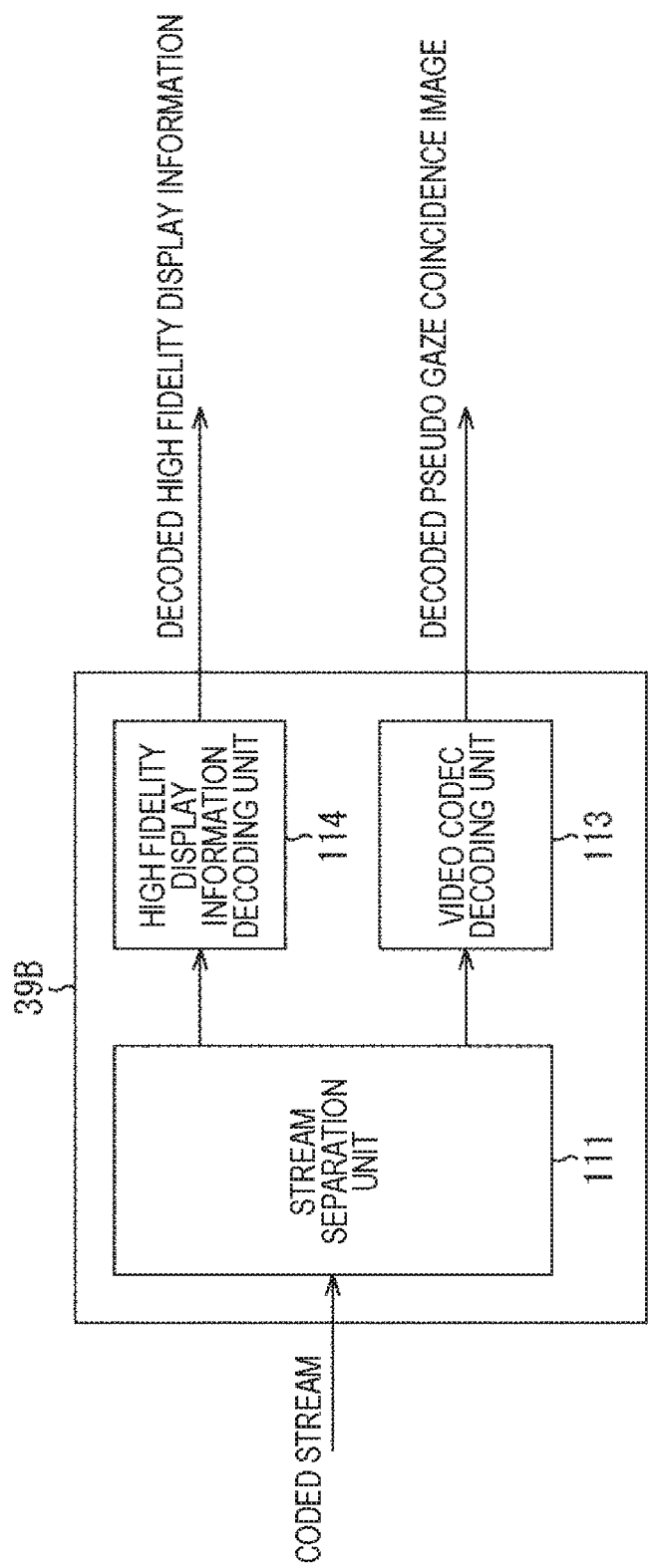
FIG. 27 is a block diagram illustrating a configuration example of a decoding unit in FIG. 23.

FIG. 27 is a block diagram illustrating a configuration example of the decoding unit 39B in FIG. 23. The coded stream encoded by the encoding unit 36B is supplied to the decoding unit 39B.

As illustrated in FIG. 27, the decoding unit 39B has a common configuration to the decoding unit 39 in FIG. 18 in including the stream separation unit 111 and the video codec decoding unit 113, and further includes a high fidelity display information decoding unit 114.

The additional stream separated from the coded stream by the stream separation unit 111 is supplied to the high fidelity display information decoding unit 114. Then, the high fidelity display information decoding unit 114 decodes the additional stream to the decoded high fidelity display information and outputs the decoded high fidelity display information. In other words, the decoded high fidelity display information is decoded after the high fidelity display information of the other party's user is encoded on the other party side and transmitted.

Figure 28:
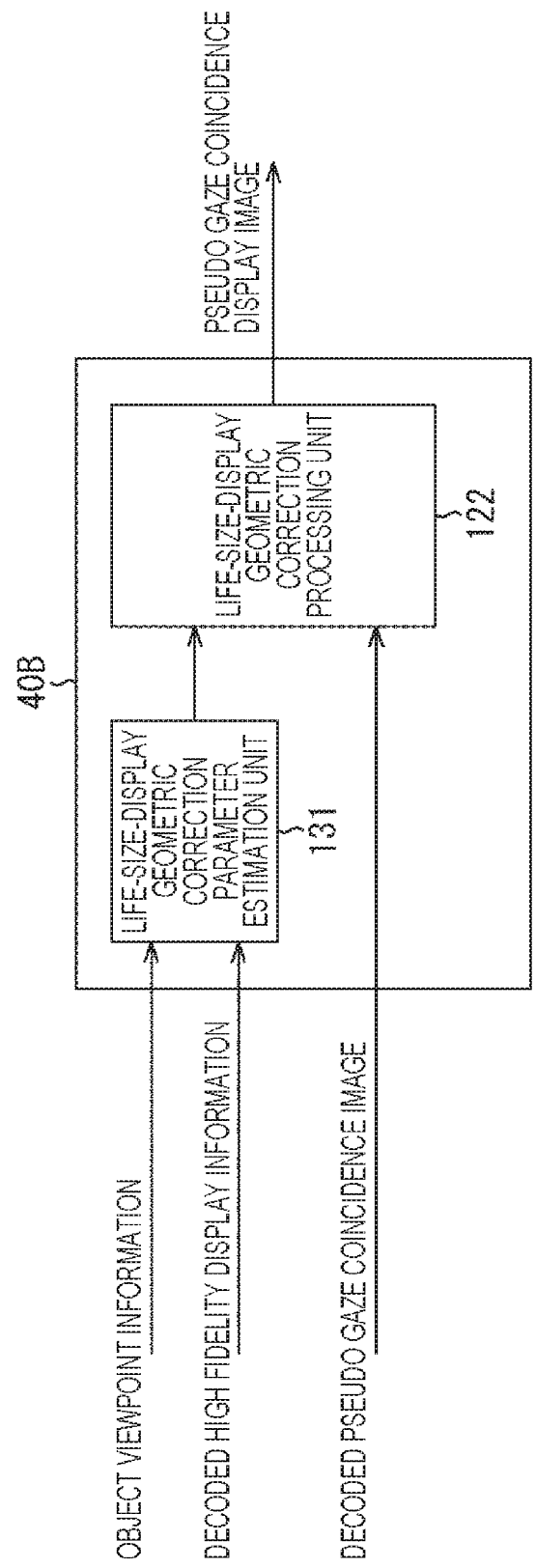
FIG. 28 is a block diagram illustrating a configuration example of a pseudo gaze coincidence image display unit in FIG. 23.

FIG. 28 is a block diagram illustrating a configuration example of the pseudo gaze coincidence image display unit 40B in FIG. 23. The decoded high fidelity display information output from the decoding unit 39B and the decoded pseudo gaze coincidence image are supplied to the pseudo gaze coincidence image display unit 40B, and the object viewpoint information is supplied from the object viewpoint information setting unit 43 to the pseudo gaze coincidence image display unit 40B.

As illustrated in FIG. 28, the pseudo gaze coincidence image display unit 40B has a common configuration to the pseudo gaze coincidence image display unit 40 in FIG. 19 in including the life-size-display geometric correction processing unit 122, and further includes a life-size-display geometric correction parameter estimation unit 131.

The life-size-display geometric correction parameter estimation unit 131 estimates the life-size-display geometric correction parameter with which the size of the face and the positions of the eyes of the other party's user displayed on the display device 22 are displayed with actual sizes, similarly to the life-size-display geometric correction parameter estimation unit 121 in FIG. 19. At this time, to cause the gazes of the users to coincide with each other, the virtual capture position in the pseudo gaze coincidence display image of the principal user and the positions of the eyes (viewpoint) displayed in the pseudo gaze coincidence display image of the other party's user are need to be displayed to coincide with each other (or at proximity positions).

Figure 29:
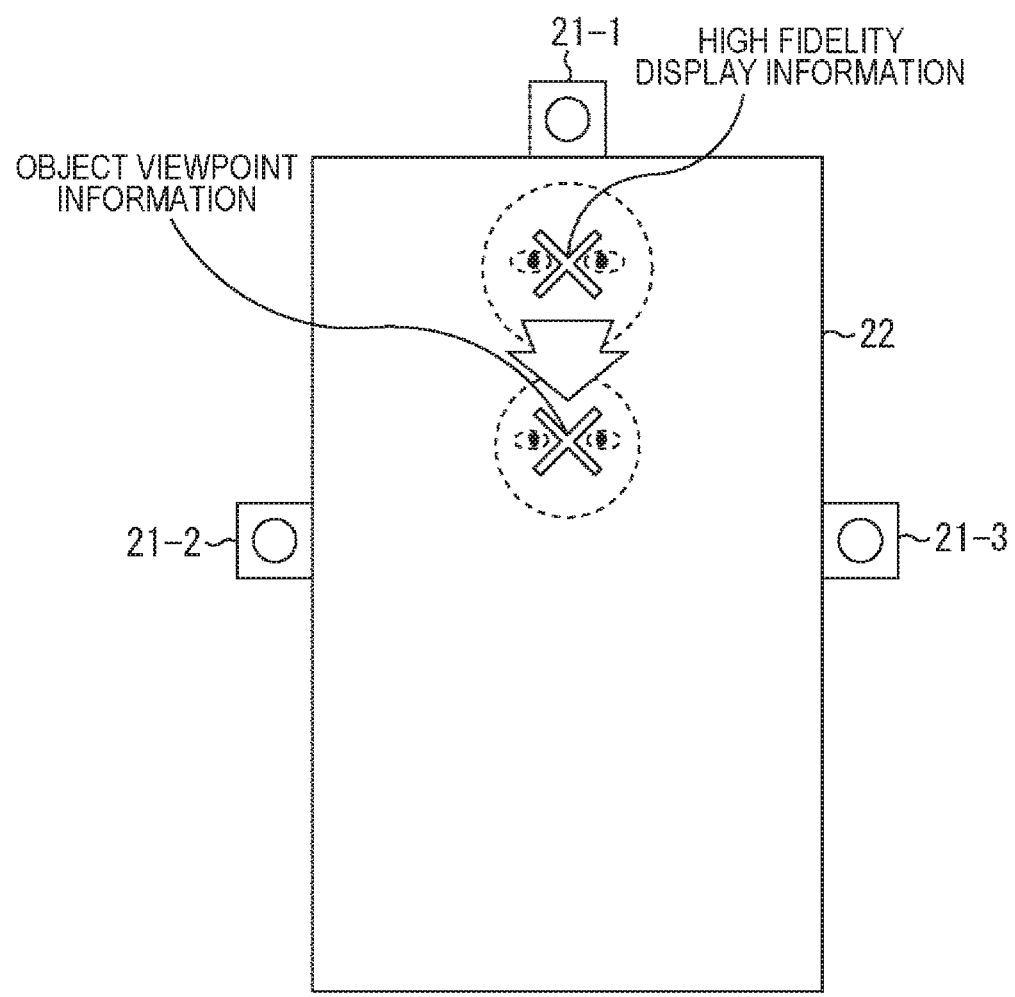
FIG. 29 is a diagram for describing a geometric correction parameter including a scaling component.

Therefore, as illustrated in FIG. 29, a geometric correction parameter including a component that moves in parallel according to a difference between the object viewpoint indicated by the fixed object viewpoint information and the position indicated by the decoded high fidelity display information, and a scaling component with which the area indicated by the decoded high fidelity display information becomes a life size is estimated.

Thereby, the life-size-display geometric correction processing unit 122 applies the geometric correction using the geometric correction parameter supplied from the life-size-display geometric correction parameter estimation unit 131 to generate the pseudo gaze coincidence display image, and outputs and displays the pseudo gaze coincidence display image on the display device 22 in FIG. 1.

The image processing unit 24B configured as described above does not use the measured object viewpoint information as in the image processing unit 24 in FIG. 2. Therefore, the degree of causing the gazes to coincide with each other declines as compared with the image processing unit 24 in FIG. 2. However, the image processing unit 24B has an advantage that the processing of measuring the object viewpoint is not necessary and the effect of causing the gazes to coincide with each other does not depend on calibration accuracy and the like. Therefore, the image processing unit 24B can realize more robust operation while maintaining the effect of performing telecommunication with coincident gazes in a case where change in the viewpoint positions of the respective users is small, for example.

<Fourth Configuration Example of Image Processing Unit>

A fourth configuration example of the image processing unit 24 will be described with reference to FIGS. 30, 31A, and 31B.

Figure 30:
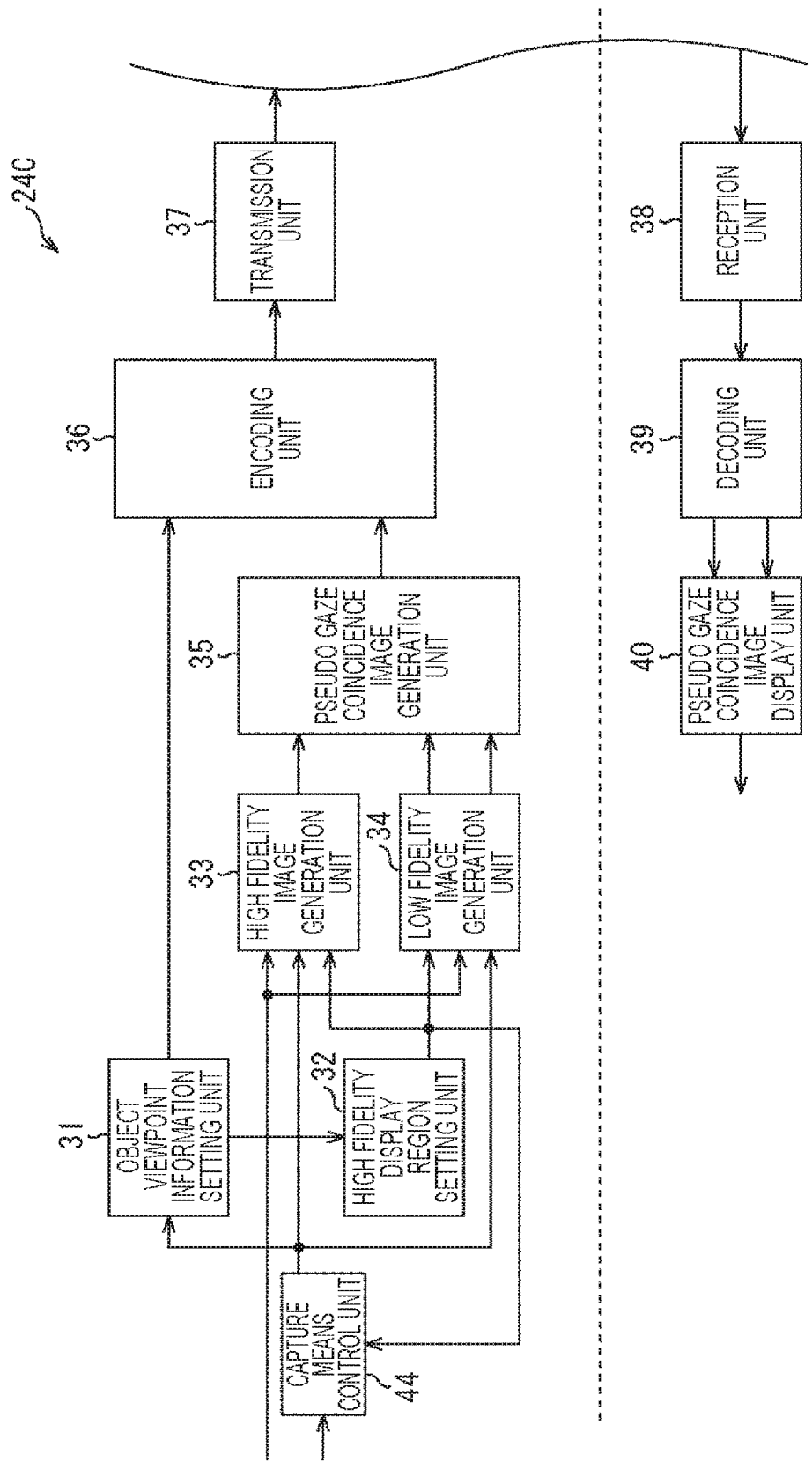
FIG. 30 is a block diagram illustrating a fourth configuration example of the image processing unit.

FIG. 30 is a block diagram illustrating the fourth configuration example of the image processing unit 24. Note that, in an image processing unit 24C illustrated in FIG. 30, configurations common to the image processing unit 24 in FIG. 2 are denoted with the same reference numerals and detailed description of the configurations is omitted.

As illustrated in FIG. 30, the image processing unit 24C has a configuration common to the image processing unit 24 in FIG. 2 in including the object viewpoint information setting unit 31, the high fidelity display region setting unit 32, the high fidelity image generation unit 33, the low fidelity image generation unit 34, the pseudo gaze coincidence image generation unit 35, the encoding unit 36, the transmission unit 37, the reception unit 38, the decoding unit 39, and the pseudo gaze coincidence image display unit 40. Moreover, the image processing unit 24C includes a capture means control unit 44. In other words, the image processing unit 24C has a configuration in which the capture means control unit 44 is newly added to the image processing unit 24 in FIG. 2.

The captured images output from the capture devices 21 are input to the capture means control unit 44, and the capture means control unit 44 can output the input capture signal. Moreover, the capture means control unit 44 feeds back the high fidelity display region information output from the high fidelity display region setting unit 32, thereby changing a focal length, a posture, and the like of the capture devices 21 and controlling (PTZ controlling) pitch, tilt, and zoom.

The PTZ control by the capture means control unit 44 will be described with reference to FIGS. 31A and 31B.

Figure 31:
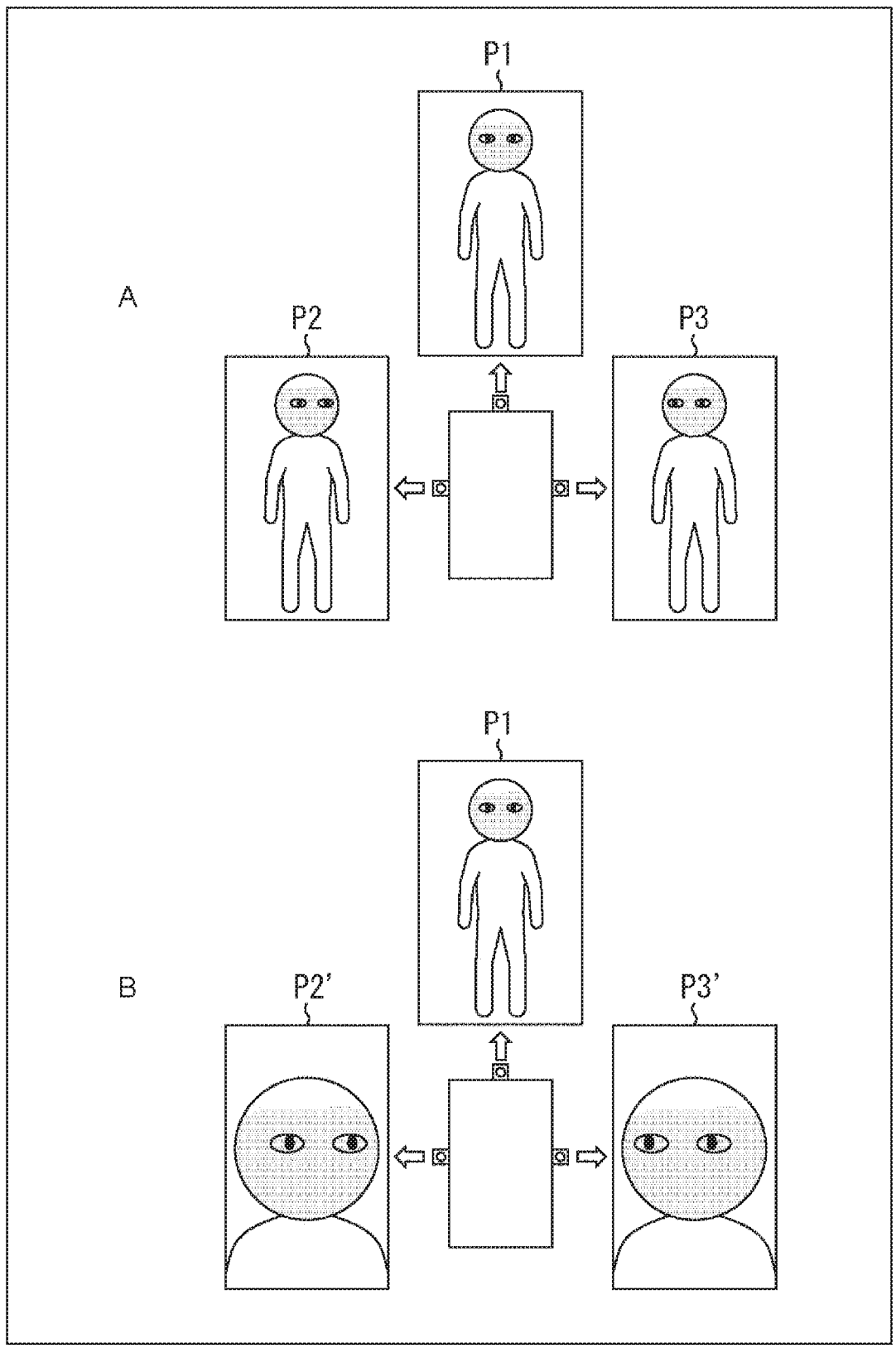
FIGS. 31A and 31B illustrate PTZ control by a capture means control unit.

For example, as illustrated in FIGS. 31A and 31B, an input capture signal in which the captured image P1 captured by the capture device 21-1, the captured image P2 captured by the captured image 21-2, and the captured image P3 captured by the capture device 21-3 are multiplexed is input to the image processing unit 24C. Then, the high fidelity image generation unit 33 generates the high fidelity image using the captured image P2 and the captured image P3, and the low fidelity image generation unit 34 generates the low fidelity image using the captured image P1.

For example, FIG. 31A illustrates the captured images P1 to P3 captured in an initial capture state, regions where the high fidelity display region is set in the high fidelity display region setting unit 32 are hatched in the captured images P1 to P3.

Then, the capture means control unit 44 obtains a ratio of the high fidelity display region to the entire area of the captured images P2 and P3. Then, the capture means control unit 44 performs PTZ control for the capture devices 21-2 and 21-3 such that the ratio becomes a predetermined value in a case where the ratio of the high fidelity display region to the entire area of the captured images P2 and P3 is the predetermined value or less. In other words, the capture means control unit 44 performs zoom control to make the high fidelity display region wide (pan or tilt control as needed) in a case where the high fidelity display region is narrow in the captured images P2 and P3.

Thereby, as illustrated in FIG. 31B, the high fidelity display regions are captured widely with respect to the respective entire areas such that the ratios of the high fidelity display regions become the predetermined value in captured images P2' and P3' for which the zoom control has been performed.

Therefore, in the image processing unit 24C, the captured images P2' and P3' with the high fidelity display regions zoomed by the capture means control unit 44 are supplied to the high fidelity image generation unit 33. Thereby, the high fidelity image generation unit 33 can generate the high fidelity image with a higher resolution, and the pseudo gaze coincidence image generation unit 35 can generate the pseudo gaze coincidence display image having the high fidelity display region with an enhanced resolution.

The image processing unit 24C configured as described above can generate the high fidelity image with a higher resolution by the pseudo gaze coincidence display image having the high fidelity display region with an enhanced resolution, and can perform more realistic telecommunication.

<Fifth Configuration Example of Image Processing Unit>

A fifth configuration example of the image processing unit 24 will be described with reference to FIGS. 32, 33, 34, 35A, and 35B.

Figure 32:
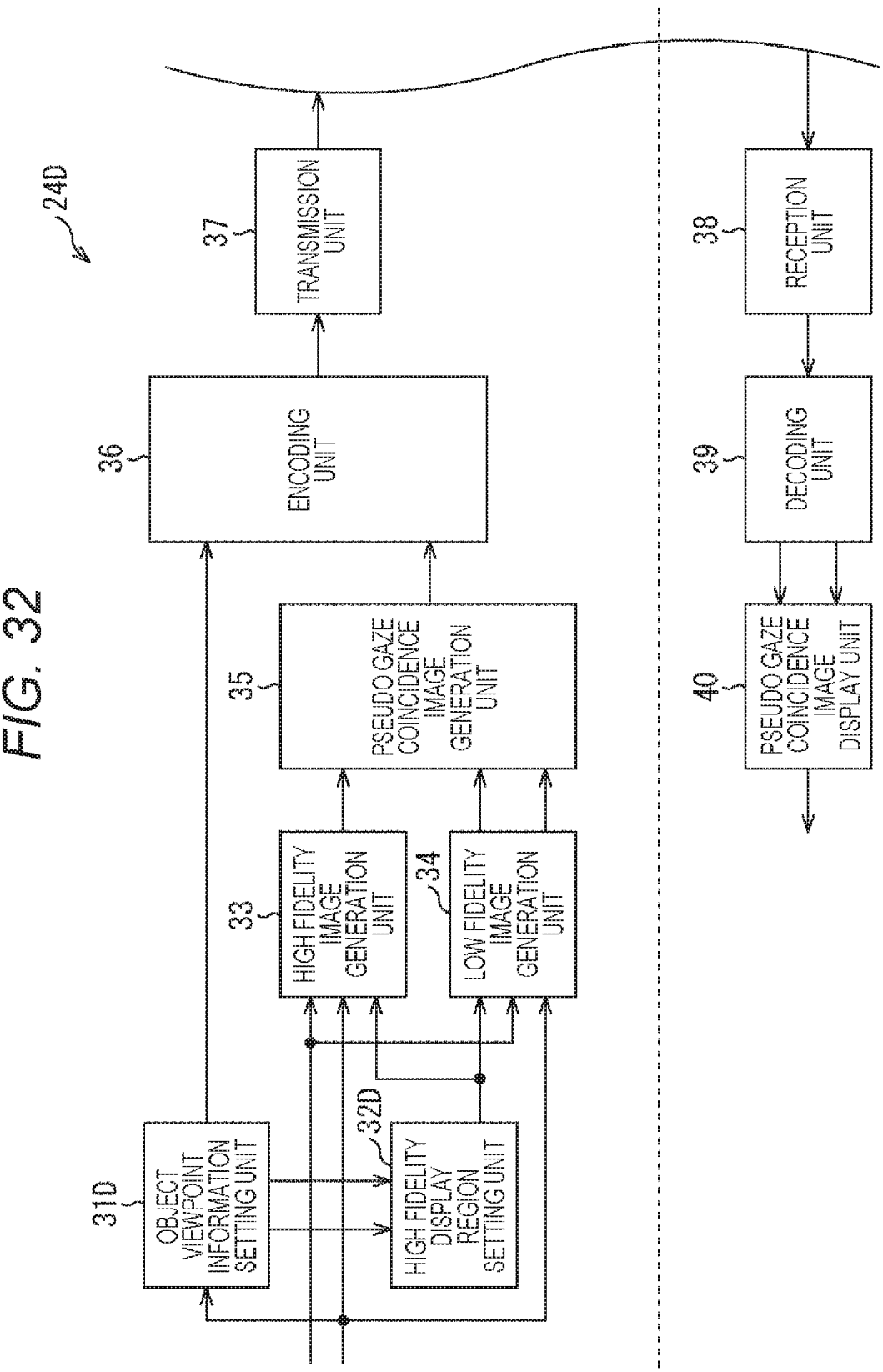
FIG. 32 is a block diagram illustrating a fifth configuration example of the image processing unit.

FIG. 32 is a block diagram illustrating the fifth configuration example of the image processing unit 24. Note that, in an image processing unit 24D illustrated in FIG. 32, configurations common to the image processing unit 24 in FIG. 2 are denoted with the same reference numerals and detailed description of the configurations is omitted.

As illustrated in FIG. 32, the image processing unit 24D has a configuration common to the image processing unit 24 in FIG. 2 in including the high fidelity image generation unit 33, the low fidelity image generation unit 34, the pseudo gaze coincidence image generation unit 35, the encoding unit 36, the transmission unit 37, the reception unit 38, the decoding unit 39, and the pseudo gaze coincidence image display unit 40. Moreover, the image processing unit 24D includes an object viewpoint information setting unit 31D and a high fidelity display region setting unit 32D.

Figure 33:
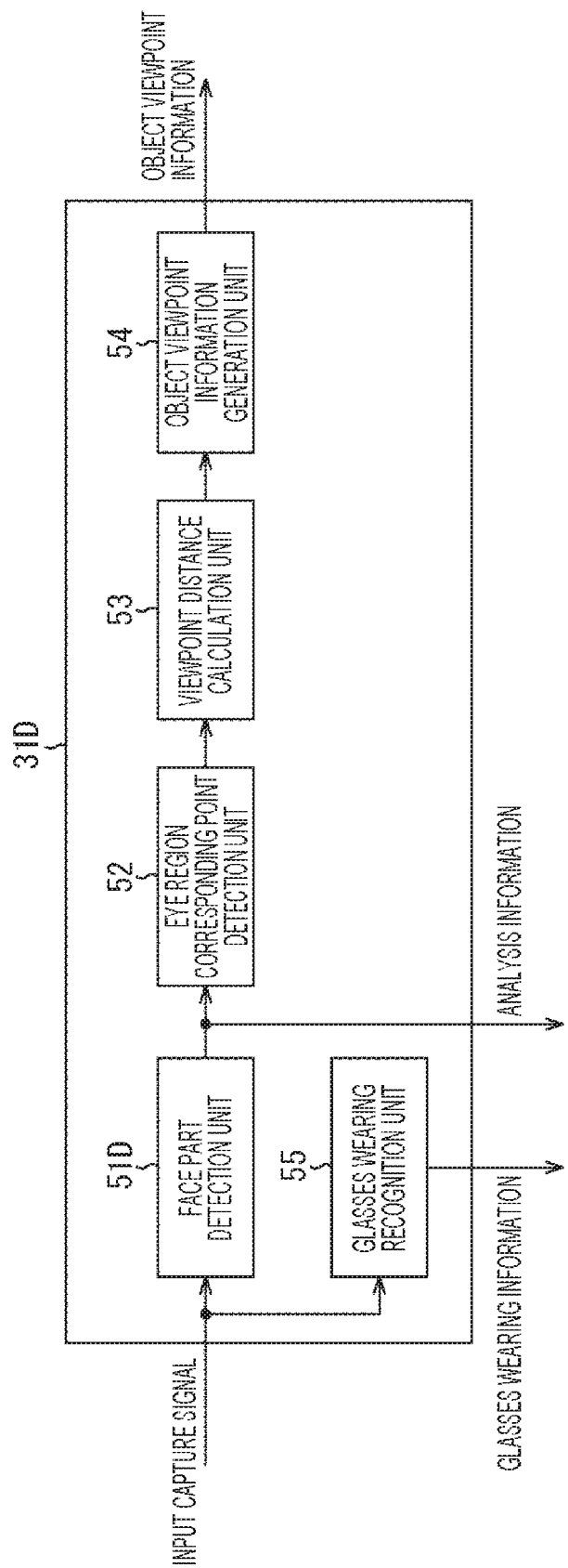
FIG. 33 is a block diagram illustrating a configuration example of an object viewpoint information setting unit in FIG. 32.

FIG. 33 is a block diagram illustrating a configuration example of the object viewpoint information setting unit 31D in FIG. 32.

As illustrated in FIG. 33, the object viewpoint information setting unit 31D has a common configuration to the object viewpoint information setting unit 31 in FIG. 3 in including the eye region corresponding point detection unit 52, the viewpoint distance calculation unit 53, and the object viewpoint information generation unit 54, and further includes a face part detection unit 51D and a glasses wearing recognition unit 55.

The face part detection unit 51D detects reliability of when detecting face parts in addition to the coordinates of the characteristic points of the parts of the face included in the captured images, similarly to the face part detection unit 51 in FIG. 3, and outputs the analysis information including the reliability to the high fidelity display region setting unit 32D.

The glasses wearing recognition unit 55 recognizes whether or not a pair of glasses is worn on the face captured in the captured image. Then, in a case where the glasses wearing recognition unit 55 recognizes that a pair of glasses is worn, the glasses wearing recognition unit 55 outputs glasses wearing information indicating the recognition to the high fidelity display region setting unit 32D. Note that the glasses wearing recognition unit 55 is available as attribute information of a general face recognition technology.

Figure 34:
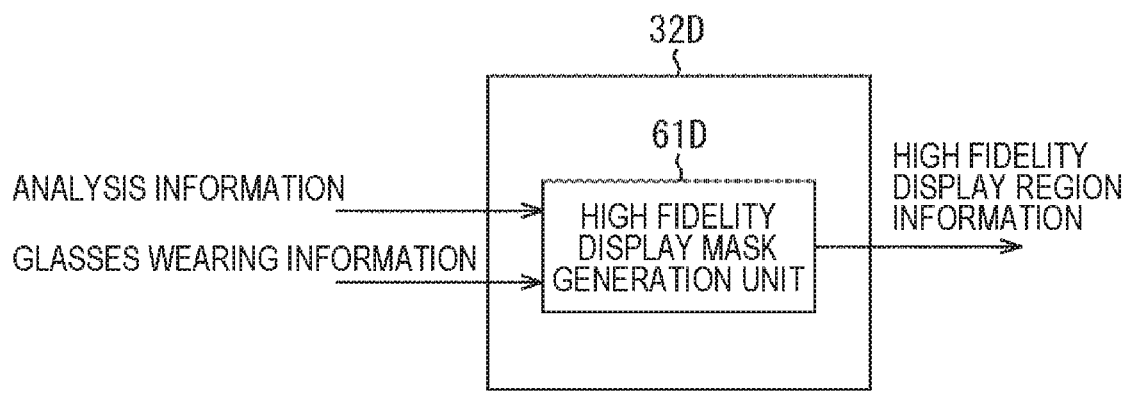
FIG. 34 is a block diagram illustrating a configuration example of a high fidelity display region setting unit in FIG. 32.

FIG. 34 is a block diagram illustrating a configuration example of the high fidelity display region setting unit 32D in FIG. 32.

As illustrated in FIG. 34, the high fidelity display region setting unit 32D includes a high fidelity display mask generation unit 61D, and the analysis information and the glasses wearing information are supplied to the high fidelity display mask generation unit 61D.

In the case where the glasses wearing information indicates that a pair of glasses is recognized to be worn, the high fidelity display mask generation unit 61D sets the high fidelity display region, avoiding a portion where a rim of the glasses is present from the face captured in the captured image. For example, artifacts is determined to be likely to occur in the portion where the rim of the glasses is present, so by avoiding the portion and setting the high fidelity display region, data errors, distortion of signals, and the like can be avoided.

Figure 35:
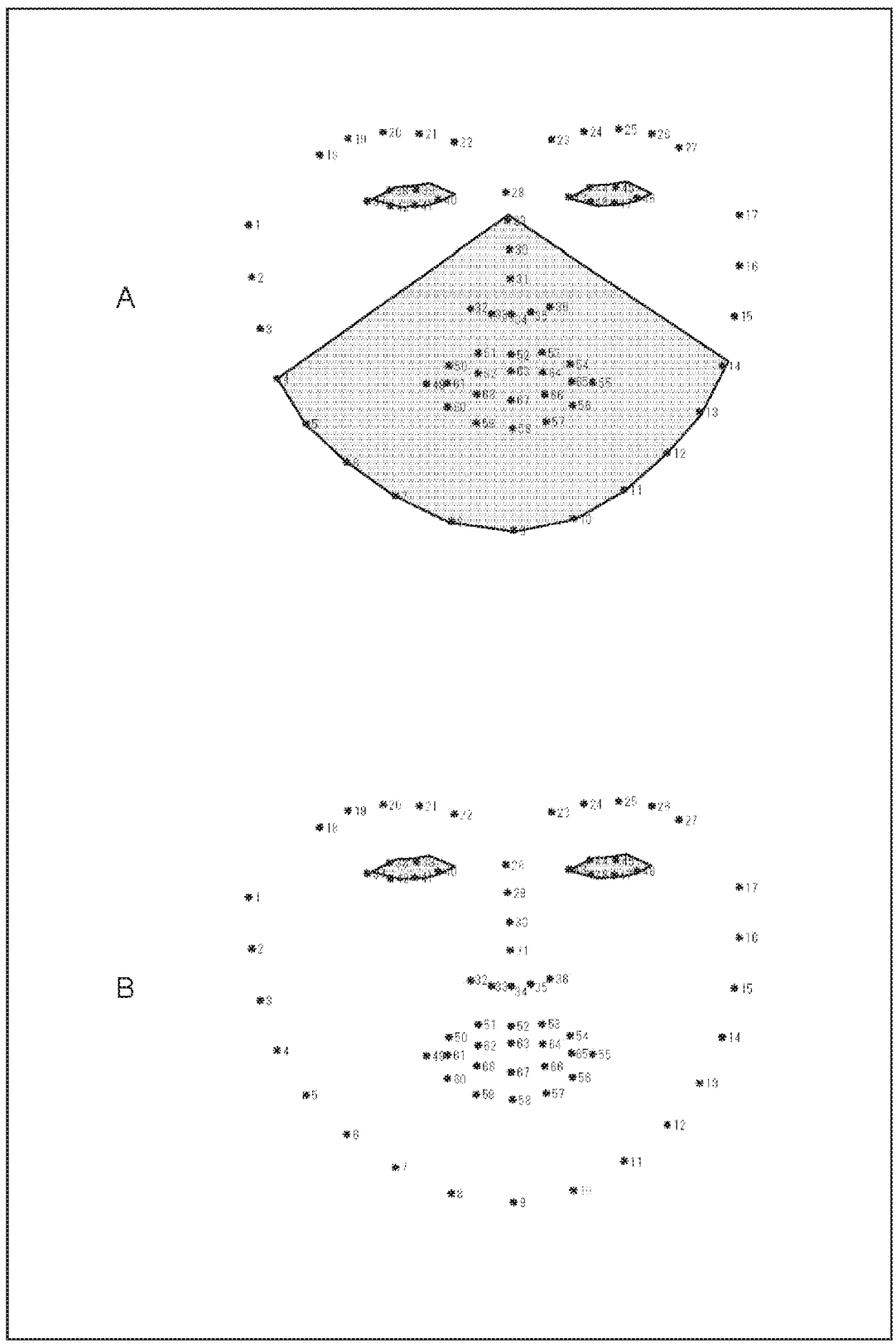
FIGS. 35A and 35B are diagrams for describing a high fidelity display region set to avoid a portion where a rim of glasses exists from a face.

For example, as illustrated in FIG. 35A, the high fidelity display region is set in a region avoiding the portion where the rim of the glasses is present, as compared with the above-described mask image in FIG. 7A.

Furthermore, the high fidelity display mask generation unit 61D may set the high fidelity display region in only regions of the eyes, as illustrated in FIG. 35B, in a case where the reliability of the face parts such as a contour portion of the face is determined to be low on the basis of the analysis information.

The image processing unit 24D configured as described above can generate the high fidelity image, avoiding the region where the possibility of occurrence of artifacts is high, in the subsequent high fidelity image generation unit 33, by setting the high fidelity display region information using the glasses wearing information, the reliability, and the like. Therefore, the fidelity of the high fidelity image can be enhanced and more realistic telecommunication can be performed.

<Sixth Configuration Example of Image Processing Unit>

A sixth configuration example of the image processing unit 24 will be described with reference to FIGS. 36, 37, 38A and 38B.

Figure 36:
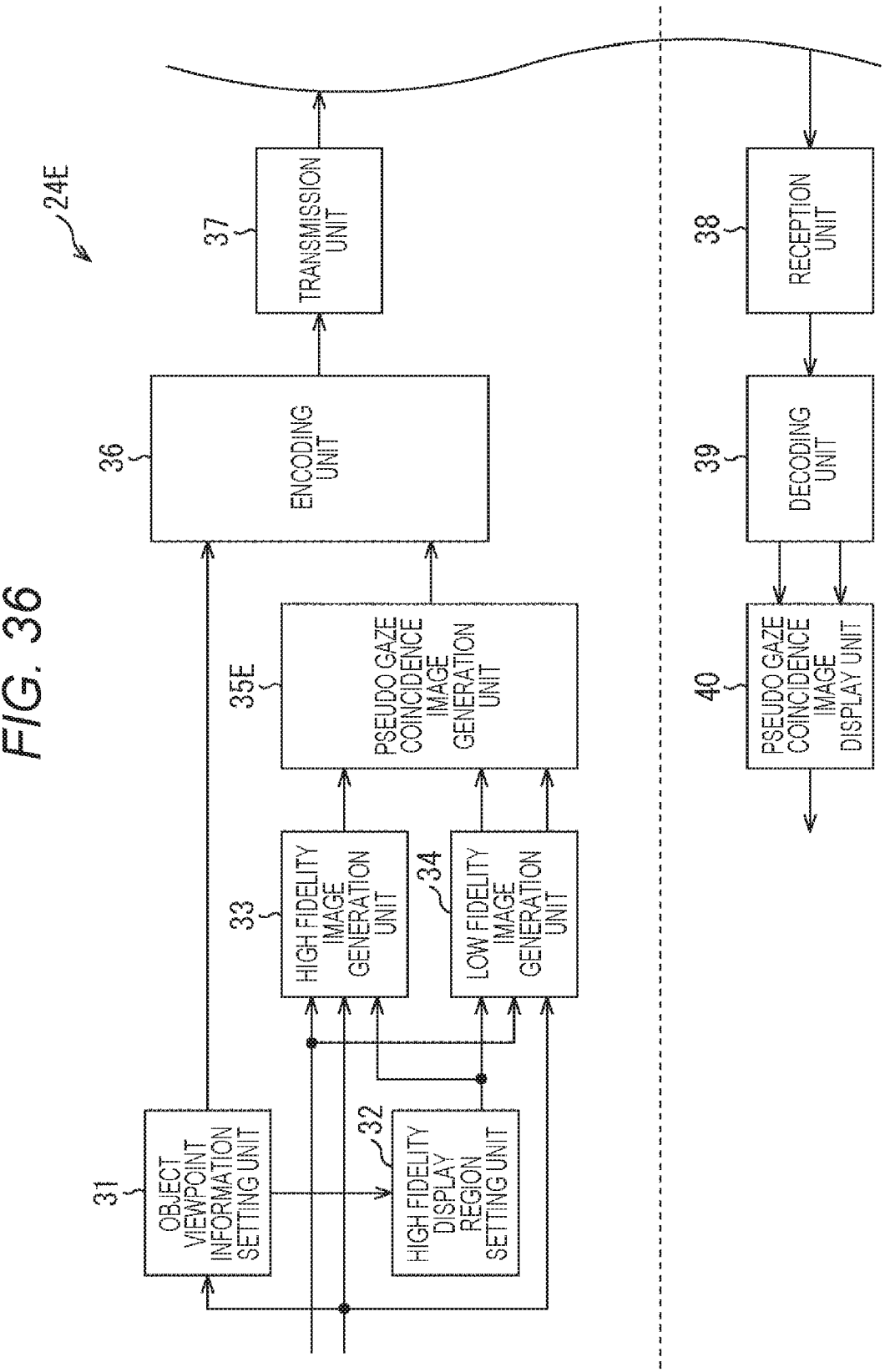
FIG. 36 is a block diagram illustrating a sixth configuration example of the image processing unit.

FIG. 36 is a block diagram illustrating the sixth configuration example of the image processing unit 24. Note that, in an image processing unit 24E illustrated in FIG. 36, configurations common to the image processing unit 24 in FIG. 2 are denoted with the same reference numerals and detailed description of the configurations is omitted.

As illustrated in FIG. 36, the image processing unit 24E has a configuration common to the image processing unit 24 in FIG. 2 in including the object viewpoint information setting unit 31, the high fidelity display region setting unit 32, the high fidelity image generation unit 33, the low fidelity image generation unit 34, the encoding unit 36, the transmission unit 37, the reception unit 38, the decoding unit 39, and the pseudo gaze coincidence image display unit 40. Moreover, the image processing unit 24E includes a pseudo gaze coincidence image generation unit 35E.

Figure 37:
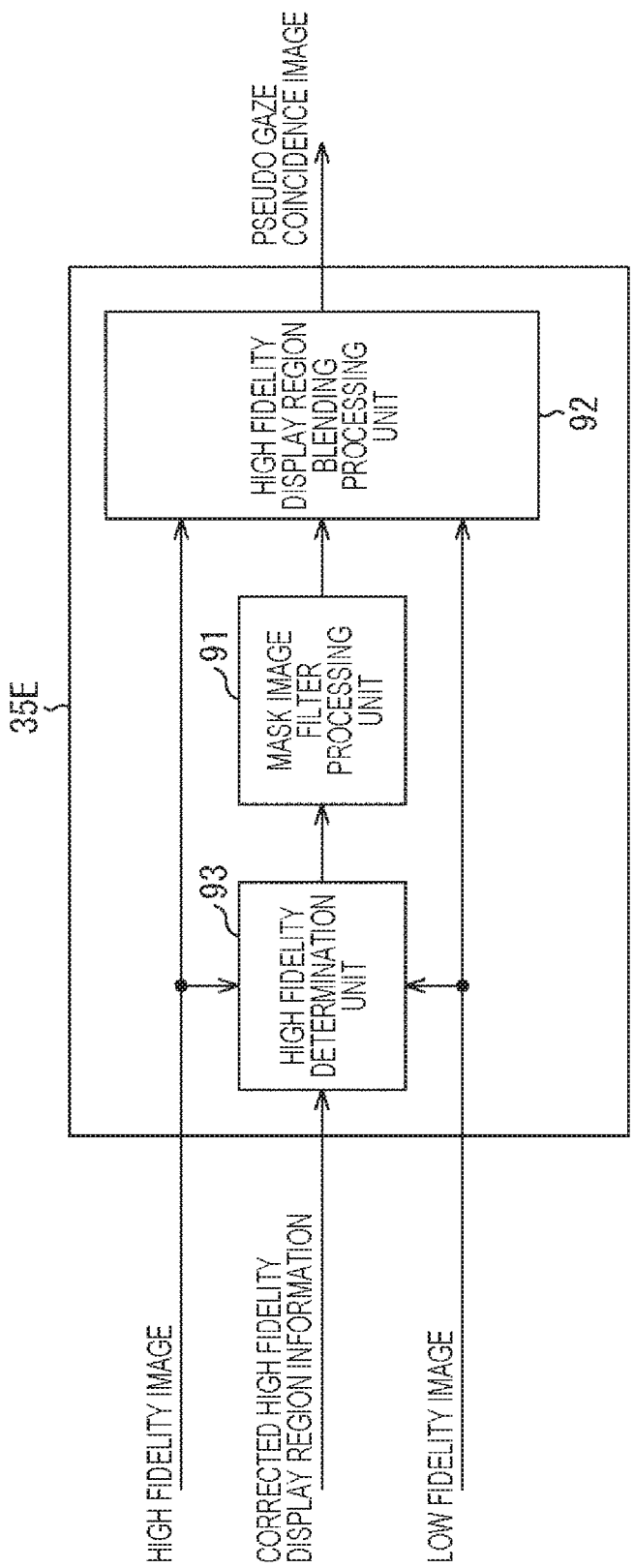
FIG. 37 is a block diagram illustrating a configuration example of a pseudo gaze coincidence image generation unit in FIG. 36.

FIG. 37 is a block diagram illustrating a configuration example of the pseudo gaze coincidence image generation unit 35E in FIG. 36.

As illustrated in FIG. 37, the pseudo gaze coincidence image generation unit 35E has a common configuration to the pseudo gaze coincidence image generation unit 35 in FIG. 16 in including the mask image filter processing unit 91 and the high fidelity display region blending processing unit 92, and further includes a high fidelity determination unit 93.

The high fidelity determination unit 93 determines similarity of image data of the high fidelity image and the low fidelity image in the corrected high fidelity display region indicated by the corrected high fidelity display region information supplied from the low fidelity image generation unit 34. For example, the high fidelity determination unit 93 can obtain the similarity of the image data according to a ratio of coincidence of the positions of the parts of the faces between the high fidelity image and the low fidelity image. In other words, in a case where the ratio of coincidence of the positions of the parts of the faces is high between the high fidelity image and the low fidelity image, the similarity of the image data is high. In a case where the ratio of coincidence of the positions of the parts of the faces is low between the high fidelity image and the low fidelity image, the similarity of the image data is low.

Then, the high fidelity determination unit 93 generates a blend ratio map image in which the blend ratio is set such that the blend ratio of the high fidelity image becomes higher as the similarity is higher, and the blend ratio of the high fidelity image becomes lower as the similarity is lower, and supplies the blend ratio map image to the mask image filter processing unit 91.

Determination process by the high fidelity determination unit 93 will be described with reference to FIGS. 38A and 38B.

Figure 38:
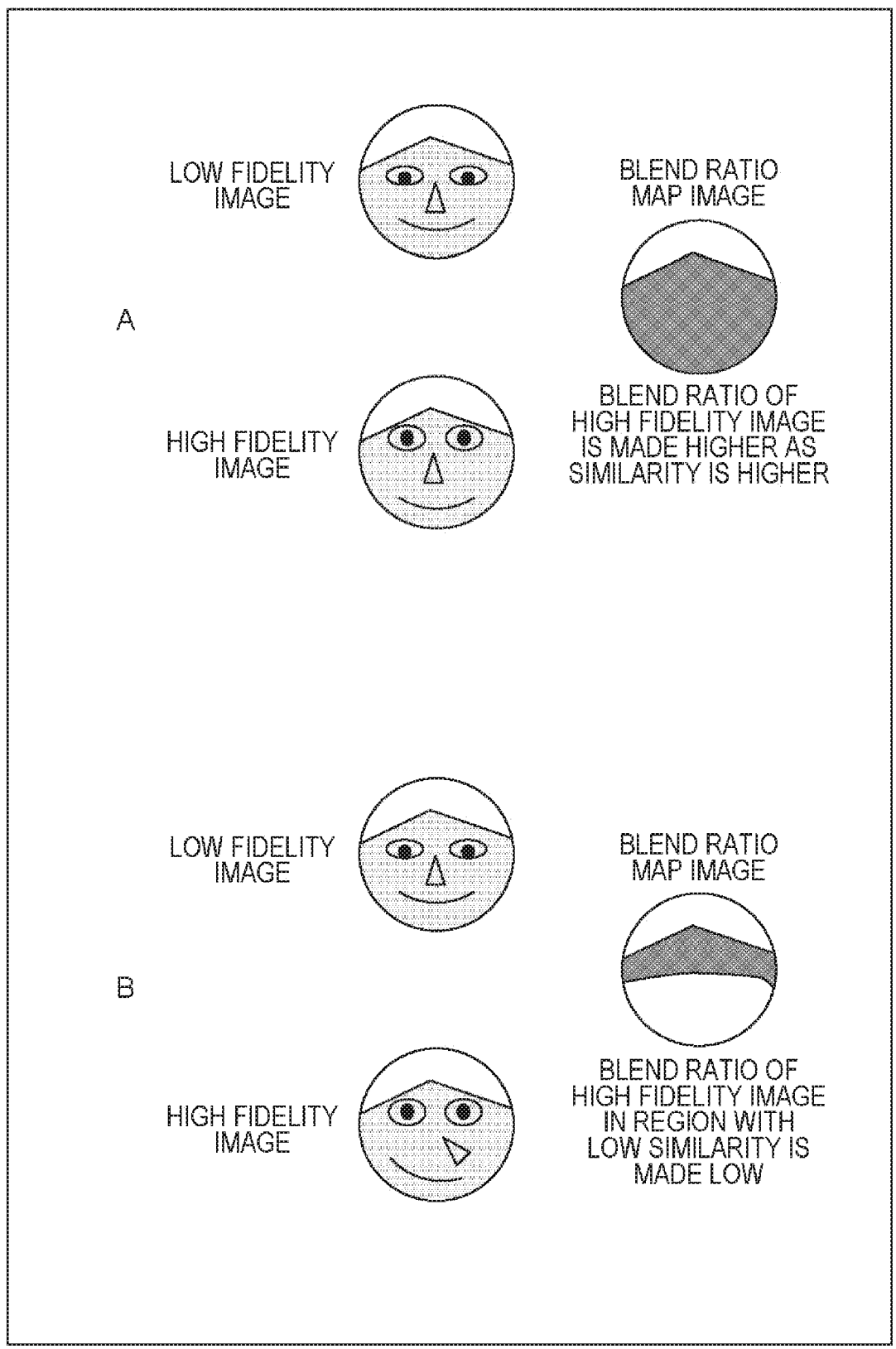
FIGS. 38A and 38B are diagrams for describing determination processing by a high fidelity determination unit.

In FIGS. 38A and 38B, the corrected high fidelity display regions indicated by the corrected high fidelity display region information are slightly hatched in the low fidelity image and the high fidelity image. Furthermore, in the blend ratio map image, the blend ratio of the high fidelity image is made higher (darker hatching) in the region with high similarity, and the blend ratio of the high fidelity image is made lower in the region with low similarity.

For example, FIG. 38A illustrates an example of high similarity of the image data of the high fidelity image and the low fidelity image in the corrected high fidelity display regions. Therefore, the blend ratio map image in which the blend ratio of the high fidelity image is set to be high is generated for the entire corrected high fidelity display region.

Meanwhile, FIG. 38B illustrates an example of low similarity of the image data of the high fidelity image and the low fidelity image in the corrected high fidelity display region, in which noses, mouths, and the like are shifted and synthesized. Therefore, the similarity is low in the regions of the noses, mouths, and the like, and the blend ratio map image in which the blend ratio of the high fidelity image in the region is set to be low is generated.

As described above, the determination processing by the high fidelity determination unit 93 is performed, and the blend ratio map image according to the similarity is supplied to the mask image filter processing unit 91. Note that subsequent processing of the mask image filter processing unit 91 is similarly performed to the image processing unit 24 in FIG. 2.

The image processing unit 24E configured as described above can display the image without generating artifacts although the effect of causing the gazes to coincide with each other decreases in a case where the quality of the high fidelity image generated by the viewpoint interpolation processing is poor.

<Seventh Configuration Example of Image Processing Unit>

A seventh configuration example of the image processing unit 24 will be described with reference to FIGS. 39 to 43.

Figure 39:
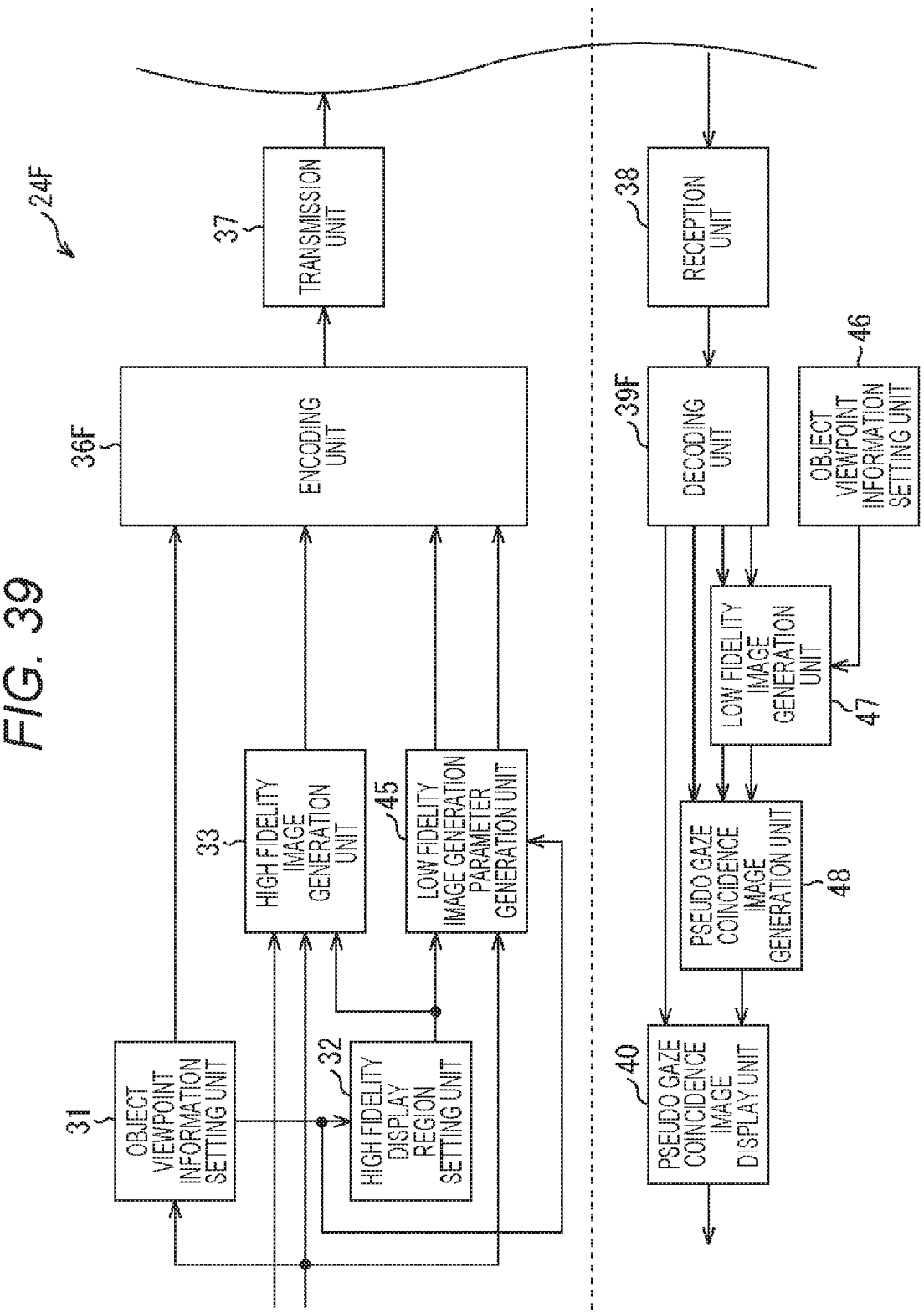
FIG. 39 is a block diagram illustrating a seventh example of the image processing unit.

FIG. 39 is a block diagram illustrating the seventh configuration example of the image processing unit 24. Note that, in an image processing unit 24F illustrated in FIG. 39, configurations common to the image processing unit 24 in FIG. 2 are denoted with the same reference numerals and detailed description of the configurations is omitted.

As illustrated in FIG. 39, the image processing unit 24F has a configuration common to the image processing unit 24 in FIG. 2 in including the object viewpoint information setting unit 31, the high fidelity display region setting unit 32, the high fidelity image generation unit 33, the transmission unit 37, the reception unit 38, and the pseudo gaze coincidence image display unit 40. Moreover, the image processing unit 24F includes an encoding unit 36F, a decoding unit 39F, a low fidelity image generation parameter generation unit 45, an object viewpoint information setting unit 46, a low fidelity image generation unit 47, and a pseudo gaze coincidence image generation unit 48.

For example, in the image processing unit 24F, processing is different from the processing of the image processing unit 24 in FIG. 2 in that the low fidelity image is configured by a computer graphic (CG) avatar animation. In other words, in the image processing unit 24F, the low fidelity image generation parameter generation unit 45 arranged on the transmission side generates a parameter for generating the low fidelity image with the CG avatar animation. Then, in the image processing unit 24F, the low fidelity image generation unit 47 arranged on the reception side generates the low fidelity image with the CG avatar animation.

Furthermore, in the image processing unit 24F, the viewpoint position of the other party's user (the decoded object viewpoint information described with reference to FIG. 2, for example) is used in the high fidelity image generation unit 33 on the transmission side. Meanwhile, the low fidelity image generation unit 47 is arranged after the reception and thus uses the information of the viewpoint position of the principal user set in the object viewpoint information setting unit 46, unlike the low fidelity image generation unit 34 in FIG. 2.

Figure 40:
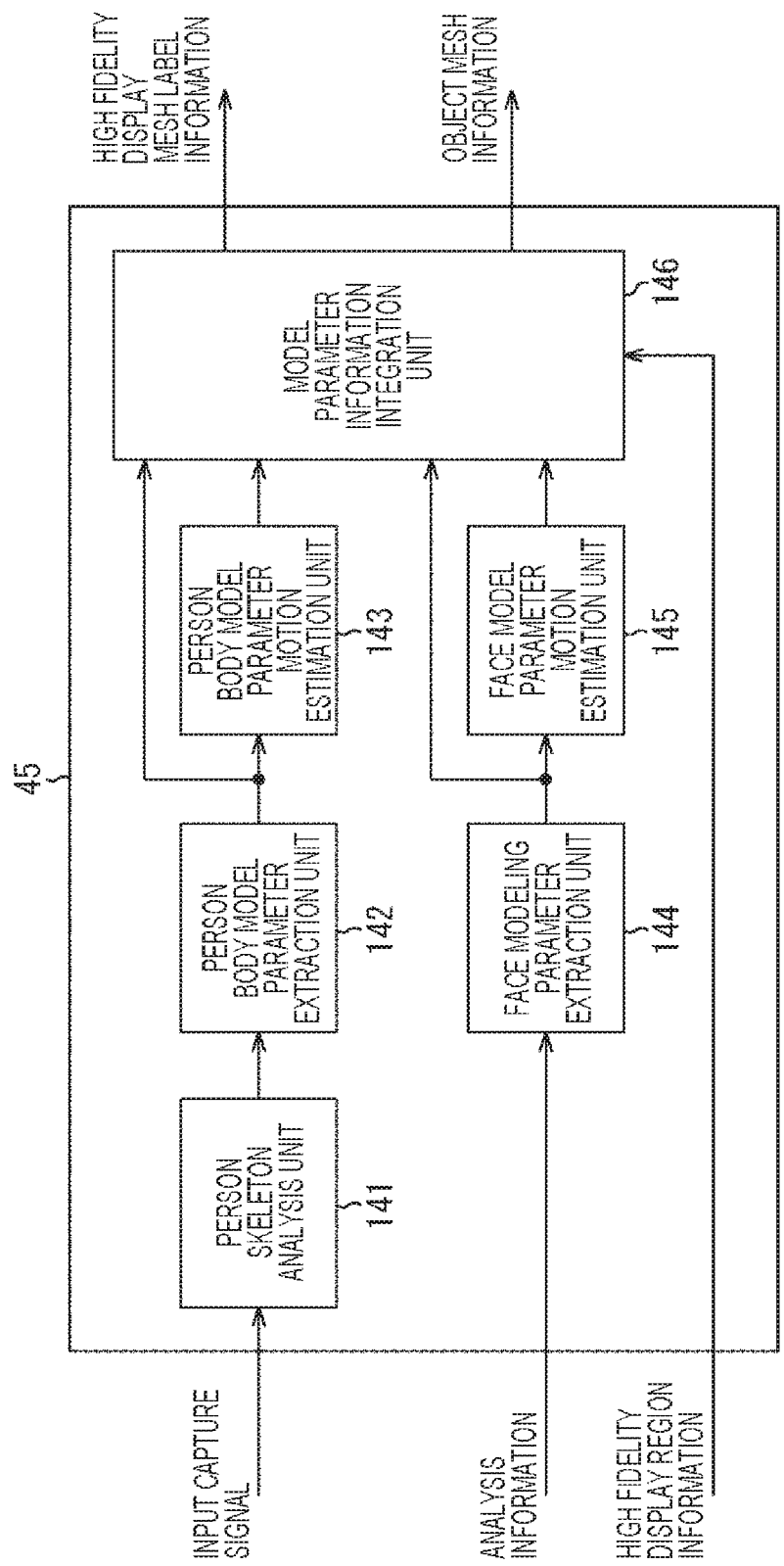
FIG. 40 is a block diagram illustrating a configuration example of a low fidelity image generation parameter generation unit in FIG. 39.

FIG. 40 is a block diagram illustrating a configuration example of the low fidelity image generation parameter generation unit 45 in FIG. 39.

As illustrated in FIG. 40, the low fidelity image generation parameter generation unit 45 includes a person skeleton analysis unit 141, a person body model parameter extraction unit 142, a person body model parameter motion estimation unit 143, a face modeling parameter extraction unit 144, a face model parameter motion estimation unit 145, and a model parameter information integration unit 146.

The person skeleton analysis unit 141 generates person skeleton information for a part of the captured images obtained from the input video signal, and supplies the person skeleton information to the person body model parameter extraction unit 142.

The person body model parameter extraction unit 142 generates person mesh information on the basis of the person skeleton information supplied from the person skeleton analysis unit 141, and supplies the person mesh information to the person body model parameter motion estimation unit 143 and the model parameter information integration unit 146.

The person body model parameter motion estimation unit 143 obtains person mesh motion information corresponding to a motion of the object and indicating a motion of a vertex of each mesh of the person mesh information (or a mesh geometric transformation parameter), and supplies the person mesh information to the model parameter information integration unit 146.

The face modeling parameter extraction unit 144 generates face mesh information according to face part positions indicated by the analysis information, using the analysis information obtained from the input video signal.

The face model parameter motion estimation unit 145 obtains face mesh motion information corresponding to a motion of the face and indicating a motion of a vertex of each mesh of the face mesh information (or a mesh geometric transformation parameter), and supplies the face mesh motion information to the model parameter information integration unit 146.

The model parameter information integration unit 146 integrates the person mesh information, the person mesh motion information, the face mesh information, and the face mesh motion information, and outputs the integrated information as object mesh information. Moreover, the model parameter information integration unit 146 labels a mesh corresponding to the high fidelity display region information, of the meshes configured by the object mesh information, and outputs the labeled mesh as high fidelity display mesh label information.

Figure 41:
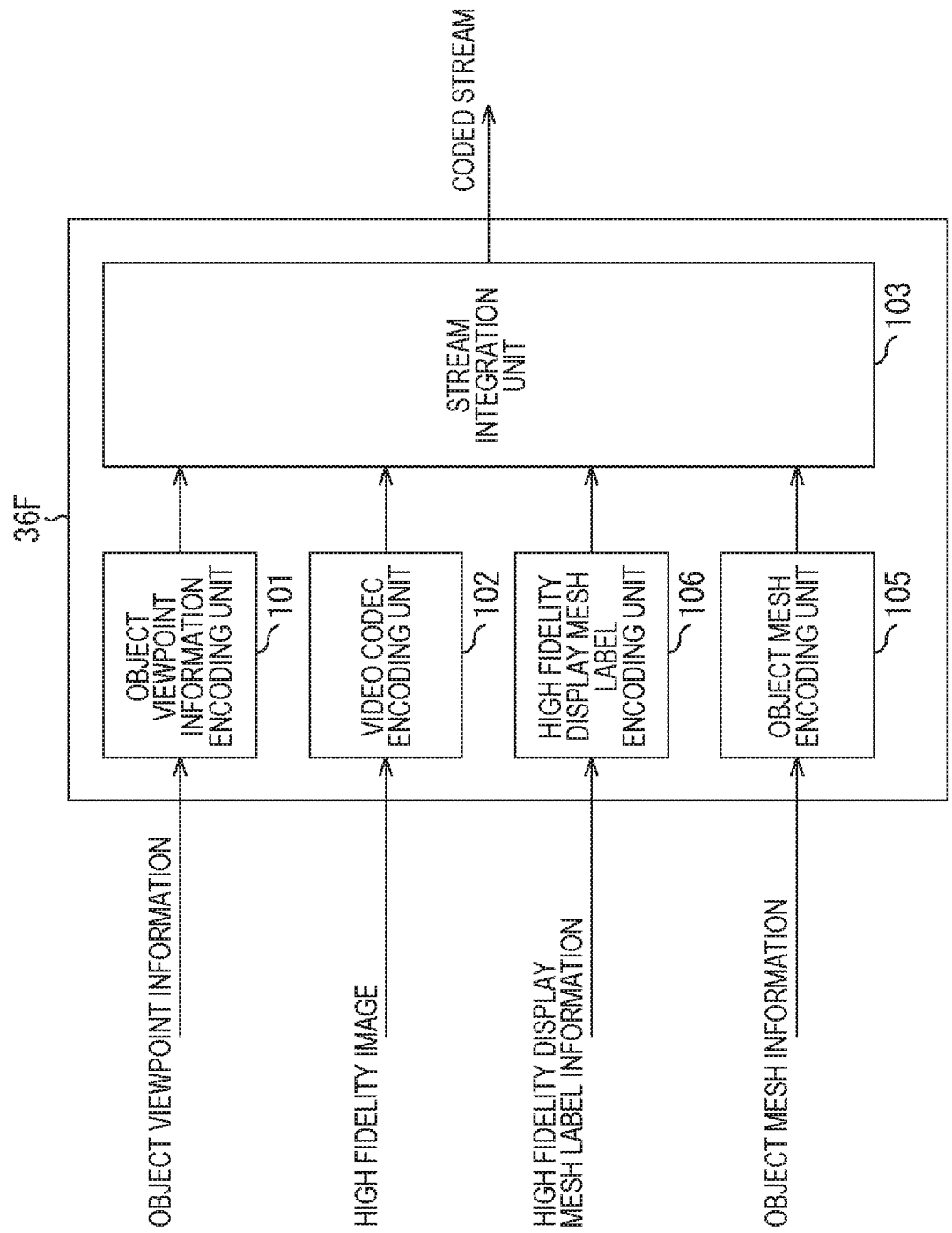
FIG. 41 is a block diagram illustrating a configuration example of an encoding unit in FIG. 39.

FIG. 41 is a block diagram illustrating a configuration example of an encoding unit 36F in FIG. 39.

As illustrated in FIG. 41, the encoding unit 36F has a common configuration to the encoding unit 36 in FIG. 17 in including the object viewpoint information encoding unit 101, the video codec encoding unit 102, and the stream integration unit 103, and further includes an object mesh encoding unit 105 and a high fidelity display mesh label encoding unit 106.

The object viewpoint information encoding unit 101 encodes the object viewpoint information and supplies the encoded object viewpoint information to the stream integration unit 103 as the additional stream.

The video codec encoding unit 102 encodes the high fidelity image using various codecs as described above, and supplies the encoded high fidelity image to the stream integration unit 103 as the video stream.

The object mesh encoding unit 105 encodes the object mesh information, and supplies the encoded object mesh information to the stream integration unit 103 as an object mesh stream.

The high fidelity display mesh label encoding unit 106 encodes the fidelity display mesh label information, and supplies the encoded fidelity display mesh label information to the stream integration unit 103 as high fidelity display mesh label stream.

The stream integration unit 103 integrates the additional stream, the video stream, the object mesh stream, and the high fidelity display mesh label stream, and outputs the integrated streams to the transmission unit 37 as the coded stream.

Figure 42:
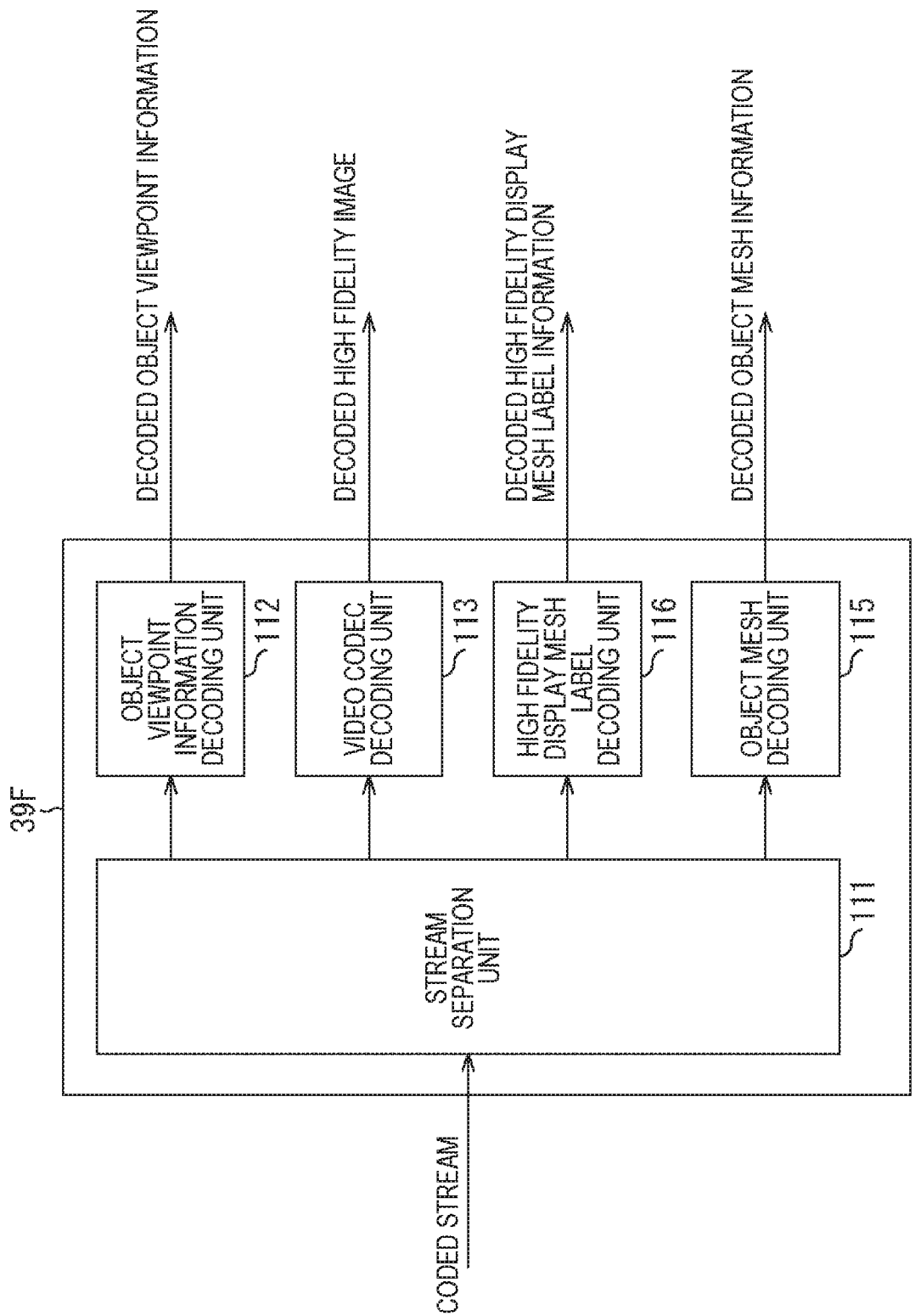
FIG. 42 is a block diagram illustrating a configuration example of a decoding unit in FIG. 39.

FIG. 42 is a block diagram illustrating a configuration example of a decoding unit 39F in FIG. 39.

As illustrated in FIG. 42, the decoding unit 39F has a common configuration to the decoding unit 39 in FIG. 18 in including the stream separation unit 111, the object viewpoint information decoding unit 112, and the video codec decoding unit 113, and further includes an object mesh decoding unit 115 and a high fidelity display mesh label decoding unit 116.

For example, in the decoding unit 39F, the stream separation unit 111 separates the coded stream supplied from the reception unit 38 in FIG. 39 into the additional stream, the video stream, the object mesh stream, and the high fidelity display mesh label stream. Then, the stream separation unit 111 supplies the object mesh stream to the object mesh decoding unit 115 and supplies the high fidelity display mesh label stream to the high fidelity display mesh label decoding unit 116.

The object mesh decoding unit 115 decodes the object mesh stream supplied from the stream separation unit 111 to decoded object mesh information, and outputs the decoded object mesh information.

The high fidelity display mesh label decoding unit 116 decodes the high fidelity display mesh label stream supplied from the stream separation unit 111 to decoded high fidelity display mesh label information, and outputs the decoded high fidelity display mesh label information.

Figure 43:
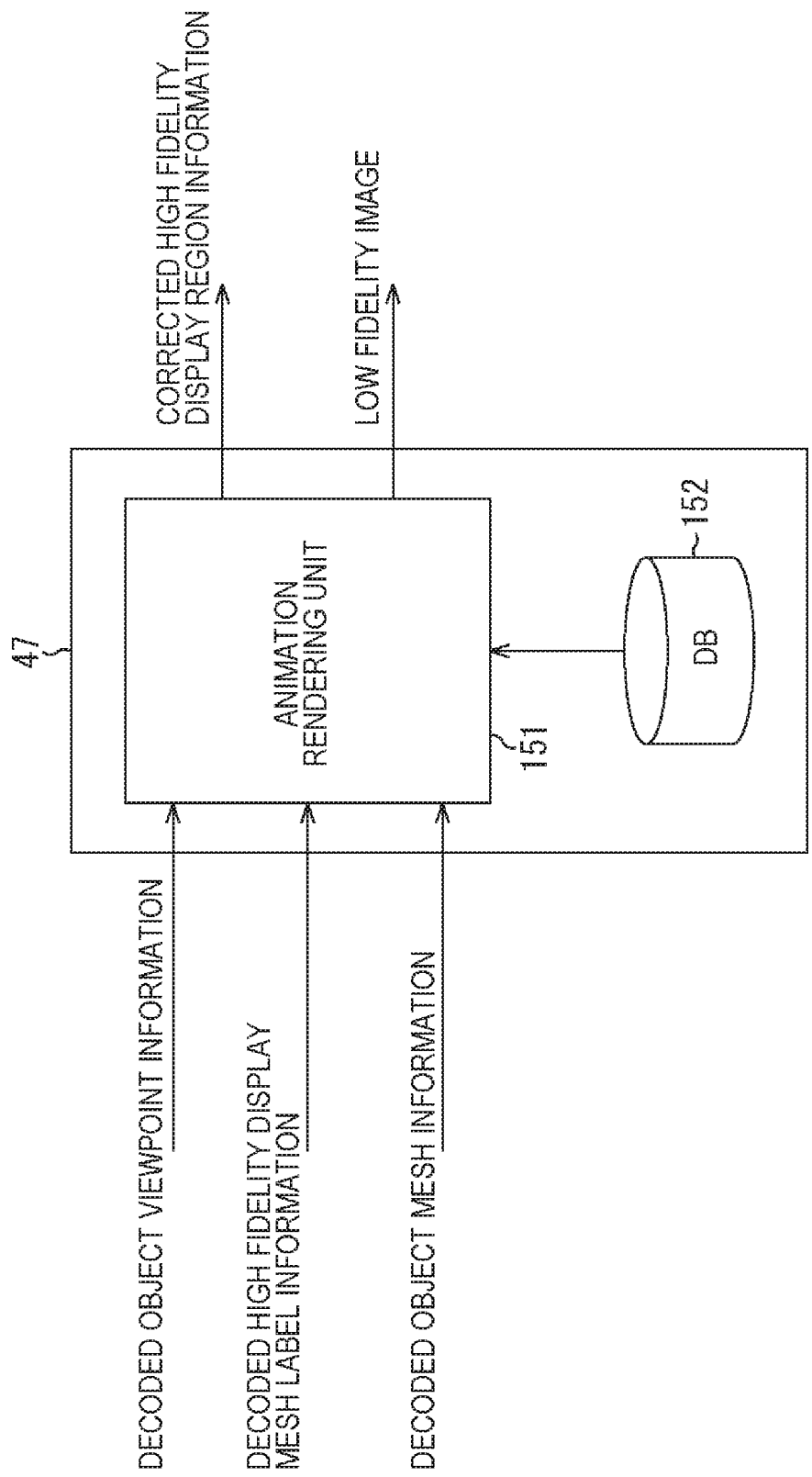
FIG. 43 is a block diagram illustrating a configuration example of a low fidelity image generation unit in FIG. 39.

FIG. 43 is a block diagram illustrating a configuration example of the low fidelity image generation unit 47 in FIG. 39.

As illustrated in FIG. 43, the low fidelity image generation unit 47 includes an animation rendering unit 151 and a database 152. Then, the low fidelity image generation unit 47 renders the CG avatar animation to generate the low fidelity image.

The animation rendering unit 151 performs rendering such that the object is displayed in a life size manner on the display device 22 as viewed from the viewpoint of the other party's user indicated by the object viewpoint information. The animation rendering unit 151 can perform rendering for a 3D mesh structure configured by the object mesh information with the other party's user as the object by acquiring various types of information (texture information, actual size information, background CG information, light source information, and the like) registered in advance in the database 152.

Moreover, the animation rendering unit 151 reproduces animation according to motion information included in the object mesh information, and outputs the animation as the low fidelity image. At the same time, the animation rendering unit 151 generates the mask image corresponding to a region indicated by the decoded high fidelity display mesh label information, and outputs the mask image as the corrected high fidelity display region information.

Note that the pseudo gaze coincidence image generation unit 48 generates the pseudo gaze coincidence image using the corrected high fidelity display region information and the low fidelity image, and the decoded high fidelity image in place of the high fidelity image, similarly to the processing performed by the pseudo gaze coincidence image generation unit 35 in FIG. 2. Moreover, the pseudo gaze coincidence image display unit 40 generates and outputs the pseudo gaze coincidence display image to the display device 22, similarly to FIG. 2.

The image processing unit 24F configured as described above transmits the parameter for generating the low fidelity image with the CG avatar animation to the other party side, and can generate the low fidelity image with the CG avatar animation on the basis of the parameter transmitted from the other party side.

According to the image processing unit 24 in each of the above-described embodiments, the users of the telecommunication apparatus 12 can perform more realistic telecommunication using life-size video and live-action-based avatar animation. At this time, a video communication experience for causing mutual gazes to coincide with each other in consideration of the viewpoint positions of the users, and the like can be provided without arranging the capture devices inside the display device 22.

<Eighth Configuration Example of Image Processing Unit>

An eighth configuration example of the image processing unit 24 will be described with reference to FIGS. 44 to 48.

Figure 44:
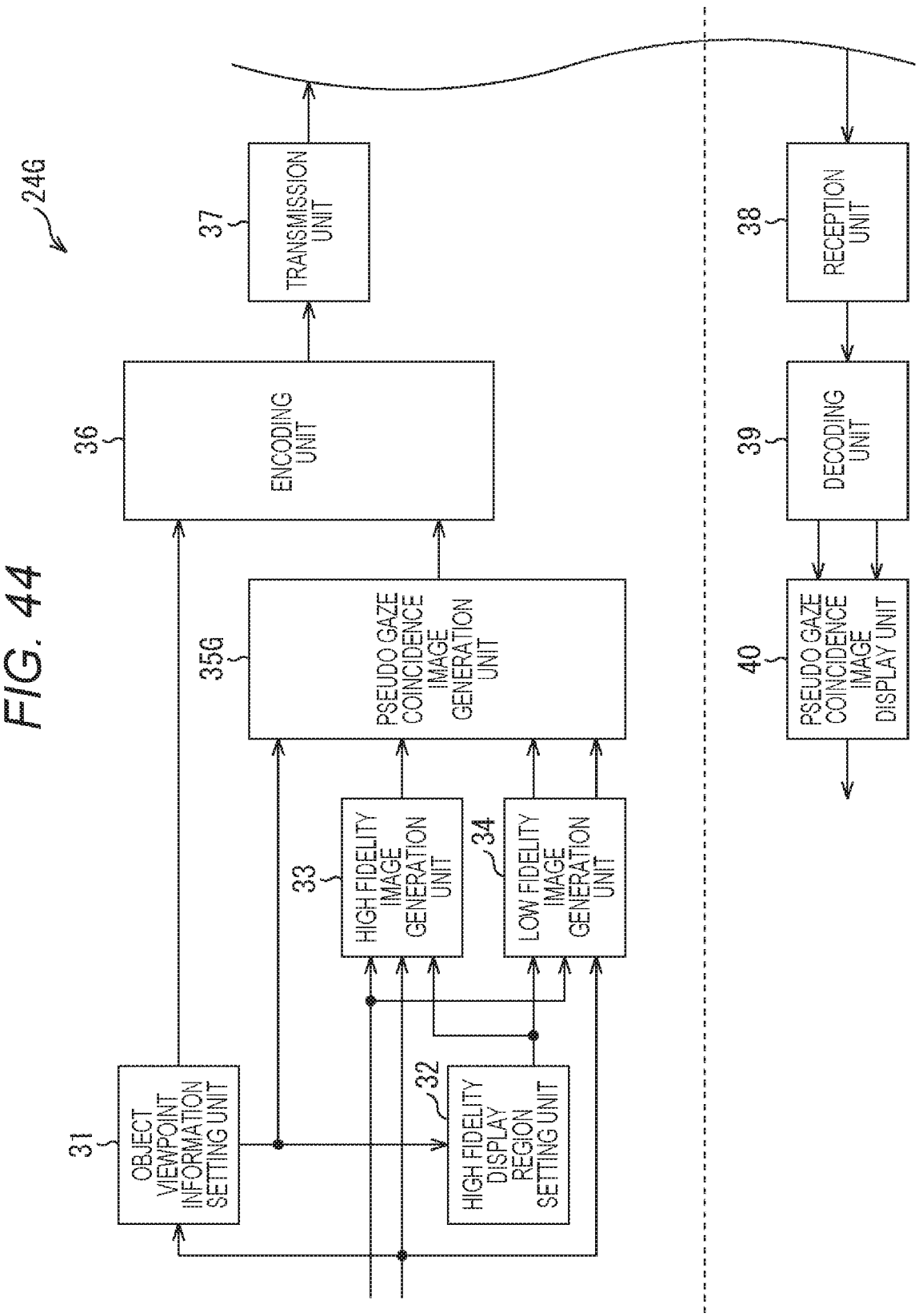
FIG. 44 is a block diagram illustrating an eighth example of the image processing unit.

FIG. 44 is a block diagram illustrating the eighth configuration example of the image processing unit 24. Note that, in an image processing unit 24G illustrated in FIG. 44, configurations common to the image processing unit 24 in FIG. 2 are denoted with the same reference numerals and detailed description of the configurations is omitted.

As illustrated in FIG. 44, the image processing unit 24G has a configuration common to the image processing unit 24 in FIG. 2 in including the object viewpoint information setting unit 31, the high fidelity display region setting unit 32, the high fidelity image generation unit 33, the low fidelity image generation unit 34, the encoding unit 36, the transmission unit 37, the reception unit 38, the decoding unit 39, and the pseudo gaze coincidence image display unit 40. Moreover, the image processing unit 24G includes a pseudo gaze coincidence image generation unit 35G.

The image processing unit 24G is configured to supply the analysis information output from the object viewpoint information setting unit 31 to the pseudo gaze coincidence image generation unit 35G.

Figure 45:
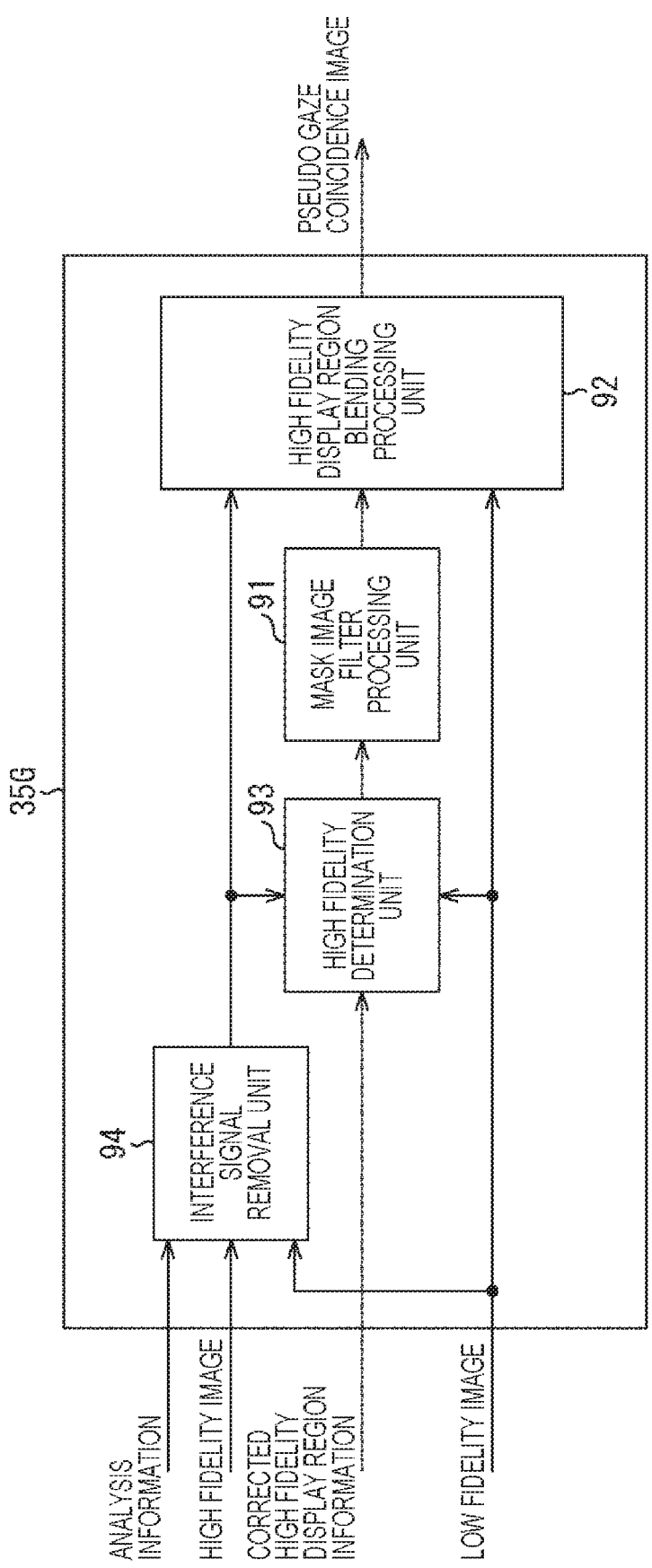
FIG. 45 is a block diagram illustrating a configuration example of a pseudo gaze coincidence image generation unit in FIG. 44.

FIG. 45 is a block diagram illustrating a configuration example of the pseudo gaze coincidence image generation unit 35G in FIG. 44.

As illustrated in FIG. 45, the pseudo gaze coincidence image generation unit 35G has a common configuration to the pseudo gaze coincidence image generation unit 35 in FIG. 16 in including the mask image filter processing unit 91 and the high fidelity display region blending processing unit 92. Furthermore, the pseudo gaze coincidence image generation unit 35G has a common configuration to the pseudo gaze coincidence image generation unit 35E in FIG. 37 in including the high fidelity determination unit 93, and further includes an interference signal removal unit 94.

The analysis information is supplied from the object viewpoint information setting unit 31, the high fidelity image is supplied from the high fidelity image generation unit 33, and the low fidelity image is supplied from the low fidelity image generation unit 34 to the interference signal removal unit 94. Then, the interference signal removal unit 94 removes a signal interfering with gaze coincidence included in the high fidelity image, using the analysis information and the low fidelity image, and supplies interference-removed high fidelity image from which the interference signal has been removed to the high fidelity display region blending processing unit 92 and the high fidelity determination unit 93. For example, the interference signal removal unit 94 removes an element interfering with the gaze coincidence from the high fidelity image according to an error amount between the high fidelity image and the low fidelity image in a region near both eyes of the user before the alpha blending processing is performed by the high fidelity display region blending processing unit 92.

Figure 46:
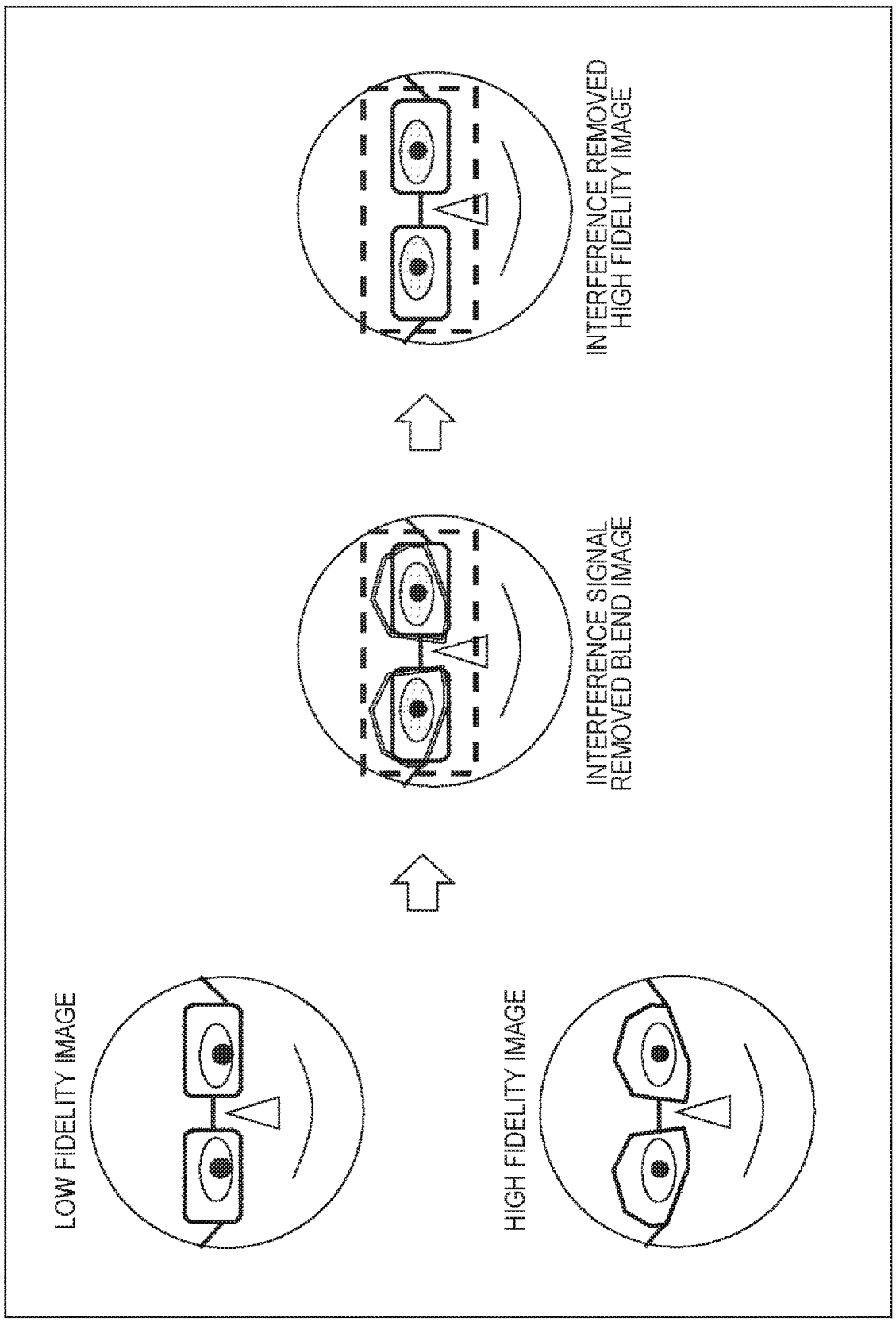
FIG. 46 is a diagram for describing removal of a signal interfering with gaze coincidence.

Specifically, as illustrated in FIG. 46, in a case where the user wears a pair of glasses, the rim of the glasses is sometimes deformed before the high fidelity image generation unit 33 generates the high fidelity image, and such deformation of the rim of the glasses may interfere with the gaze coincidence. Therefore, the interference signal removal unit 94 specifies a region assumed to interfere with the gaze coincidence on the basis of the analysis information, and removes the deformed rim of the glasses to interfere with the gaze coincidence, using the undeformed rim of the glasses captured in the low fidelity image, in the specified region.

In other words, the alpha blending processing is performed on the basis of the blend ratio map image avoiding the portion where the rim of the glasses is present, as in the mask image illustrated in FIG. 35A, for the low fidelity image in which the gaze does not coincide and the high fidelity image with the deformed rim of the glasses, as illustrated on the left side in FIG. 46. At this time, a part of the distorted rim of the glasses in the vicinity of the region of the eyes of the high fidelity image is smoothed by the mask image filter processing unit 91 (FIG. 16) and thus may be mixed on the pseudo gaze coincidence image as an element interfering with the gaze coincidence (interference signal).

Therefore, the interference signal removal unit 94 removes the interference signal on the pseudo gaze coincidence image and outputs the interference-removed high fidelity image as illustrated on the right side in FIG. 46. Therefore, the high fidelity display region blending processing unit 92 can generate the pseudo gaze coincidence display image for enabling further coincidence of the gaze. Here, the region from which the interference signal is removed by the interference signal removal unit 94 is a region near both eyes as illustrated with the thick broken line in FIG. 46 and excluding the eye regions respectively corresponding to the right eye and the left eye, as hatched in gray in FIG. 46.

Figure 47:
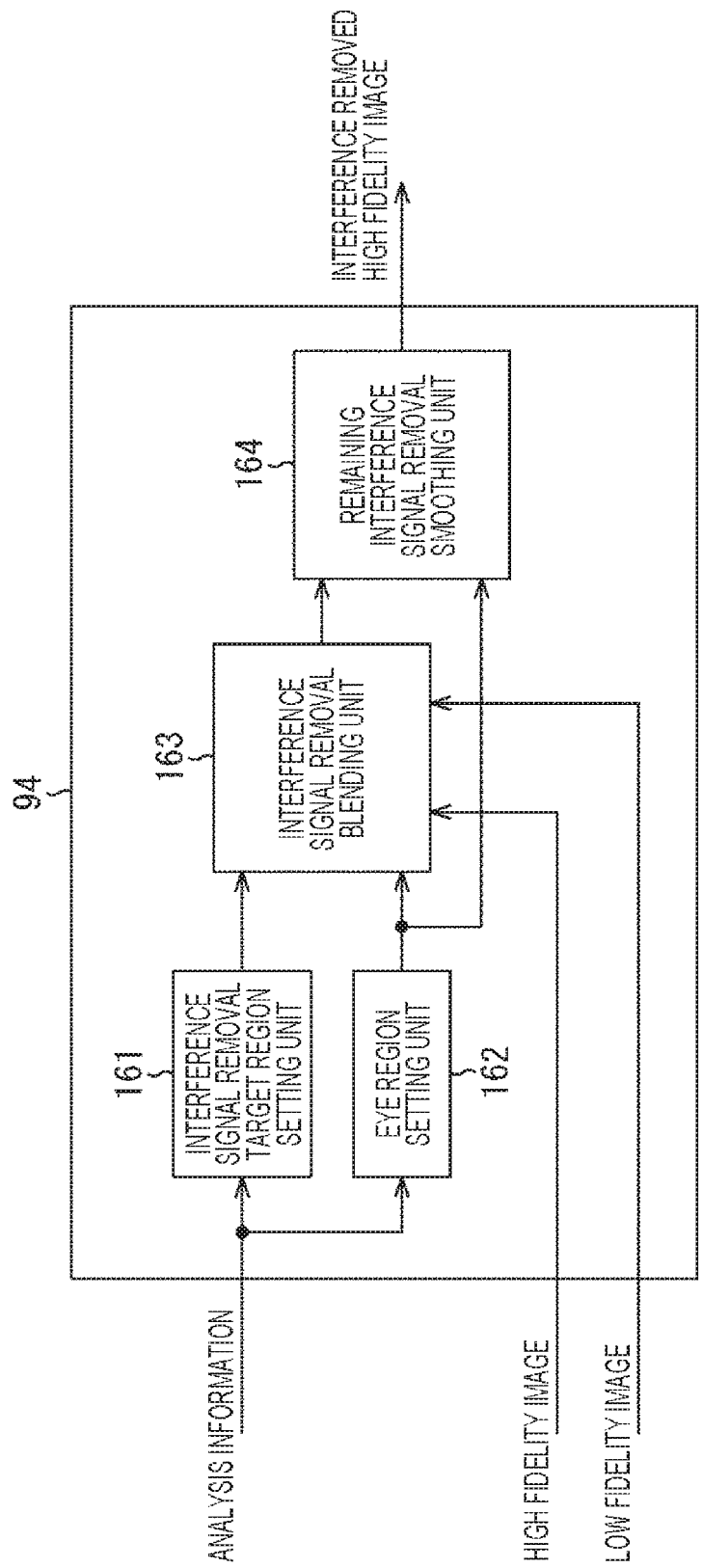
FIG. 47 is a block diagram illustrating a configuration example of an interference signal removal unit in FIG. 45.

FIG. 47 is a block diagram illustrating a configuration example of the interference signal removal unit 94 in FIG. 44.

As illustrated in FIG. 47, the interference signal removal unit 94 includes an interference signal removal target region setting unit 161, an eye region setting unit 162, an interference signal removal blending unit 163, and a remaining interference signal removal smoothing unit 164.

The interference signal removal target region setting unit 161 specifies a region involving both eyes as an interference signal removal target region, as described with reference to FIG. 46, on the basis of the analysis information supplied from the object viewpoint information setting unit 31. Then, the interference signal removal target region setting unit 161 sets the interference signal removal target region for the interference signal removal blending unit 163.

The eye region setting unit 162 specifies the regions respectively corresponding to the right eye and the left eye as the eye region, as described with reference to FIG. 46, on the basis of the analysis information supplied from the object viewpoint information setting unit 31. Then, the eye region setting unit 162 sets the eye region for the interference signal removal blending unit 163 and the remaining interference signal removal smoothing unit 164.

Figure 48:
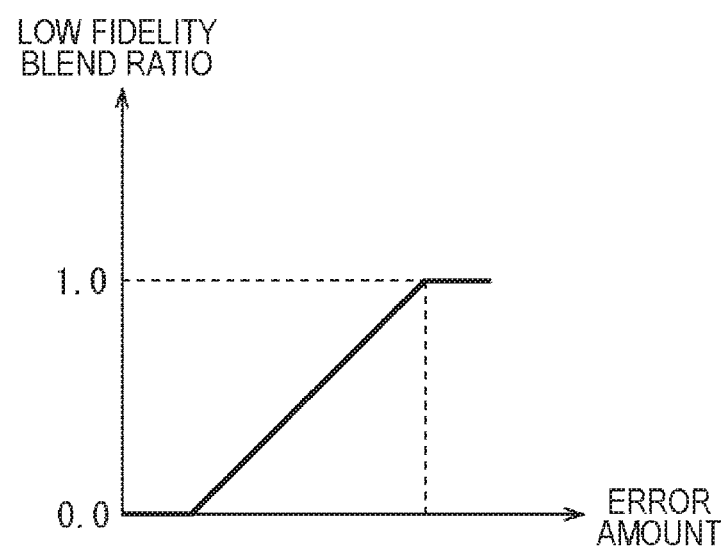
FIG. 48 is a diagram illustrating an example of a blend ratio of a low fidelity image.

The interference signal removal blending unit 163 obtains an error amount between the high fidelity image and the low fidelity image in a region other than the eye region set by the eye region setting unit 162, of the interference signal removal target region set by the interference signal removal target region setting unit 161. Then, the interference signal removal blending unit 163 performs the alpha blending processing using the blend ratio of the low fidelity image, the blend ratio becoming larger in value with an increase in the obtained error amount, as illustrated in FIG. 48, in the interference signal removal target region excluding the eye region.

Meanwhile, the interference signal removal blending unit 163 displays the high fidelity image as it is, for the eye region set by the eye region setting unit 162. In other words, the interference signal removal blending unit 163 performs the alpha blending processing with the blend ratio of the low fidelity image in the eye region set to 0. Thereby, the interference signal removal blending unit 163 generates the interference signal-removed blend image from which most of the portion of the distorted rim of the glasses in the high fidelity image is removed as the interference signal, and supplies the interference signal-removed blend image to the remaining interference signal removal smoothing unit 164. Note that, in the interference signal-removed blend image, an edge of the distorted rim of the glasses may not be removed and remain as a linear interference signal, as illustrated in the center in FIG. 46.

The remaining interference signal removal smoothing unit 164 applies smoothing processing with an edge preserving nonlinear filter such as a median filter for removing an impulsive signal to the interference signal remaining in the interference signal-removed blend image supplied from the interference signal removal blending unit 163. Thereby, the remaining interference signal removal smoothing unit 164 generates the interference-removed high fidelity image from which all the interference signal remaining in the interference signal-removed blend image have been removed, and supplies the interference-removed high fidelity image to the subsequent high fidelity display region blending processing unit 92 and high fidelity determination unit 93 (FIG. 45).

Thereafter, in the pseudo gaze coincidence image generation unit 35G, the mask image filter processing unit 91, the high fidelity display region blending processing unit 92, and the high fidelity determination unit 93 perform processing similar to the processing in the pseudo gaze coincidence image generation unit 35E described with reference to FIG. 37.

Note that, in the remaining interference signal removal smoothing unit 164, an edge portion of the portion of the rim of the glasses of the low fidelity image is not made blurred. Reproducibility of the rim portion of the glasses of the pseudo gaze coincidence image undergoing the alpha blending processing by the high fidelity display region blending processing unit 92 is maintained. The image processing unit 24G configured as described above can display the image without generating artifacts in the vicinity of the eye region.

<Ninth Configuration Example of Image Processing Unit>

A ninth configuration example of the image processing unit 24 will be described with reference to FIGS. 49, 53, 54A, 54B, 54C, and 55.

Figure 49:
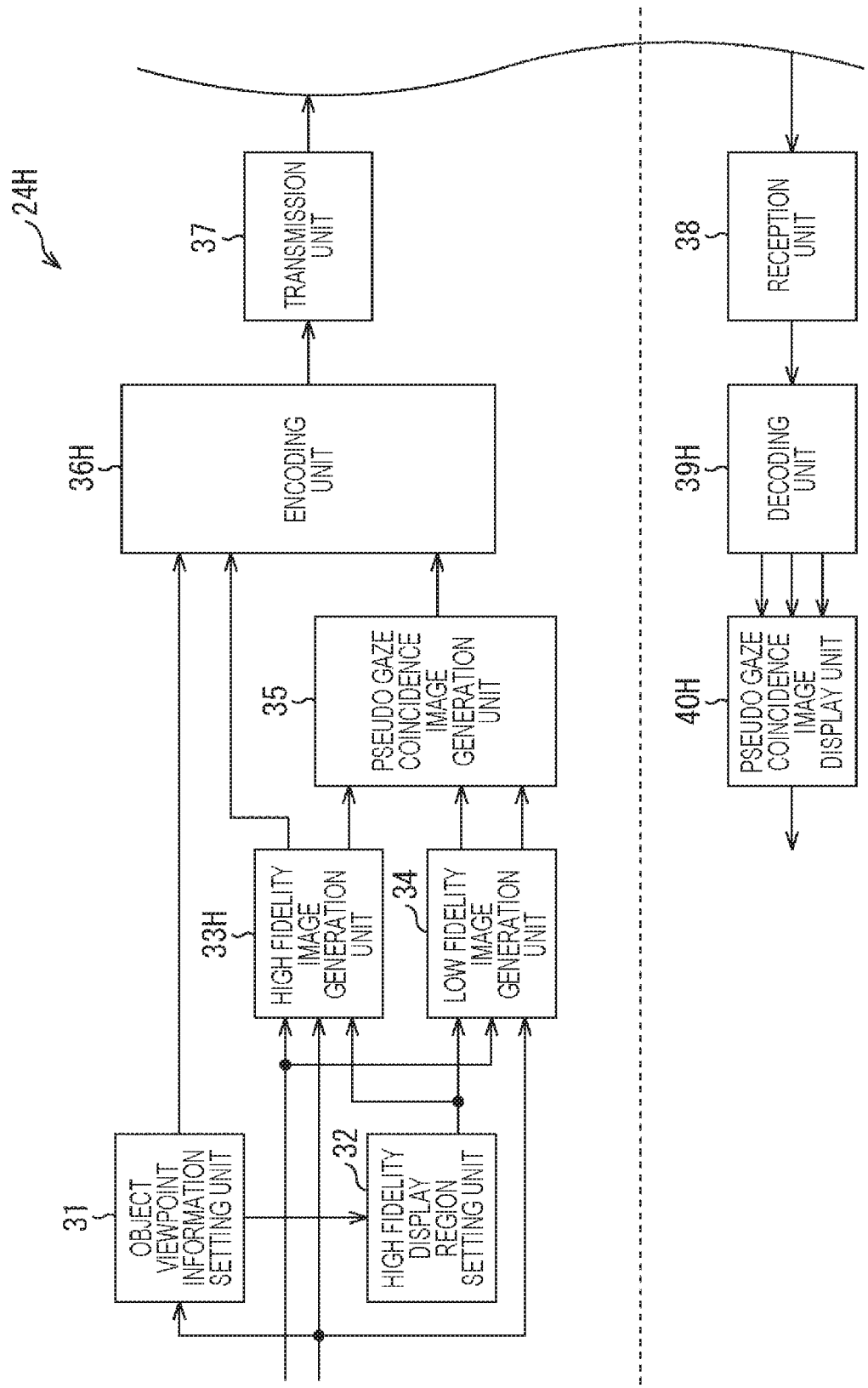
FIG. 49 is a block diagram illustrating a ninth example of the image processing unit.

FIG. 49 is a block diagram illustrating the ninth configuration example of the image processing unit 24. Note that, in an image processing unit 24H illustrated in FIG. 49, configurations common to the image processing unit 24 in FIG. 2 are denoted with the same reference numerals and detailed description of the configurations is omitted.

As illustrated in FIG. 49, the image processing unit 24H has a configuration common to the image processing unit 24 in FIG. 2 in including the object viewpoint information setting unit 31, the high fidelity display region setting unit 32, the low fidelity image generation unit 34, the pseudo gaze coincidence image generation unit 35, the transmission unit 37, and the reception unit 38. Moreover, the image processing unit 24H includes a high fidelity image generation unit 33H, an encoding unit 36H, a decoding unit 39H, and a pseudo gaze coincidence image display unit 40H.

For example, in the image processing unit 24 in FIG. 2, the size of the face and the positions of the eyes of the other party's user displayed on the display device 22 have been displayed to be equivalent to actual sizes on the basis of the viewpoint position (defined in the world coordinates) of the other party's user in the three-dimensional real space In contrast, the image processing unit 24H performs display for enabling the gazes to more easily coincide with each other, in consideration of a difference in processing characteristics using a plurality of captured images depending on a portion of the face.

This is a display method based on a phenomenon called Wollaston illusion that the perceived gaze direction is perceived to be shifted toward the face orientation when the face orientation is different. Note that the Wollaston illusion is described in Non-Patent Document "William Hyde Wollaston, "On the apparent direction of eyes in a portrait." Philosophical Transactions of the Royal Society of London, Vol. 114 (1824), pp. 247-256".

Figure 50:
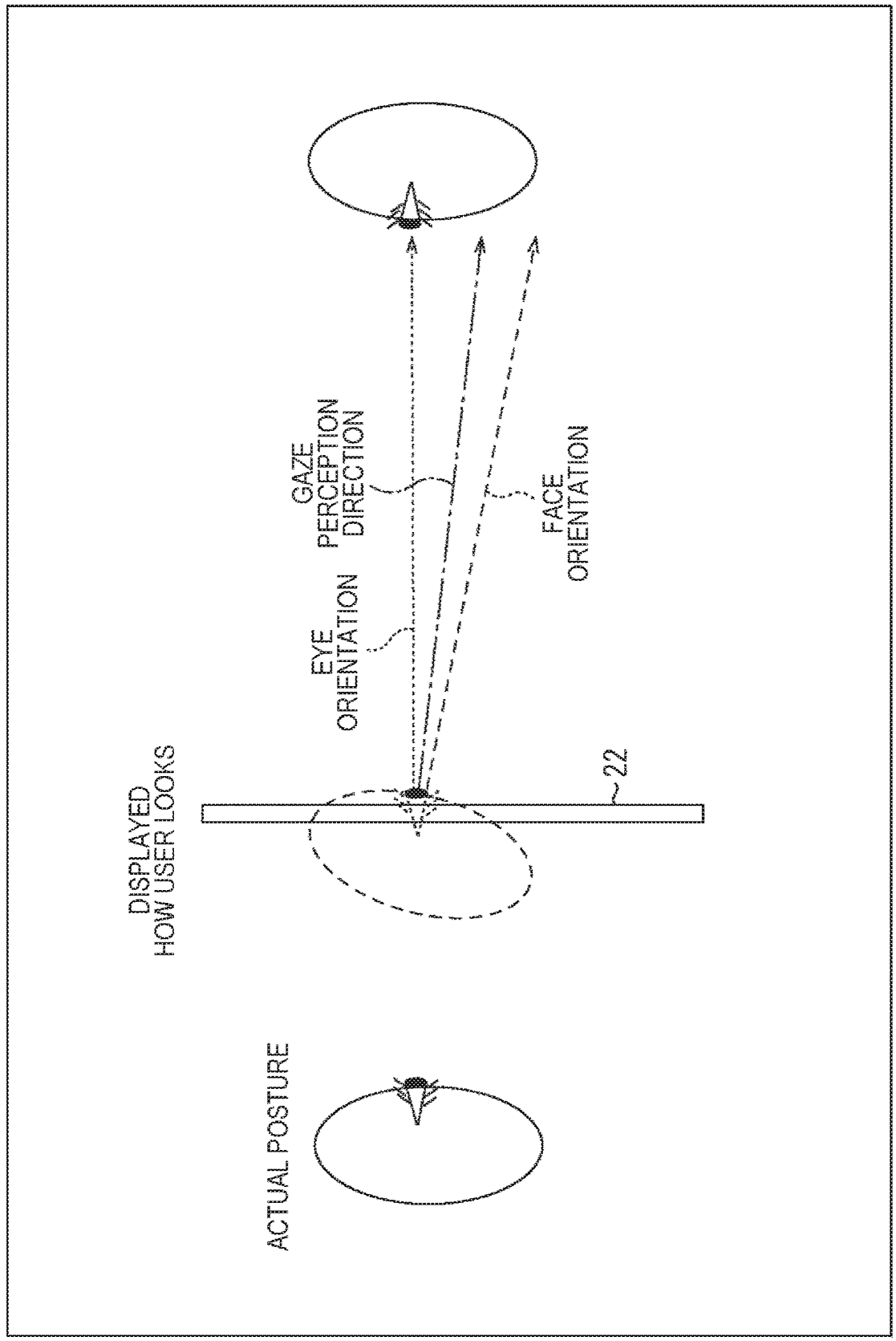
FIG. 50 is a diagram for describing deviation of a gaze in a perception direction.

Specifically, as illustrated in FIG. 50, even in a case where an actual posture faces the front, the low fidelity image for the face orientation as illustrated with the broken line and the high fidelity image for the eye orientation as illustrated with the dotted line are displayed on the display device 22 in a superimposed and synthesized state. For this reason, the gaze perception direction as illustrated with the alternate long and short dashed line deviates toward the face orientation direction as illustrated with the broken line with respect to the true eye direction as illustrated with the dotted line. The gaze is thus perceived in such a direction.

Therefore, the high fidelity image generation unit 33H supplies virtual capture position information related to the difference in the processing characteristics using a plurality of captured images depending on a portion of the face to the encoding unit 36H, unlike the high fidelity image generation unit 33 in FIG. 2.

Figure 51:
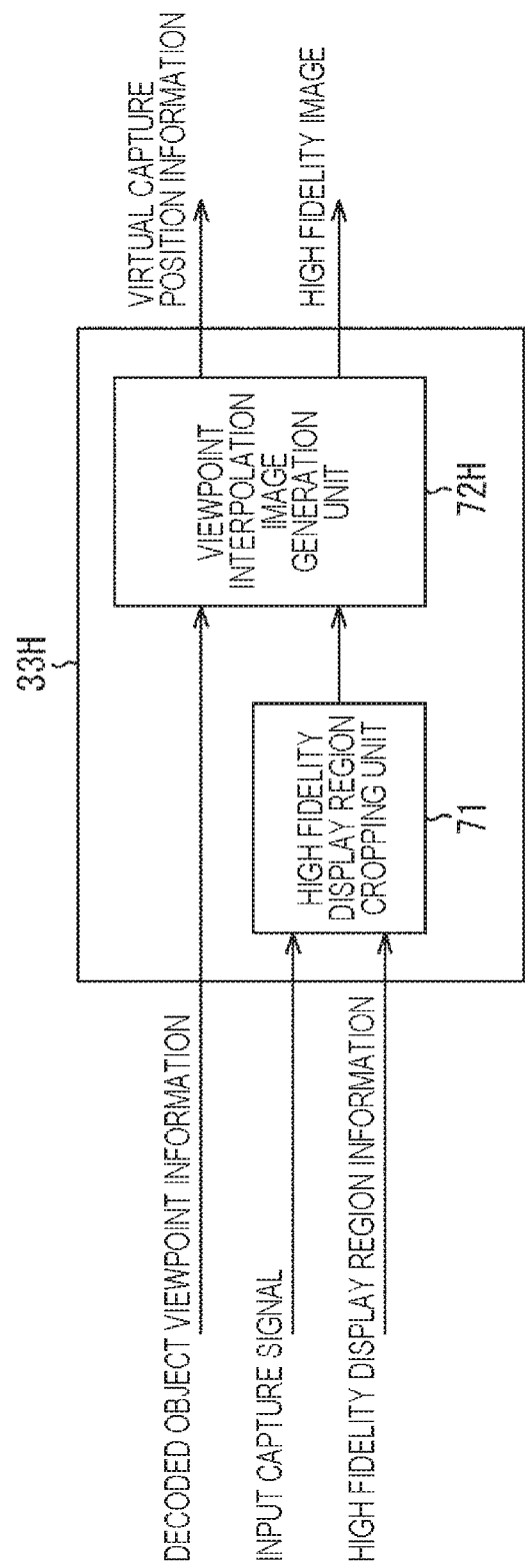
FIG. 51 is a block diagram illustrating a configuration example of a high fidelity image generation unit in FIG. 49.

For example, as illustrated in FIG. 51, the high fidelity image generation unit 33H includes the high fidelity display region cropping unit 71, similarly to the high fidelity image generation unit 33 in FIG. 8, and further includes a viewpoint interpolation image generation unit 72H. The viewpoint interpolation image generation unit 72H sets the virtual capture position, and outputs the virtual capture position information indicating the virtual capture position.

Then, the encoding unit 36H newly encodes the virtual capture position information in addition to the object viewpoint information of the principal user supplied from the object viewpoint information setting unit 31 and the pseudo gaze coincidence image supplied from the pseudo gaze coincidence image generation unit 35, similarly to the high fidelity image generation unit 33 in FIG. 2. Thereby, the encoding unit 36H generates the coded stream in which the object viewpoint information, the pseudo gaze coincidence image, and the virtual capture position information are encoded, and supplies the coded stream to the transmission unit 37.

Meanwhile, the decoding unit 39H newly supplies decoded virtual capture position information in addition to the decoded object viewpoint information and the decoded pseudo gaze coincidence image obtained by decoding the coded stream supplied from the reception unit 38 to the pseudo gaze coincidence image display unit 40H.

Figure 52:
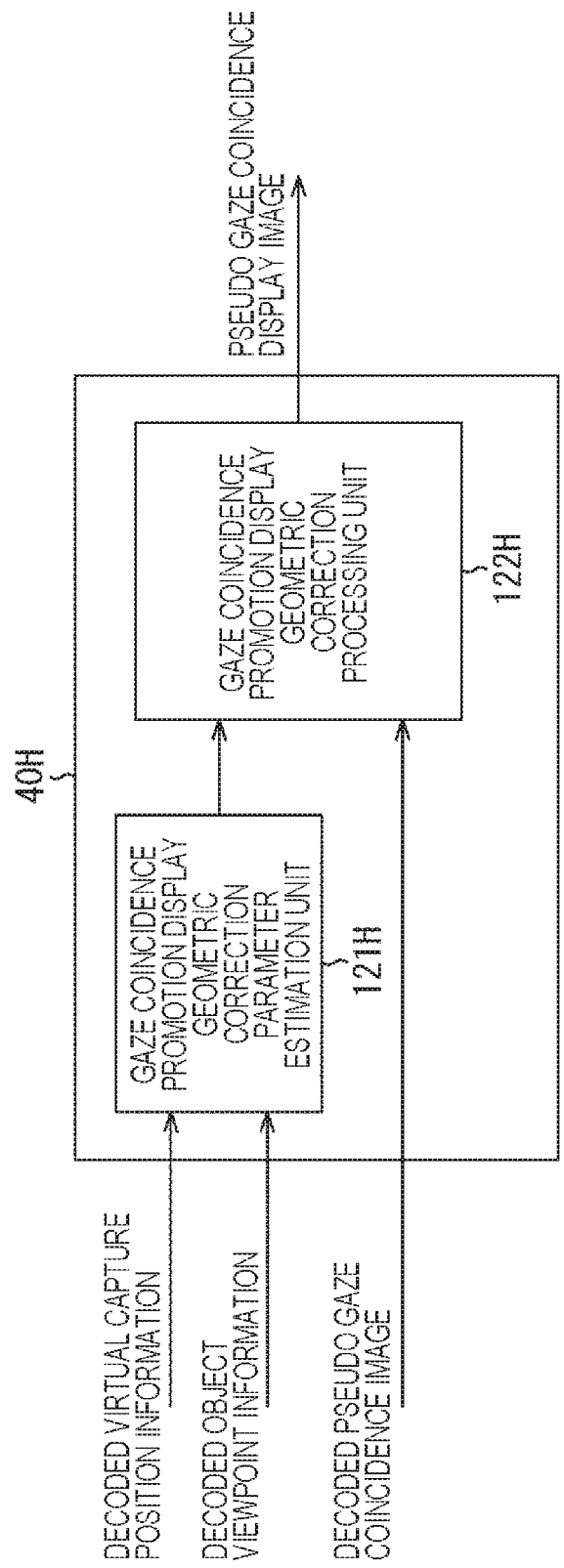
FIG. 52 is a block diagram illustrating a configuration example of a pseudo gaze coincidence image display unit in FIG. 49.

Here, FIG. 52 is a block diagram illustrating a configuration example of the pseudo gaze coincidence image display unit 40H in FIG. 49.

As illustrated in FIG. 52, the decoded virtual capture position information in addition to the decoded object viewpoint information and the decoded pseudo gaze coincidence image output from the decoding unit 39H are supplied to the pseudo gaze coincidence image display unit 40H. Moreover, the pseudo gaze coincidence image display unit 40H includes a gaze coincidence promotion display geometric correction parameter estimation unit 121H and a gaze coincidence promotion display geometric correction processing unit 122H, in place of the life-size-display geometric correction parameter estimation unit 121 and the life-size-display geometric correction processing unit 122 of the pseudo gaze coincidence image display unit 40 in FIG. 19.

The gaze coincidence promotion display geometric correction parameter estimation unit 121H obtains a parameter with which the size of the face and the positions of the eyes of the other party's user displayed on the display device 22 are displayed with actual sizes on the basis of the viewpoint position (defined with world coordinates) of the other party's user in the three-dimensional real space indicated by the decoded object viewpoint information, similarly to the life-size-display geometric correction parameter estimation unit 121 in FIG. 19. However, the gaze coincidence promotion display geometric correction parameter estimation unit 121H adds correction using the state as a reference (hereinafter reference state) without using the parameter as it is.

Specifically, although considering the size of the display device 22 and the resolution of the decoded pseudo gaze coincidence image, similarly to the life-size-display geometric correction parameter estimation unit 121 in FIG. 19, the gaze coincidence promotion display geometric correction parameter estimation unit 121H determines a correction amount with respect to the reference state set by the gaze coincidence promotion display geometric correction parameter estimation unit 121H, taking a viewpoint interpolation position set when the decoded pseudo gaze coincidence image is generated into account, which is obtained from the decoded virtual capture position information, and sets a gaze coincidence promotion display geometric correction parameter.

Here, a method of determining the correction amount by the gaze coincidence promotion display geometric correction parameter estimation unit 121H will be described with reference to FIGS. 53, 54A, 54B, and 55. Note that a horizontal component of the correction amount is divided into leftward correction and rightward correction for the sake of simplicity.

Figure 53:
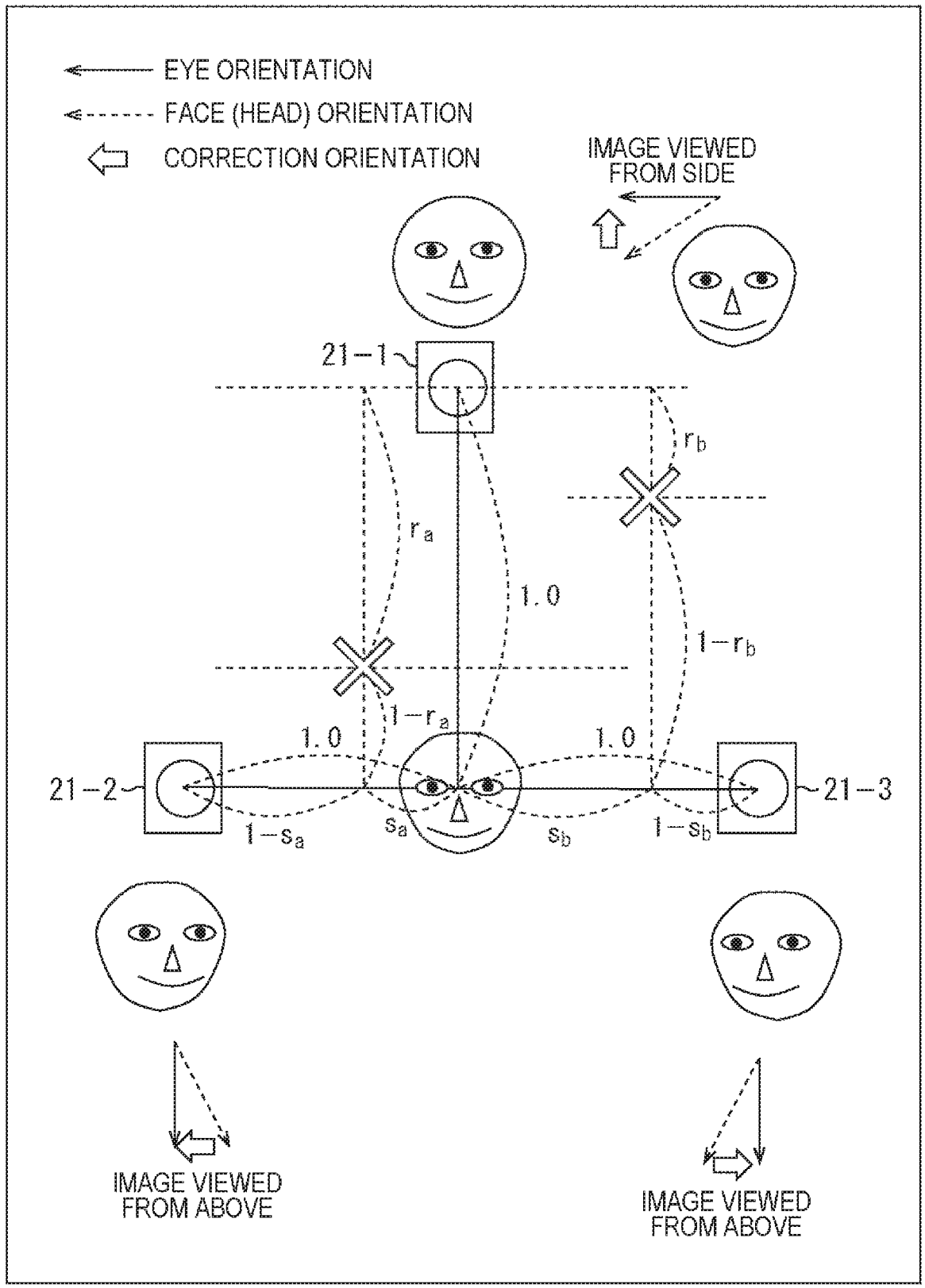
FIG. 53 is a diagram for describing viewpoint interpolation position.

First, the left cross mark illustrated in FIG. 53 is set as the viewpoint interpolation position set when the decoded pseudo gaze coincidence image obtained from the decoded virtual capture position information is generated. In this case, when the distance from a vertical of the capture device 21-1 installed on the upper side of the display device 22 to a straight line connecting the capture devices 21-2 and 21-3 is normalized to 1.0, the left cross mark illustrated in FIG. 53 divides the vertical direction to $r_a$ and $(1.0-r_a)$. Here, $r_a$ is a numerical value from 0.0 to 1.0 $(0.0 \le r_a \le 1.0)$.

Meanwhile, when the distance from the position of center of the capture devices 21-2 and 21-3 to the capture device 21-2 is normalized to 1.0, the left cross mark illustrated in FIG. 53 divides the horizontal direction to $s_a$ and $(1.0-s_a)$ on the left side. Here, $S_a$ is a numerical value from 0.0 to 1.0 $(0.0 \le S_a \le 1.0)$.

In this case, the upward correction amount is obtained such that the viewpoint interpolation position is away from the capture device 21-1 as the value of ra is larger, as illustrated in the graph in FIG. 54A. In other words, consistency between the face orientation (looking slightly downward) of the low fidelity image based on the image captured by the capture device 21-1 and the eye orientation (looking at the camera seen in front) of the high fidelity image faithfully generated at the viewpoint interpolation position from the three capture devices 21-1 to 21-3 becomes low. Therefore, since the gaze is perceived slightly shifted downward, the upward correction amount is increased.

Furthermore, the leftward correction amount is obtained such that the viewpoint interpolation position is away from the central position between the capture devices 21-2 and 21-3 as the value of sa is larger, as in the graph in FIG. 54B. In other words, similarly to the upward correction amount setting method, consistency between the face orientation (looking slightly rightward) of the low fidelity image and the eye orientation (looking at the camera seen in front) of the high fidelity image becomes low. Therefore, since the gaze is perceived slightly shifted rightward, the leftward correction amount is increased.

The final correction amount for the right cross mark illustrated in FIG. 53 is expressed by a two-dimensional vector (DXL, DY), and is corrected and displayed at a shifted position by the amount of the vector. Similarly, in the case of the right cross mark illustrated in FIG. 53, a two-dimensional vector (DXR, DY) is determined similarly to the case of the left cross mark, as illustrated in the graph in FIG. 54 except for the horizontal correction amount in the rightward direction.

According to the above description, the gaze coincidence promotion display geometric correction parameter estimation unit 121H estimates the gaze coincidence promotion display geometric correction parameter, reflecting the correction amount determined by the above determination method, and supplies the gaze coincidence promotion display geometric correction parameter to the gaze coincidence promotion display geometric correction processing unit 122H.

The gaze coincidence promotion display geometric correction processing unit 122H applies the geometric correction using the gaze coincidence promotion display geometric correction parameter supplied from the gaze coincidence promotion display geometric correction parameter estimation unit 121H to the decoded pseudo gaze coincidence image. Thereby, the gaze coincidence promotion display geometric correction processing unit 122H generates the pseudo gaze coincidence display image to be displayed on the display device 22 such that the gazes more easily coincide with each other on the basis of the above-described viewpoint interpolation position from the state where the size and the position (height of the eyes) for life size of the other party's user are set as the reference. Then, the gaze coincidence promotion display geometric correction processing unit 122H outputs and displays the pseudo gaze coincidence display image on the display device 22 in FIG. 1.

Figure 55:
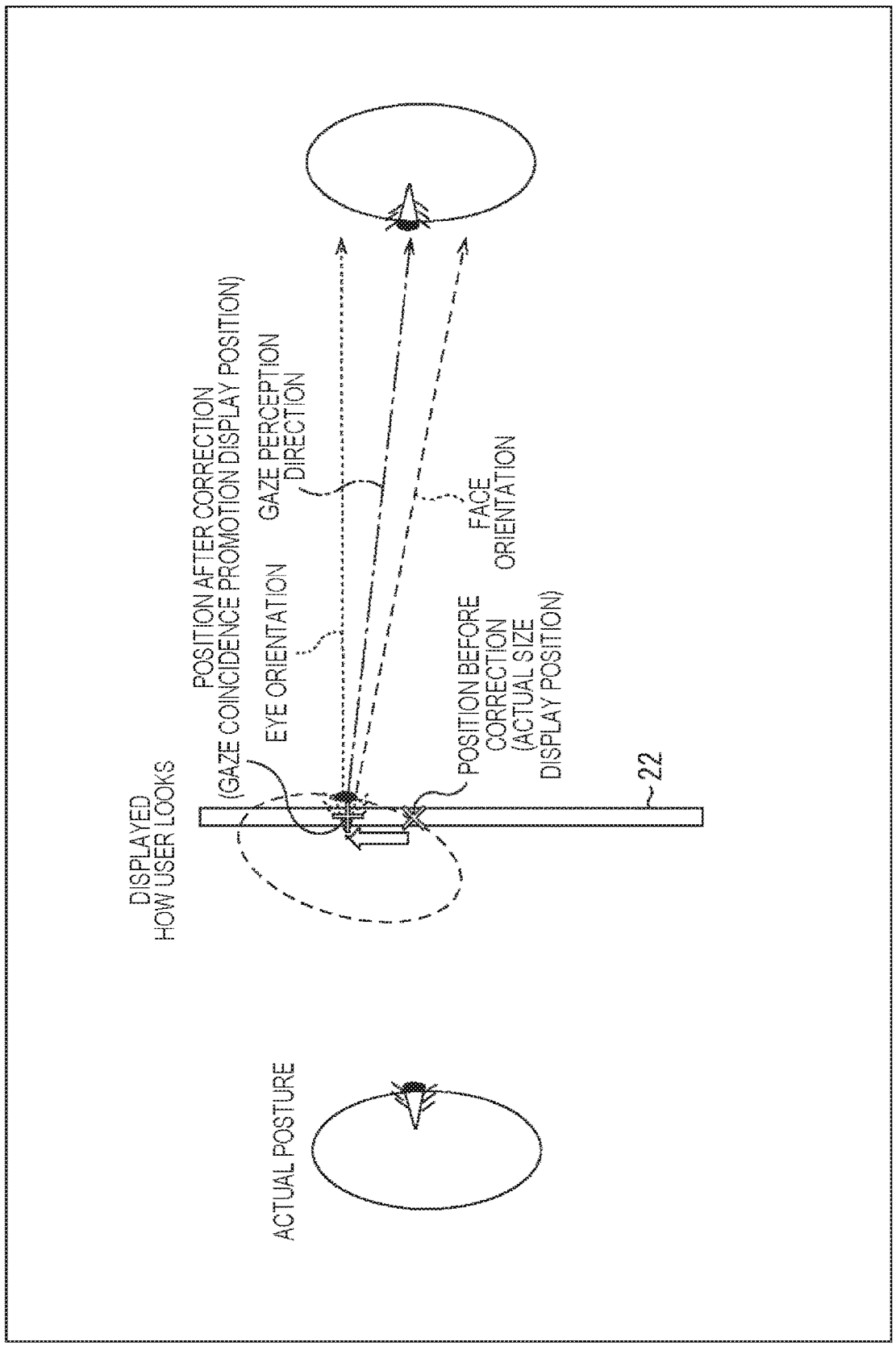
FIG. 55 is a diagram for describing a perception direction of a gaze after correction.

The blocks included in the image processing unit 24H are configured as described above, and the display position is corrected for the actual size display, as illustrated in FIG. 55, in the interactive communication performed with the other party's user displayed, whereby a video communication experience in which the gaze easily coincides with the other party's user can be provided.

<Tenth Configuration Example of Image Processing Unit>

A tenth configuration example of the image processing unit 24 will be described with reference to FIGS. 56 57, 58, 59, 60, 61A, 61B, 62A, 62B, and 62C.

Figure 56:
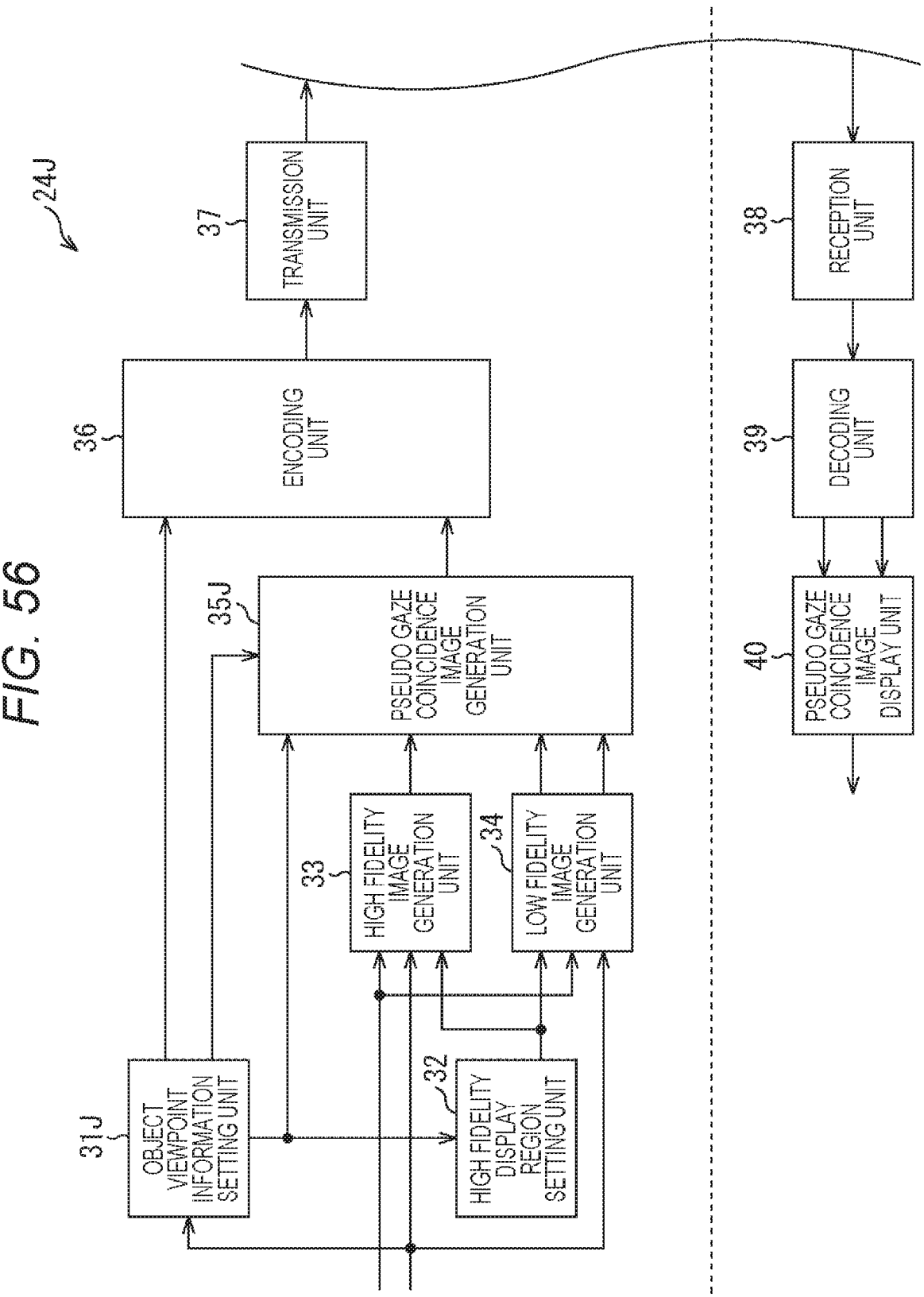
FIG. 56 is a block diagram illustrating a tenth example of the image processing unit.

FIG. 56 is a block diagram illustrating the tenth configuration example of the image processing unit 24. Note that, in an image processing unit 24J illustrated in FIG. 56 configurations common to the image processing unit 24 in FIG. 2 are denoted with the same reference numerals and detailed description of the configurations is omitted.

As illustrated in FIG. 56, the image processing unit 24J has a configuration common to the image processing unit 24 in FIG. 2 in including the high fidelity display region setting unit 32, the high fidelity image generation unit 33, the low fidelity image generation unit 34, the encoding unit 36, the transmission unit 37, the reception unit 38, the decoding unit 39, and the pseudo gaze coincidence image display unit 40. Moreover, the image processing unit 24J includes an object viewpoint information setting unit 31J and a pseudo gaze coincidence image generation unit 35J.

Figure 57:
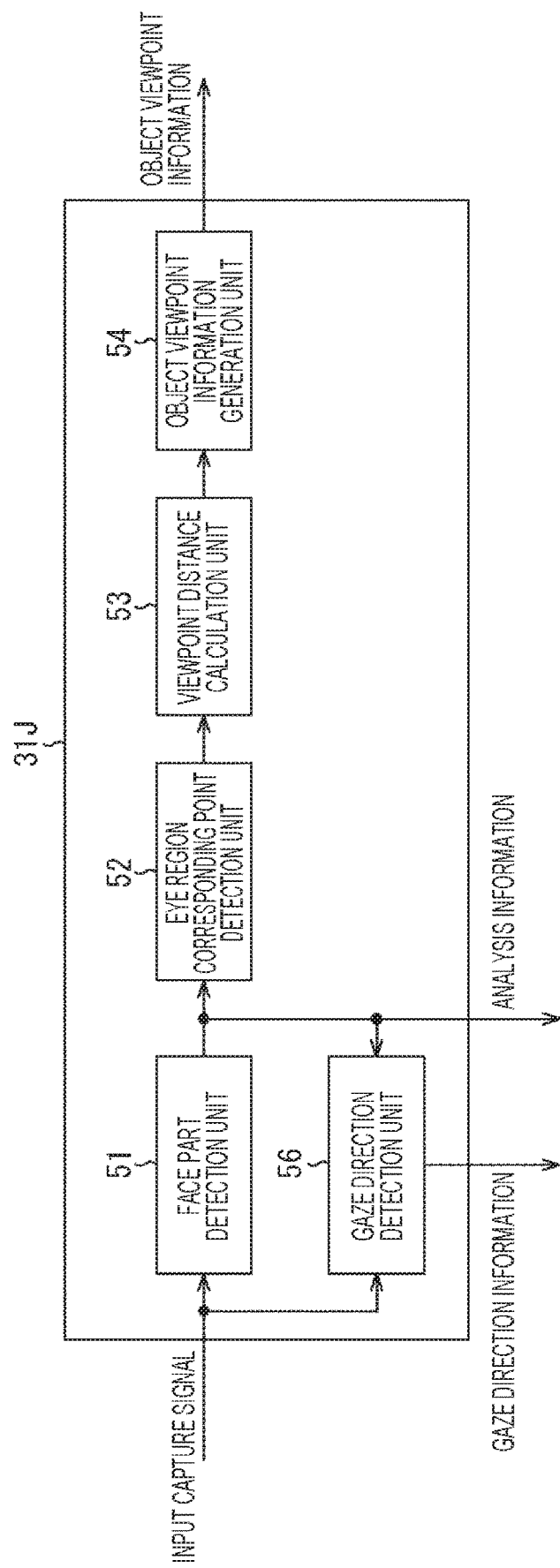
FIG. 57 is a block diagram illustrating a configuration example of an object viewpoint information setting unit in FIG. 56.

FIG. 57 is a block diagram illustrating a configuration example of the object viewpoint information setting unit 31J in FIG. 56.

As illustrated in FIG. 57, the object viewpoint information setting unit 31J has a common configuration to the object viewpoint information setting unit 31 in FIG. 3 in including the face part detection unit 51, the eye region corresponding point detection unit 52, the viewpoint distance calculation unit 53, and the object viewpoint information generation unit 54, and further includes a gaze direction detection unit 56.

The input capture signal is supplied to the gaze direction detection unit 56 and the analysis information is supplied from the face part detection unit 51 to the gaze direction detection unit 56. Then, the gaze direction detection unit 56 detects the gaze direction of the pupils of both eyes on the basis of at least one image, of the three captured images captured by the capture devices 21-1 to 21-3, and the analysis information indicating the coordinates of the characteristic points of the parts of the face output by the face part detection unit 51. For example, the gaze direction detection unit 56 can detect the gaze direction using the technology disclosed in Non-Patent Document "Rendering of Eyes for Eye-Shape Registration and Gaze Estimation" by Erroll Wood, et al. ICCV2015" or the like. Then, the gaze direction detection unit 56 supplies a detection result to the pseudo gaze coincidence image generation unit 35J as gaze direction information, and the gaze direction information is output from the object viewpoint information setting unit 31J together with the analysis information.

Figure 58:
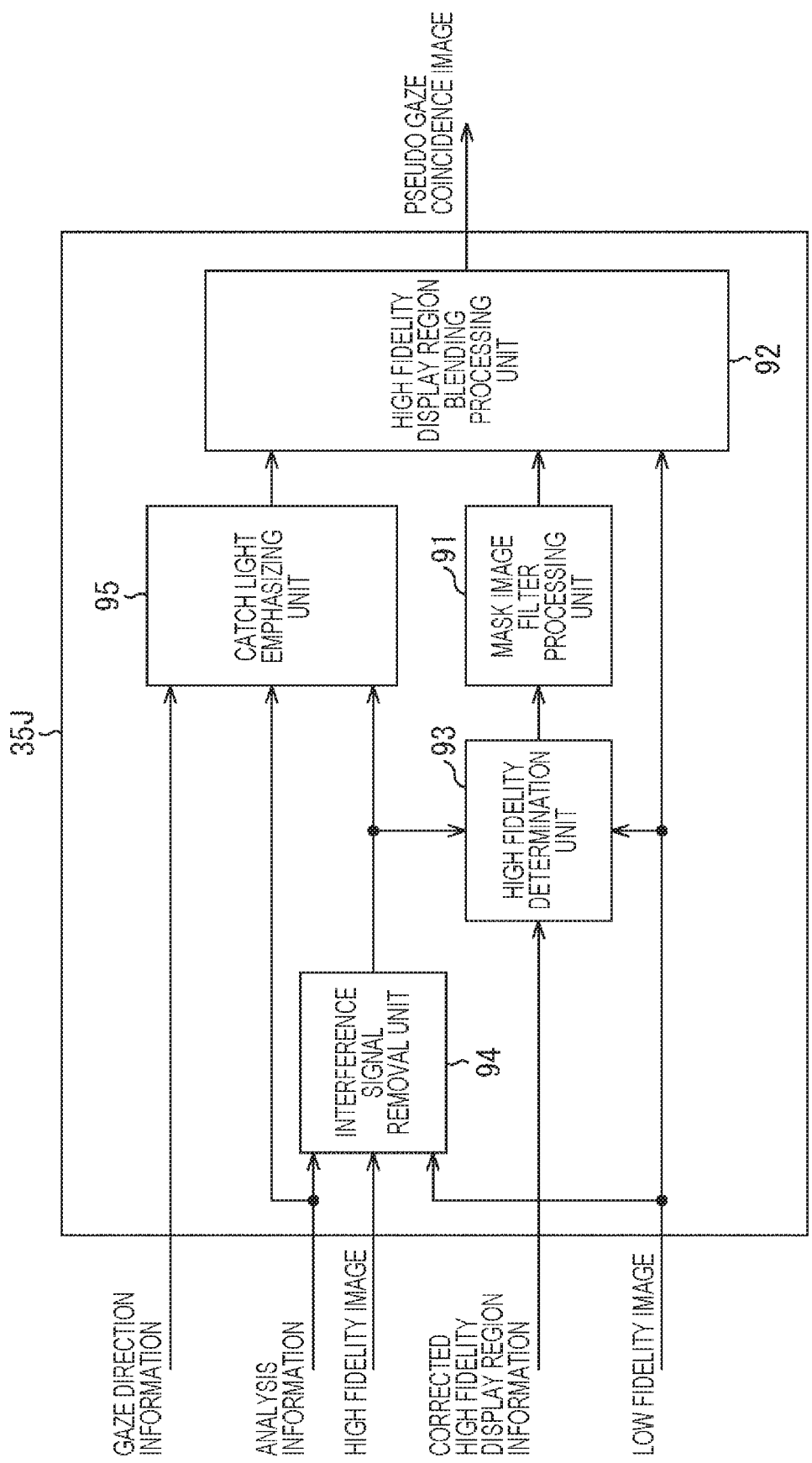
FIG. 58 is a block diagram illustrating a configuration example of a pseudo gaze coincidence image generation unit in FIG. 56.

FIG. 58 is a block diagram illustrating a configuration example of the pseudo gaze coincidence image generation unit 35J in FIG. 56.

As illustrated in FIG. 58, the pseudo gaze coincidence image generation unit 35J has a common configuration to the pseudo gaze coincidence image generation unit 35G in FIG. 45 in including the mask image filter processing unit 91 and the high fidelity display region blending processing unit 92, the high fidelity determination unit 93, and the interference signal removal unit 94, and further includes a catch light emphasizing unit 95.

The analysis information and the gaze direction information are supplied from the object viewpoint information setting unit 31 and the interference-removed high fidelity image is supplied from the interference signal removal unit 94 to the catch light emphasizing unit 95. Then, the catch light emphasizing unit 95 emphasizes, in advance, a portion of catch light where the pupil reflects in the interference-removed high fidelity image, using the analysis information and the gaze direction before the alpha blending processing is performed by the high fidelity display region blending processing unit 92.

Figure 59:
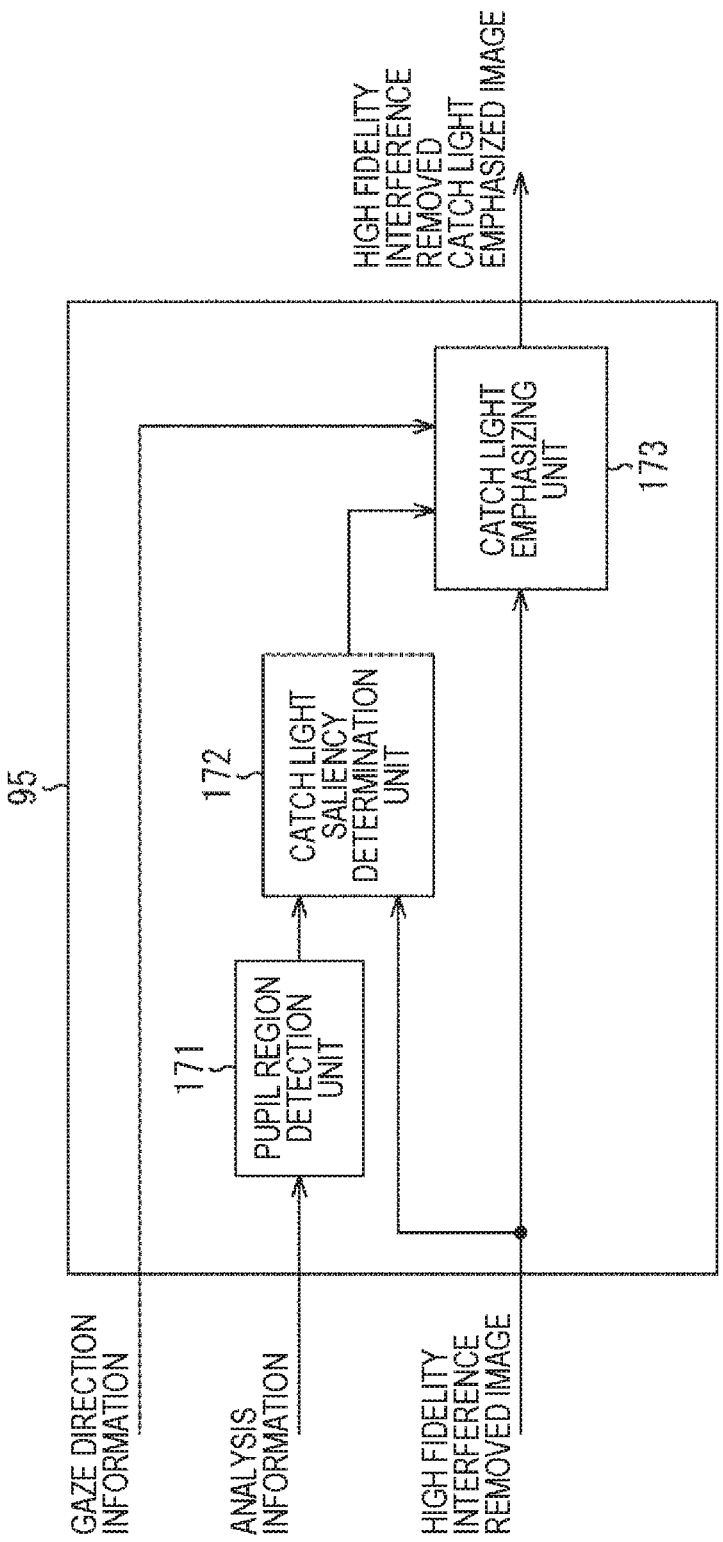
FIG. 59 is a block diagram illustrating a configuration example of a catch light emphasizing unit in FIG. 58.

FIG. 59 is a block diagram illustrating a configuration example of the catch light emphasizing unit 95 in FIG. 58.

As illustrated in FIG. 59, the catch light emphasizing unit 95 includes a pupil region detection unit 171, a catch light saliency determination unit 172, and a catch light emphasizing processing unit 173. Here, processing performed in the catch light emphasizing unit 95 will be described with reference to FIGS. 60, 61A, and 61B.

Figure 60:
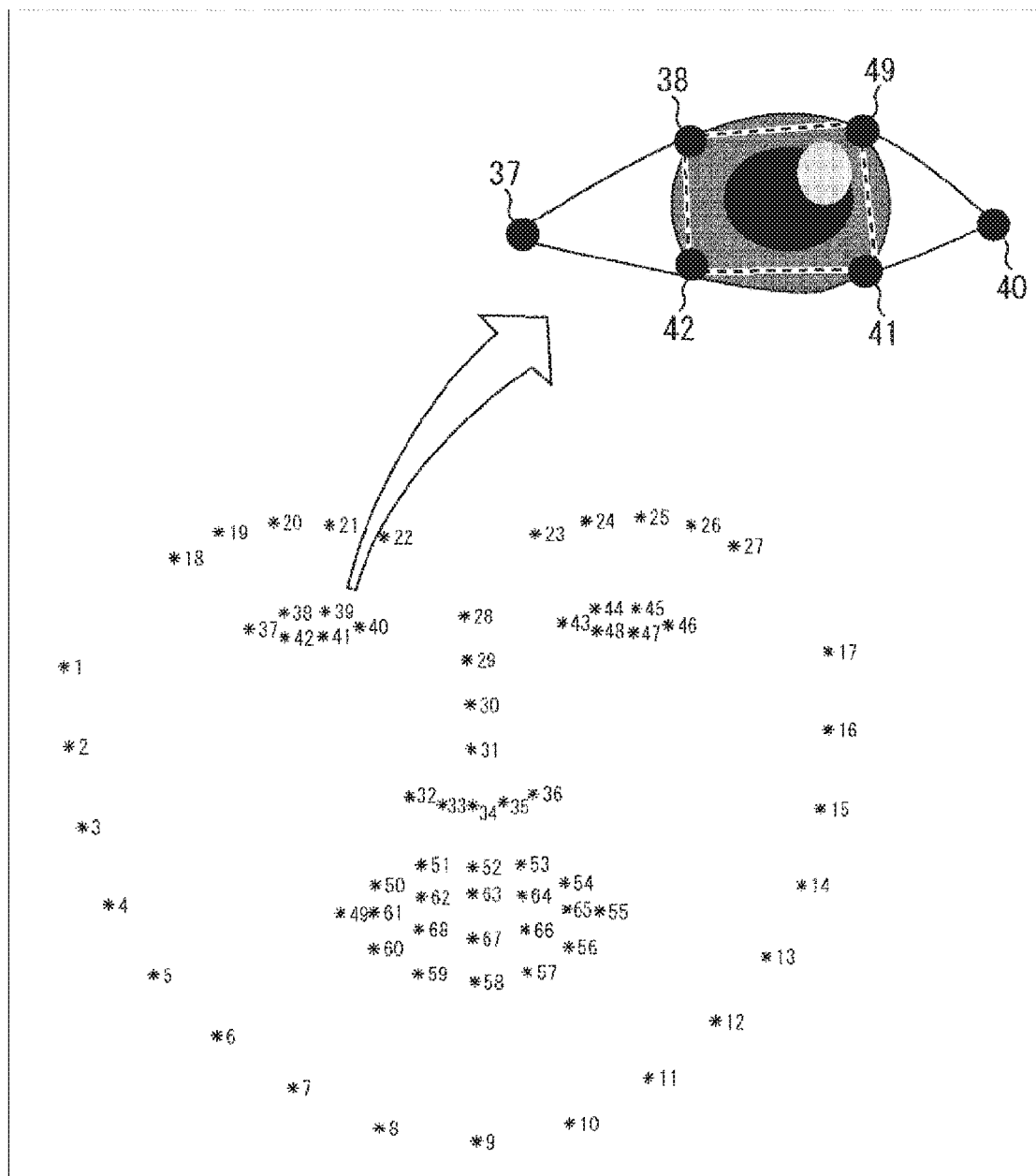
FIG. 60 is a diagram for describing detection of a pupil region.

The pupil region detection unit 171 outputs a rectangular region obtained by connecting four characteristic points close to a boundary of the pupil (pupil and iris) as pupil region information, as illustrated in FIG. 60, from the face part of the eye of the analysis information supplied from the object viewpoint information setting unit 31.

The catch light saliency determination unit 172 determines whether or not the catch light is noticeable in the rectangular region indicated by the pupil region information supplied from the pupil region detection unit 171 with respect to a high fidelity interference-removed image supplied from the interference signal removal unit 94.

Specifically, the catch light saliency determination unit 172 first obtains occurrence probability distribution (histogram) of luminance as illustrated in FIGS. 61A and 61B for a luminance signal of the rectangular region indicated by the pupil region information. FIG. 61A illustrates an example of the occurrence probability of when brighter catch light has occurred, and FIG. 61B illustrates an example of the occurrence probability of when darker catch light has occurred. Next, the catch light saliency determination unit 172 obtains catch light saliency CLS by dividing a highest luminance value Lmax in values exceeding an occurrence probability Pth by a threshold Lth for determining preset high luminance (CLS=Lmax/Lth). Note that, in a case where the obtained catch light saliency CLS is larger than 1.0 (CLS>1.0), the catch light saliency determination unit 172 sets the catch light saliency CLS to 1.0. Then, the catch light saliency determination unit 172 supplies the catch light saliency CLS obtained as described above to the catch light emphasizing processing unit 173.

The catch light saliency CLS and the gaze direction information are supplied to the catch light emphasizing processing unit 173. Then, the catch light emphasizing processing unit 173 transforms the catch light saliency CLS into a catch light unclear degree Clr with the characteristic illustrated in FIG. 62A. Furthermore, the catch light emphasizing processing unit 173 obtains magnitude of deviation of the gaze direction from the front as a front gaze error GE from the gaze direction information, and transforms the front gaze error GE into a front gaze degree Fgr with the characteristic illustrated in FIG. 62B.

Figure 62:
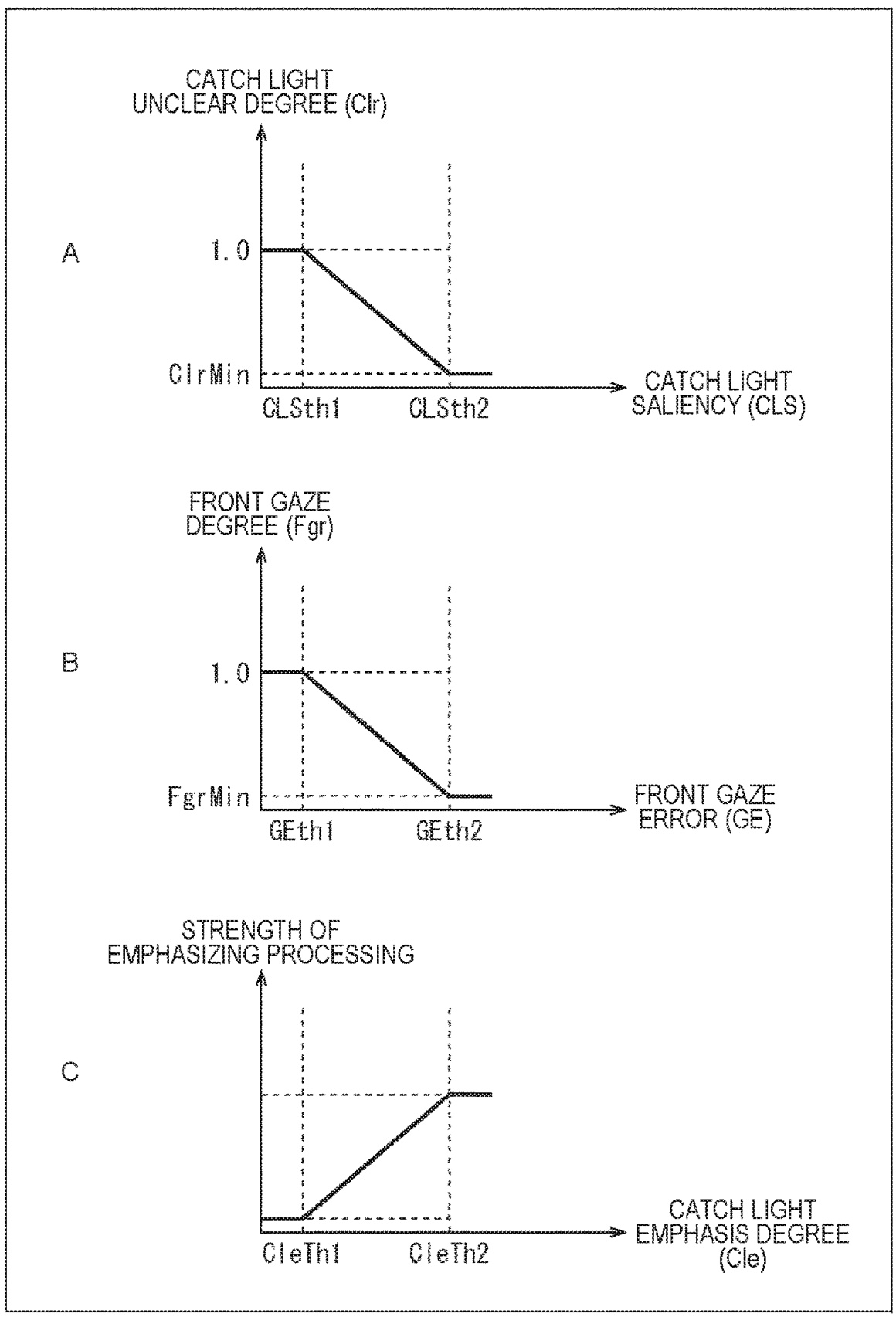
FIGS. 62A, 62B, and 62C are diagrams illustrating an example of parameters used in catch light emphasizing processing.

Then, the catch light emphasizing processing unit 173 performs emphasizing processing for the interference-removed high fidelity image, using the catch light unclear degree Clr and the front gaze degree Fgr. For example, the catch light emphasizing processing unit 173 obtains a catch light emphasizing degree Cle by multiplying the catch light unclear degree Clr and the front gaze degree Fgr (Cle=Fgr× Clr). Thereby, as illustrated in FIG. 62C, the emphasizing processing is intensified when the gaze direction is closer to the front and the catch light is more unclear to make the catch light more noticeable. Note that, as the emphasizing processing by the catch light emphasizing processing unit 173, an unsharp mask, super resolution, contrast enhancement, color enhancement, or the like can be used.

The image processing unit 24J configured as described above can enhance the gaze coincidence by the clue of the catch light even in a poor illumination environment.

<Eleventh Configuration Example of Image Processing Unit>

An eleventh configuration example of the image processing unit 24 will be described with reference to FIGS. 63, 64, 65, 66A, and 66B.

Figure 63:
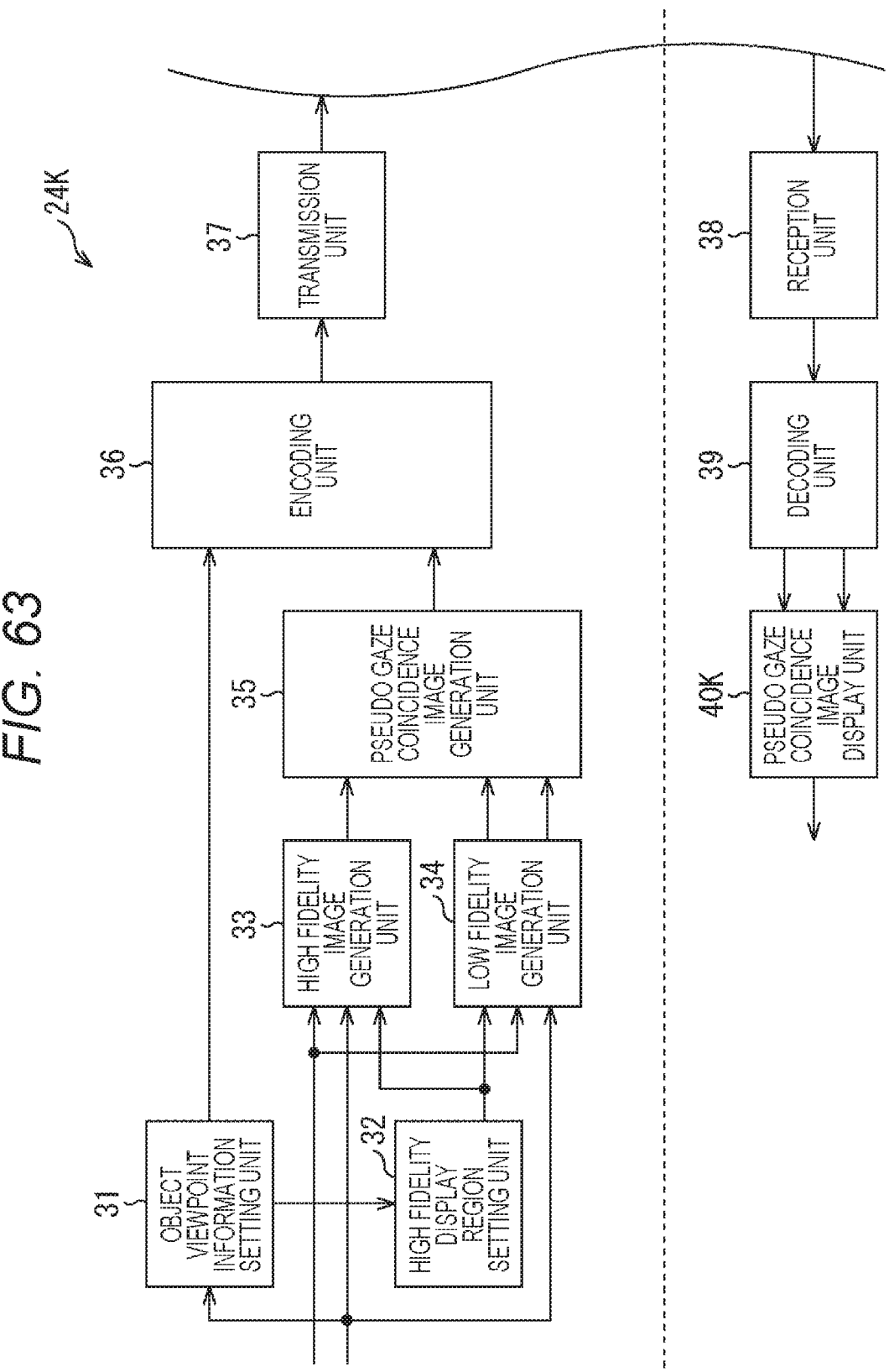
FIG. 63 is a block diagram illustrating an eleventh example of the image processing unit.

FIG. 63 is a block diagram illustrating the eleventh configuration example of the image processing unit 24. Note that, in an image processing unit 24K illustrated in FIG. 63 configurations common to the image processing unit 24 in FIG. 2 are denoted with the same reference numerals and detailed description of the configurations is omitted.

As illustrated in FIG. 63, the image processing unit 24K has a configuration common to the image processing unit 24 in FIG. 2 in including the object viewpoint information setting unit 31, the high fidelity display region setting unit 32, the high fidelity image generation unit 33, the low fidelity image generation unit 34, the pseudo gaze coincidence image generation unit 35, the encoding unit 36, the transmission unit 37, the reception unit 38, and the decoding unit 39. Moreover, the image processing unit 24 includes a pseudo gaze coincidence image display unit 40K.

For example, the image processing unit 24K displays the size of the face and the positions of the eyes of the other party's user displayed on the display device 22, for enabling the gazes to more easily coincide with each other by correction based on Wollaston illusion in consideration of the difference in processing characteristics using a plurality of captured images depending on a portion of the face, using a display equivalent to the actual size as a reference, which is similar to the image processing unit 24H described with reference to FIG. 49. However, the image processing unit 24K is configured such that the virtual capture position information is not transmitted as the additional information, and the difference in processing characteristics using a plurality of captured images depending on a portion of the face is detected by the pseudo gaze coincidence image display unit 40K.

Figure 64:
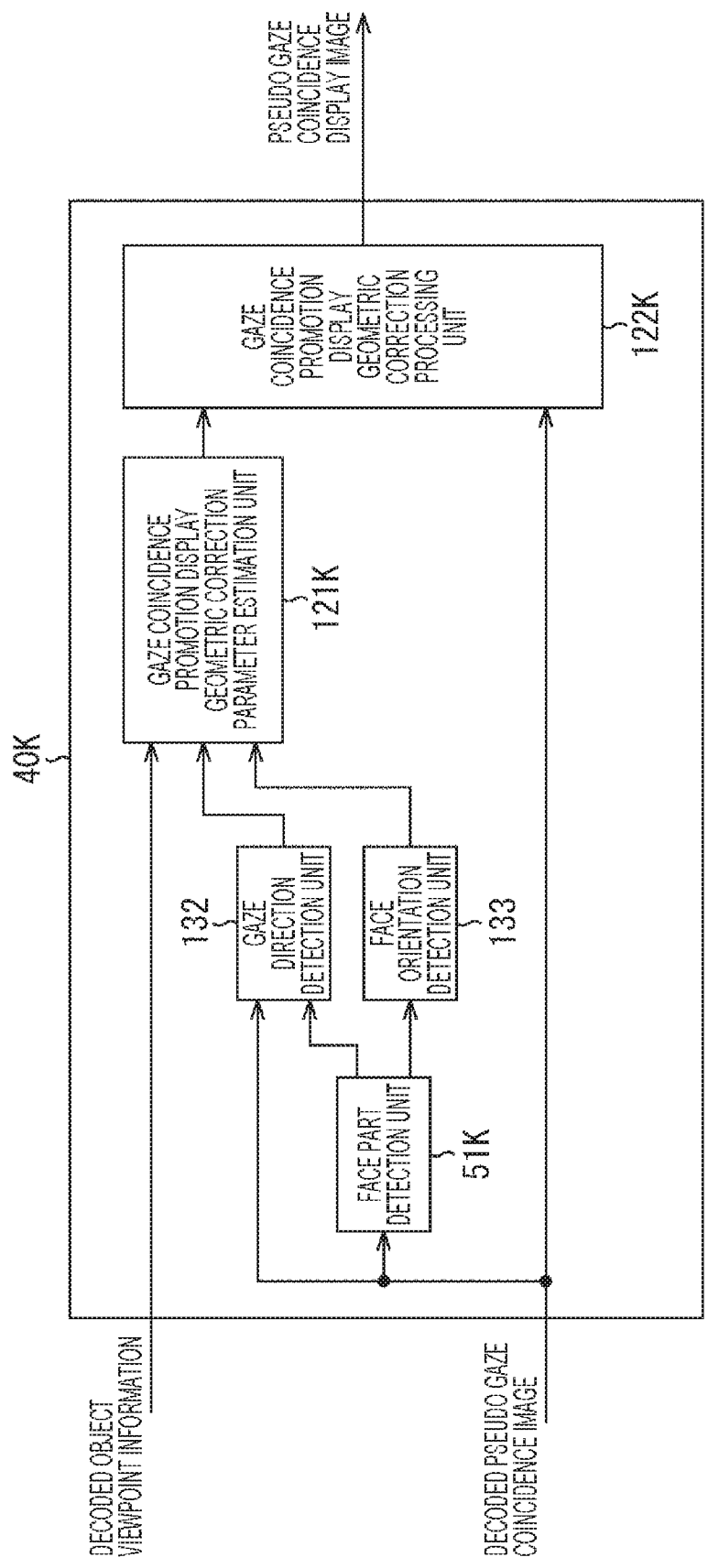
FIG. 64 is a block diagram illustrating a configuration example of a pseudo gaze coincidence image display unit in FIG. 63.

FIG. 64 is a block diagram illustrating a configuration example of the pseudo gaze coincidence image display unit 40K in FIG. 63.

As illustrated in FIG. 64, the decoded object viewpoint information and the decoded pseudo gaze coincidence image output from the decoding unit 39 are supplied to the pseudo gaze coincidence image display unit 40K as illustrated in FIG. 64, similarly to the pseudo gaze coincidence image display unit 40 in FIG. 19. Furthermore, the pseudo gaze coincidence image display unit 40K includes a gaze coincidence promotion display geometric correction processing unit 122K, similarly to the pseudo gaze coincidence image display unit 40H in FIG. 52. Moreover, the pseudo gaze coincidence image display unit 40K includes a gaze coincidence promotion display geometric correction parameter estimation unit 121K, a face part detection unit 51K, a gaze direction detection unit 132, and a face orientation detection unit 133.

The face part detection unit 51K obtains coordinates indicating the characteristic points of the parts of the face included in the decoded pseudo gaze coincidence image, similarly to the face part detection unit 51 included in the object viewpoint information setting unit 31 illustrated in FIG. 3.

The gaze direction detection unit 132 detects the gaze direction of both eyes from the analysis information detected in the previous face part detection unit 51K and the decoded pseudo gaze coincidence image, similarly to the above-described gaze direction detection unit 56 in FIG. 57.

Figure 65:
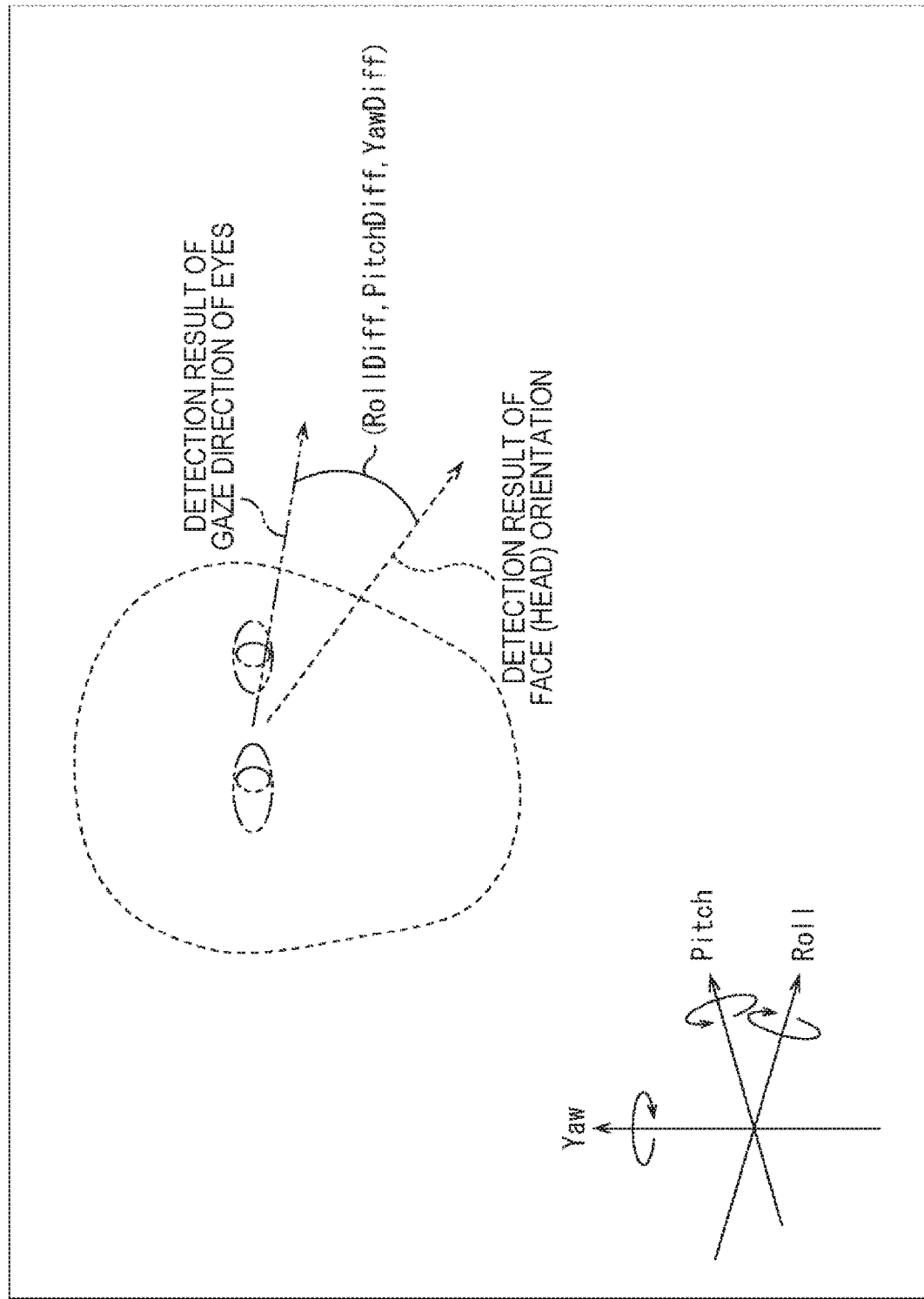
FIG. 65 is a diagram for describing an error between a gaze direction of eyes and face orientation.
Figure 66:
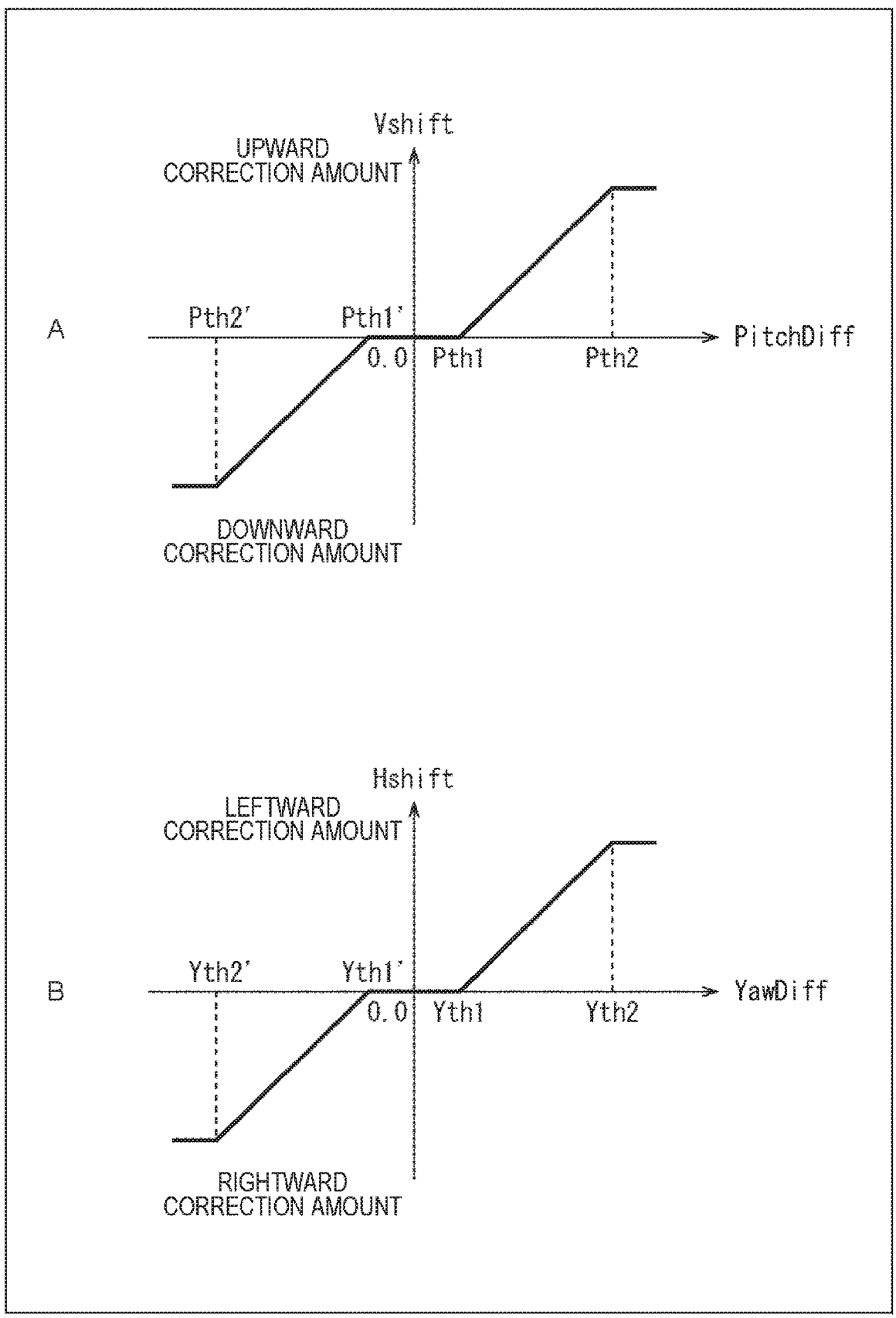
FIGS. 66A and 66B are diagrams illustrating examples of upward and downward correction amounts and rightward and leftward correction amounts.

The face orientation detection unit 133 detects face orientation in the decoded pseudo gaze coincidence image, using the analysis information of other than the eyes detected in the previous face part detection unit 51K. For example, the face orientation detection unit 133 detects the face orientation using a technology disclosed in Non-Patent Document "OpenFace: an open source facial behavior analysis toolkit" by Tadas Baltru?aitis, et al. in IEEE Winter Conference on Applications of Computer Vision, 2016" or the like. Furthermore, the detected directions are expressed as angles of vectors (roll, pitch, yaw) on three-dimensional space axes as illustrated in FIG. 65. Note that, in the present embodiment, the face orientation includes head orientation.

The gaze direction information indicating the gaze direction of both eyes detected by the gaze direction detection unit 132 and face orientation information indicating the face orientation detected by the face orientation detection unit 133 are supplied to the gaze coincidence promotion display geometric correction parameter estimation unit 121K. Then, the gaze coincidence promotion display geometric correction parameter estimation unit 121K estimates the gaze coincidence promotion display geometric correction parameter on the basis of an error between the gaze direction of both eyes and the face orientation, as illustrated in FIG. 65.

Specifically, as illustrated in FIG. 65, assuming that a three-dimensional vector indicating the gaze direction of the eyes and a three-dimensional vector indicating the face orientation are obtained as detection results. In this case, when the error of the angle made by the two three-dimensional vectors is expressed by three components of (RollDiff, PitchDiff, YawDiff), the upward and downward correction amounts are set according to the characteristic illustrated in FIG. 66A according to the value of the pitch error PitchDiff. Similarly, the rightward and leftward correction amounts are set according to the characteristic illustrated in FIG. 66B according to the value of the yaw error YawDiff.

Then, a final correction amount on a two-dimensional image is expressed by a two-dimensional vector (Hshift, Vshift), and is corrected and displayed at a shifted position by the amount of the vector. According to the above description, the gaze coincidence promotion display geometric correction parameter estimation unit 121K estimates the gaze coincidence promotion display geometric correction parameter, reflecting the correction amount determined by the above determination method, and supplies the gaze coincidence promotion display geometric correction parameter to the gaze coincidence promotion display geometric correction processing unit 122K.

Note that the gaze coincidence promotion display geometric correction processing unit 122K performs similar operation to the gaze coincidence promotion display geometric correction processing unit 122H described with reference to FIG. 52. In other words, the gaze coincidence promotion display geometric correction processing unit 122K generates the pseudo gaze coincidence display image to be displayed on the display device 22 by being corrected such that the gazes more easily coincide with each other on the basis of the correction amount based on the above-described angle error from the state where the size and the position (height of the eyes) for life size of the other party's user are set as the reference.

The blocks included in the image processing unit 24K are configured as described above, and the display position is corrected for the actual size display, similarly to the image processing unit 24H in FIG. 49, whereby a video communication experience in which the gaze easily coincides with the other party's user without increasing the additional information can be provided.

<Configuration Example of Hardware of Computer>

Note that each processing described with reference to the above-described flowchart does not necessarily need to be chronologically processed according to the order described as the flowchart, and includes processing executed in parallel or individually (for example, parallel processing or object processing). Furthermore, the program may be processed by a single CPU or may be processed in a distributed manner by a plurality of CPUs.

Furthermore, the above-described series of processing (image processing method) can be executed by hardware or software. In a case where the series of processing is executed by software, a program constituting the software is installed from a program recording medium in which the program is recorded into a computer incorporated in special hardware, a general-purpose personal computer capable of executing various functions by installing various programs, or the like.

FIG. 67 is a block diagram illustrating a configuration example of hardware of a computer that executes the above-described series of processing by a program.

In a computer, a central processing unit (CPU) 201, a read only memory (ROM) 202, and a random access memory (RAM) 203 are mutually connected by a bus 204.

Moreover, an input/output interface 205 is connected to the bus 204. An input unit 206 including a keyboard, a mouse, a microphone, and the like, an output unit 207 including a display, a speaker, and the like, a storage unit 208 including a hard disk, a nonvolatile memory, and the like, a communication unit 209 including a network interface and the like, and a drive 210 for driving removable medium 211 such as a magnetic disk, an optical disk, a magneto-optical disk, or a semiconductor memory are connected to the input/output interface 205.

In the computer configured as described above, the CPU 201, for example, loads a program stored in the storage unit 208 into the RAM 203 and executes the program via the input/output interface 205 and the bus 204, thereby performing the above-described series of processing.

The program to be executed by the computer (CPU 201) is provided by being recorded on the removable medium 211 that is a package medium including a magnetic disk (including a flexible disk), an optical disk (compact disc-read only memory (CD-ROM), a digital versatile disc (DVD), or the like), a magneto-optical disk, or a semiconductor memory, or by being provided via a wired or wireless transmission medium, such as a local area network, the Internet, or digital broadcasting.

Then, the program can be installed to the storage unit 208 via the input/output interface 205 by attaching the removable medium 211 to the drive 210. Furthermore, the program can be received by the communication unit 209 via a wired or wireless transmission medium and installed in the storage unit 208. Other than the above method, the program can be installed in the ROM 202 or the storage unit 208 in advance.

<Combination Example of Configuration>

Note that the present technology can also have the following configurations.

(1)

An image processing device including:

a high fidelity display region setting unit configured to set a predetermined region including at least an eye region in which an eye of a first user is captured in an image in which the first user is captured, as a high fidelity display region;

a high fidelity image generation unit configured to perform first image generation processing using at least a part of a plurality of captured images having the first user respectively captured by a plurality of capture devices arranged outside a display device, and generate a high fidelity image in which the first user looks captured from a virtual capture position that is obtained by setting a viewpoint position of a second user displayed on the display device as the virtual capture position, and the high fidelity image having an appearance with higher fidelity;

a low fidelity image generation unit configured to perform second image generation processing using at least a part of the plurality of captured images in each of which the first user is captured, and generate a low fidelity image in which the first user looks captured from the virtual capture position and having lower fidelity than the high fidelity image; and an image superimposing unit configured to superimpose the high fidelity image on the high fidelity display region in the low fidelity image to generate an output image to be output as an image processing result.

(2)

The image processing device according to (1), further including a display image generation unit configured to generate a display image for displaying the second user with a specific size at a specific position on the display device from the output image in which the second user is captured according to the viewpoint position of the second user in a three-dimensional space.

(3)

The image processing device according to (2), in which the display image generation unit performs geometric correction using a parameter based on the viewpoint position of the second user in the three-dimensional space, a resolution of the output image in which the second user is captured, and a resolution and a size of the display device, and generates the display image such that the second user is displayed with a substantially same size as the real second user.

(4)

The image processing device according to (2) or (3), further including an object viewpoint information setting unit configured to analyze a face of the first user captured in the plurality of captured images having the first user as an object and obtain a coordinate indicating a characteristic point of each part of the face on each of the captured images, and acquire object viewpoint information indicating a viewpoint position of the first user on a basis of the coordinates, in which the object viewpoint information is used when generating the display image from the output image in which the first user is captured on a side of the second user who becomes a party to perform telecommunication with the first user.

(5)

The image processing device according to (4), in which the high fidelity display region setting unit generates a mask image for specifying the high fidelity display region, using analysis information including the coordinates of the characteristic point obtained by the object viewpoint information setting unit.

(6)

The image processing device according to any one of (1) to (5), in which the high fidelity image generation unit crops a portion corresponding to the high fidelity display region from the plurality of captured images in which the first user is captured, and performs viewpoint interpolation processing according to the virtual capture position, for a plurality of cropped images to generate the high fidelity image.

(7)

The image processing device according to any one of (1) to (6), in which the low fidelity image generation unit is configured to apply projective transformation processing using a projective transformation parameter estimated such that a captured image becomes close to an image as viewed from the virtual capture position according to the viewpoint position of the second user to the captured image in which the first user is captured to generate the low fidelity image.

(8)

The image processing device according to (7), in which the low fidelity image generation unit applies the projective transformation processing using the projective transformation parameter to a mask image for specifying the high fidelity display region to perform correction to reflect an influence of projective transformation to the low fidelity image.

(9)

The image processing device according to any one of (1) to (8), in which the image superimposing unit generates a blend map image obtained by applying filter processing to a mask image for specifying the high fidelity display region and performs alpha blending processing for blending the high fidelity image and the low fidelity image according to a blend ratio set for the blend map image to generate the output image.

(10)

The image processing device according to (4), further including:

an encoding unit configured to encode the object viewpoint information indicating the viewpoint position of the first user and the output image in which the first user is captured to generate a coded stream; and a transmission unit configured to output the coded stream as a transmission stream to be transmitted via a network.

(11)

The image processing device according to any one of (2) to (10), further including:

a reception unit configured to receive a transmission stream obtained by encoding object viewpoint information indicating the viewpoint position of the second user and the output image in which the second user is captured and transmitted via a network, and restore the transmission stream to a coded stream; and a decoding unit configured to decode the coded stream and supply the object viewpoint information indicating the viewpoint position of the second user and the output image in which the second user is captured to the display image generation unit.

(12)

The image processing device according to any one of (1) to (11), in which the first user and the second user are a same person, and the high fidelity image generation unit generates the high fidelity image, using a viewpoint position of the person itself as a virtual capture position, and the low fidelity image generation unit generates the low fidelity image, using a viewpoint position of the person itself as a virtual capture position, and the image processing device further includes a mirror image display processing unit configured to perform mirror image display processing of horizontally reversing the output image.

(13)
The image processing device according to (8), in which
the high fidelity image generation unit and the low fidelity image generation unit respectively generate the high fidelity image and the low fidelity image on a basis of fixed viewpoint information, and
the image processing device further includes a high fidelity display information setting unit configured to output a representative position and an area of the mask image as high fidelity display information.

(14)
The image processing device according to any one of (1) to (12), further including
a capture control unit configured to control a plurality of the capture devices to zoom and capture the first user as the captured image to be used by the high fidelity image generation unit to generate the high fidelity image, and to capture the first user at a wide angle as the captured image to be used by the low fidelity image generation unit to generate the low fidelity image.

(15)
The image processing device according to any one of (1) to (12), in which,
in a case where the first user is recognized to wear a pair of glasses, the high fidelity display region setting unit sets the high fidelity display region, avoiding an existing portion of a rim of the pair of glasses from a face captured in the image.

(16)
The image processing device according to (9), in which
the image superimposing unit generates a blend ratio map image in which the blend ratio of the high fidelity image becomes higher as similarity is higher on a basis of the similarity between the high fidelity image and the low fidelity image, and blends the high fidelity image and the low fidelity image according to the blend ratio map image.

(17)
The image processing device according to any one of (1) to (12), further including
an animation rendering unit configured to generate a computer graphic (CG) avatar image on a basis of a parameter generated from an image in which the second user is captured, as the low fidelity image.

(18)
The image processing device according to (16), in which
the image superimposing unit includes a removal unit that removes an element that interferes with gaze coincidence from the high fidelity image according to an error amount between the high fidelity image and the low fidelity image in a region near eyes of the first user before blending the high fidelity image and the low fidelity image according to the blend ratio map image.

(19)
The image processing device according to (16), further including
an object viewpoint information setting unit including a gaze direction detection unit that detects a gaze direction of the first user on a basis of at least one piece of the captured image capturing the first user as an object, and analysis information including a coordinate indicating a characteristic point of each part of a face of the first user, in which
the image superimposing unit includes a catch light emphasizing unit that emphasizes a catch light of a pupil region of the high fidelity image using the analysis information and the gaze direction in advance before blending the high fidelity image and the low fidelity image according to the blend ratio map image.

(20)
The image processing device according to (2), in which
the display image generation unit displays the display image generated such that the second user is displayed with a substantially same size as the real second user at a display position according to a correction amount for correcting a deviation in a direction in which the first user perceives a gaze of the second user, on a basis of a viewpoint interpolation position set when generating the high fidelity image.

(21)
The image processing device according to (2), in which
the display image generation unit displays the display image at a display position according to a correction amount for correcting a deviation in a direction in which the first user perceives a gaze of the second user, on a basis of an error of an angle made by a three-dimensional vector indicating a gaze direction of the second user in the output image and a three-dimensional vector indicating a face orientation of the second user in the output image when generating the display image in which the second user is displayed with a substantially same size as the real second user.

(22)
An image processing method including the steps of:
setting a predetermined region including at least an eye region in which an eye of a first user is captured in an image in which the first user is captured, as a high fidelity display region;
performing first image generation processing using at least a part of a plurality of captured images having the first user respectively captured by a plurality of capture devices arranged outside a display device, and generating a high fidelity image in which the first user looks captured from a virtual capture position that is obtained by setting a viewpoint position of a second user displayed on the display device as the virtual capture position, and the high fidelity image having an appearance with higher fidelity;
performing second image generation processing using at least a part of the plurality of captured images in each of which the first user is captured, and generating a low fidelity image in which the first user looks captured from the virtual capture position and having lower fidelity than the high fidelity image; and
superimposing the high fidelity image on the high fidelity display region in the low fidelity image to generate an output image to be output as an image processing result.

(23)
A program for causing a computer to execute image processing including the steps of:
setting a predetermined region including at least an eye region in which an eye of a first user is captured in an image in which the first user is captured, as a high fidelity display region;
performing first image generation processing using at least a part of a plurality of captured images having the first user respectively captured by a plurality of capture devices arranged outside a display device, and generating a high fidelity image in which the first user looks captured from a virtual capture position that is obtained by setting a viewpoint position of a second user displayed on the display device as the virtual capture position, and the high fidelity image having an appearance with higher fidelity;
performing second image generation processing using at least a part of the plurality of captured images in each of which the first user is captured, and generating a low fidelity image in which the first user looks captured from the virtual capture position and having lower fidelity than the high fidelity image; and superimposing the high fidelity image on the high fidelity display region in the low fidelity image to generate an output image to be output as an image processing result.

(24)

A telecommunication system configured to have a first user-side telecommunication apparatus and a second user-side telecommunication apparatus connected via a network, the first user-side telecommunication apparatus including a first image processing device including at least a high fidelity display region setting unit configured to set a predetermined region including at least an eye region in which an eye of a first user is captured in an image in which the first user is captured, as a high fidelity display region, a high fidelity image generation unit configured to perform first image generation processing using at least a part of a plurality of captured images having the first user respectively captured by a plurality of capture devices arranged outside a display device, and generate a high fidelity image in which the first user looks captured from a virtual capture position that is obtained by setting a viewpoint position of a second user displayed on the display device as the virtual capture position, and the high fidelity image having an appearance with higher fidelity, a low fidelity image generation unit configured to perform second image generation processing using at least a part of the plurality of captured images in each of which the first user is captured, and generate a low fidelity image in which the first user looks captured from the virtual capture position and having lower fidelity than the high fidelity image, and an image superimposing unit configured to superimpose the high fidelity image on the high fidelity display region in the low fidelity image to generate an output image to be output as an image processing result, and the second user-side telecommunication apparatus including a second image processing device including at least a display image generation unit configured to generate a display image for displaying the first user with a specific size at a specific position from the output image in which the first user is captured on a basis of a viewpoint position of the first user in a three-dimensional space.

Note that the present embodiments are not limited to the above-described embodiments, and various modifications can be made without departing from the gist of the present disclosure. Furthermore, the effects described in the present specification are merely examples and are not limited, and other effects may be exhibited.

REFERENCE SIGNS LIST

11 Telecommunication system
12 Telecommunication apparatus
13 Network
21 Capture device
22 Display device
23 Information processing device
24 Image processing unit
25 Communication unit
31 Object viewpoint information setting unit
32 High fidelity display region setting unit
33 High fidelity image generation unit
34 Low fidelity image generation unit
35 Pseudo gaze coincidence image generation unit
36 Encoding unit
37 Transmission unit
38 Reception unit
39 Decoding unit
40 Pseudo gaze coincidence image display unit

The invention claimed is:

1. An image processing device, comprising:
a processor configured to:
set a high fidelity display region based on a determined region that includes at least an eye region in which an eye of a first user is captured in an image of the first user;
set a viewpoint position of a second user displayed on a display device as a virtual capture position;
perform a first image generation process based on at least a part of a plurality of captured images of the first user to generate a high fidelity image in which the first user is captured from the virtual capture position, wherein the plurality of captured images is captured by a plurality of capture devices arranged outside the display device;
perform a second image generation process based on at least a part of the plurality of captured images in each of which the first user is captured to generate a low fidelity image in which the first user is captured from the virtual capture position, wherein the low fidelity image has lower fidelity than the high fidelity image; and
superimpose the high fidelity image on the high fidelity display region of the low fidelity image to generate an output image to be output as an image processing result.

2. The image processing device according to claim 1, wherein
the processor is further configured to generate a display image to display the second user with a specific size at a specific position on the display device from the output image, and
the second user in the output image is captured based on the viewpoint position of the second user in a three-dimensional space.

3. The image processing device according to claim 2, wherein the processor is further configured to:
perform geometric correction using a parameter based on the viewpoint position of the second user in the three-dimensional space, a resolution of the output image in which the second user is captured, and a resolution and a size of the display device; and
generate the display image such that the second user is displayed with a substantially same size as a real second user.

4. The image processing device according to claim 2, wherein the processor is further configured to:
analyze a face of the first user captured in the plurality of captured images having the first user as an object;
obtain a coordinate indicating a characteristic point of each part of the face on each of the plurality of captured images; and
acquire object viewpoint information indicating a viewpoint position of the first user based on the coordinate, wherein
the display image is generated from the output image based on the object viewpoint information, and the first user is displayed on a side of the second user who is a party to perform telecommunication with the first user on the display device.

5. The image processing device according to claim 4, wherein the processor is further configured to generate a mask image to specify the high fidelity display region based on analysis information including the coordinate of the characteristic point.

6. The image processing device according to claim 4, wherein the processor is further configured to:
encode the object viewpoint information that indicates the viewpoint position of the first user and the output image in which the first user is captured to generate a coded stream; and
output the coded stream as a transmission stream to be transmitted via a network.

7. The image processing device according to claim 2, wherein the processor further configured to:
receive a transmission stream that includes encoded object viewpoint information and the output image in which the second user is captured, wherein the encoded object viewpoint information indicates the viewpoint position of the second user;
restore the transmission stream to a coded stream;
decode the coded stream; and
generate the display image based on the encoded object viewpoint information that indicates the viewpoint position of the second user and the output image.

8. The image processing device according to claim 2, wherein
the processor is further configured to display the display image at the specific position based on a correction amount for correction of a deviation in a direction in which the first user perceives a gaze of the second user, and
the correction amount is based on a viewpoint interpolation position set at a time of the generation of the high fidelity image.

9. The image processing device according to claim 2, wherein
the processor is further configured to display the display image at the specific position based on a correction amount for correction of a deviation in a direction in which the first user perceives a gaze of the second user, and
the correction amount is based on an error of an angle made by a first three-dimensional vector indicating a gaze direction of the second user in the output image and a second three-dimensional vector indicating a face orientation of the second user in the output image at a time of the generation of the display image in which the second user is displayed with a substantially same size as a real second user.

10. The image processing device according to claim 1, wherein the processor is further configured to:
crop a portion corresponding to the high fidelity display region from the plurality of captured images in which the first user is captured; and
perform a viewpoint interpolation process based on the virtual capture position, for a plurality of cropped images to generate the high fidelity image.

11. The image processing device according to claim 1, wherein the processor is further configured to apply a projective transformation process based on a projective transformation parameter estimated such that a captured image of the plurality of captured images of the first user is close to an image as viewed from the virtual capture position based on according to the viewpoint position of the second user to generate the low fidelity image.

12. The image processing device according to claim 11, wherein the processor is further configured to:
apply the projective transformation process based on using the projective transformation parameter to a mask image to specify the high fidelity display region; and
perform, based on the specified high fidelity display region, correction to reflect an influence of the projective transformation process to the low fidelity image.

13. The image processing device according to claim 12, wherein the processor is further configured to:
generate the high fidelity image and the low fidelity image based on fixed viewpoint information; and
output a representative position and an area of the mask image as high fidelity display information.

14. The image processing device according to claim 1, wherein the processor is further configured to:
generate a blend map image by application of a filter process to a mask image to specify the high fidelity display region;
set a blend ratio for the blend map image; and
perform an alpha blending process to blend the high fidelity image and the low fidelity image based on the blend ratio to generate the output image.

15. The image processing device according to claim 14, wherein the processor is further configured to:
generate a blend ratio map image based on a similarity between the high fidelity image and the low fidelity image, wherein
the blend ratio map image is generated such that the blend ratio of the high fidelity image is higher as the similarity is higher; and
blend the high fidelity image and the low fidelity image based on the blend ratio map image.

16. The image processing device according to claim 15, wherein
the processor is further configured to remove an element that interferes with gaze coincidence from the high fidelity image, and
the removal is based on an error amount between the high fidelity image and the low fidelity image in a region near both eyes of the first user before the blend of the high fidelity image and the low fidelity image.

17. The image processing device according to claim 15, wherein the processor is further configured to:
detect a gaze direction of the first user based on:
at least one captured image of the plurality of captured images that includes the first user as an object, and
analysis information including a coordinate that indicates a characteristic point of each part of a face of the first user, wherein catch light of a pupil region of the high fidelity image is emphasized based on using the analysis information and the gaze direction in advance before the blend of the high fidelity image and the low fidelity image.

18. The image processing device according to claim 1, wherein
the first user and the second user are a same person, and the processor is further configured to:
generate the high fidelity image based on a viewpoint position of a person as the virtual capture position;
generate the low fidelity image based on the viewpoint position of the person as the virtual capture position; and
perform a mirror image display process that includes a horizontal reversal of the output image.

19. The image processing device according to claim 1, wherein the processor is further configured to:
control the plurality of capture devices to zoom and capture the first user to generate the high fidelity image; and
control the plurality of capture devices to capture the first user at a wide angle to generate the low fidelity image.

20. The image processing device according to claim 1, wherein, in a case where the first user is recognized to wear a pair of glasses, the processor is further configured to set the high fidelity display region that avoids an existing portion of a rim of the pair of glasses from a face captured in the image.

21. The image processing device according to claim 1, wherein the processor is further configured to generate a computer graphic (CG) avatar image based on a basis of a parameter generated from a captured image in which the second user is captured, as the low fidelity image.

22. An image processing method, comprising:
setting a high fidelity display region based on a determined region including at least an eye region in which an eye of a first user is captured in an image of the first user;
setting a viewpoint position of a second user displayed on a display device as a virtual capture position;
performing a first image generation process based on at least a part of a plurality of captured images of the first user captured by a plurality of capture devices arranged outside the display device;
generating a high fidelity image in which the first user looks is captured from the virtual capture position;
performing a second image generation process based on at least a part of the plurality of captured images in each of which the first user is captured; and
generating a low fidelity image in which the first user is captured from the virtual capture position, wherein the low fidelity image has lower fidelity than the high fidelity image; and
superimposing the high fidelity image on the high fidelity display region of the low fidelity image to generate an output image to be output as an image processing result.

23. A non-transitory computer-readable medium having stored thereon, computer-executable instructions which, when executed by a processor, cause the processor to execute operations, the operations comprising:
setting a high fidelity display region based on a determined region including at least an eye region in which an eye of a first user is captured in an image of the first user;
setting a viewpoint position of a second user displayed on a display device as a virtual capture position;
performing a first image generation process based on at least a part of a plurality of captured images of the first user captured by a plurality of capture devices arranged outside the display device;
generating a high fidelity image in which the first user is captured from the virtual capture position;
performing a second image generation process based on at least a part of the plurality of captured images in each of which the first user is captured;
generating a low fidelity image in which the first user is captured from the virtual capture position, wherein the low fidelity image has lower fidelity than the high fidelity image; and
superimposing the high fidelity image on the high fidelity display region of the low fidelity image to generate an output image to be output as an image processing result.

24. A telecommunication system, comprising:
a first user-side telecommunication apparatus and a second user-side telecommunication apparatus connected via a network, wherein
the first user-side telecommunication apparatus comprises a first image processing device including a first processor configured to:
set a high fidelity display region based on a determined region including at least an eye region in which an eye of a first user is captured in an image of the first user;
set a viewpoint position of a second user displayed on a display device as a virtual capture position;
perform a first image generation process based on at least a part of a plurality of captured images of the first user captured by a plurality of capture devices arranged outside the display device;
generate a high fidelity image in which the first user is captured from the virtual capture position;
perform a second image generation process based on at least a part of the plurality of captured images in each of which the first user is captured;
generate a low fidelity image in which the first user is captured from the virtual capture position, wherein the low fidelity image has lower fidelity than the high fidelity image; and
superimpose the high fidelity image on the high fidelity display region in the low fidelity image to generate an output image to be output as an image processing result, and
the second user-side telecommunication apparatus comprises a second image processing device including a second processor configured to generate a display image to display the first user with a specific size at a specific position from the output image, wherein the first user in the output image is captured based on a viewpoint position of the first user in a three-dimensional space.

* * * * *